United States Patent
Suwa et al.

(10) Patent No.: US 11,243,439 B2
(45) Date of Patent: Feb. 8, 2022

(54) LIQUID CRYSTAL DISPLAY

(71) Applicant: SATURN LICENSING LLC, New York, NY (US)

(72) Inventors: Shunichi Suwa, Kanagawa (JP); Masashi Miyakawa, Kanagawa (JP); Chikashi Kobayashi, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 17/019,503

(22) Filed: Sep. 14, 2020

(65) Prior Publication Data
US 2020/0409222 A1 Dec. 31, 2020

Related U.S. Application Data

(63) Continuation of application No. 15/127,427, filed as application No. PCT/JP2015/056156 on Mar. 3, 2015, now Pat. No. 10,795,208.

(30) Foreign Application Priority Data

Mar. 31, 2014 (JP) .................................. 2014-070957

(51) Int. Cl.
*G02F 1/1337* (2006.01)
*G02F 1/1343* (2006.01)
*G02F 1/1335* (2006.01)

(52) U.S. Cl.
CPC .... *G02F 1/133711* (2013.01); *G02F 1/13439* (2013.01); *G02F 1/133512* (2013.01);
(Continued)

(58) Field of Classification Search
CPC ... G02F 2001/133761; G02F 1/133753; G02F 1/134309; G02F 1/13439; G02F 1/136222; G02F 1/133761
See application file for complete search history.

(56) References Cited

U.S. PATENT DOCUMENTS

2011/0242468 A1 10/2011 Choi et al.
2011/0260957 A1 10/2011 Jeong et al.
(Continued)

FOREIGN PATENT DOCUMENTS

CN 102213874 A 10/2011
CN 102236216 A 11/2011
(Continued)

OTHER PUBLICATIONS

Non-Final Office Action for U.S. Appl. No. 15/127,427, dated Nov. 1, 2018, 34 pages.
(Continued)

*Primary Examiner* — Michael H Caley
*Assistant Examiner* — Mariam Qureshi
(74) *Attorney, Agent, or Firm* — Oblon, McClelland, Maier & Neustadt, L.L.P.

(57) ABSTRACT

A liquid crystal display is formed by arraying a plurality of pixels 10, and the pixel 10 includes a first substrate 20, a second substrate 50, a first electrode 120 formed on the first substrate 20, a second electrode 52 formed on the second substrate 50, and a liquid crystal layer 60. A pretilt angle is provided to a liquid crystal molecule 61, and the first electrode 120 is formed of a transparent conductive material layer and a foundation layer 150 including a plurality of projecting portions 130 and recessed portions 140. A first transparent conductive material layer 135 connected to a first power feeding unit is formed on a projecting portion top surface 151 of the foundation layer 150, and a second transparent conductive material layer 145 connected to a second power feeding unit is formed on a recessed portion bottom surface 152 of the foundation layer 150.

27 Claims, 47 Drawing Sheets

(52) U.S. Cl.
CPC .. *G02F 1/133753* (2013.01); *G02F 1/134309* (2013.01); *G02F 1/133715* (2021.01); *G02F 1/133761* (2021.01); *G02F 2202/022* (2013.01)

(56) References Cited

U.S. PATENT DOCUMENTS

| | | | |
|---|---|---|---|
| 2011/0317104 A1 | 12/2011 | Nakamura et al. | |
| 2012/0044448 A1 | 2/2012 | Kim et al. | |
| 2012/0138963 A1* | 6/2012 | Tseng | G02F 1/133753 257/88 |
| 2012/0154346 A1 | 6/2012 | Hirose | |
| 2012/0218500 A1 | 8/2012 | Nakamura et al. | |
| 2013/0194536 A1* | 8/2013 | Tae | G02F 1/134336 349/143 |
| 2014/0168582 A1* | 6/2014 | Chang | G02F 1/134336 349/106 |
| 2015/0153607 A1* | 6/2015 | Chen | G02F 1/133305 349/65 |

FOREIGN PATENT DOCUMENTS

| | | |
|---|---|---|
| CN | 104136980 A | 11/2014 |
| JP | 2004-037854 A | 2/2004 |
| JP | 2004-302260 A | 10/2004 |
| JP | 2009-003194 A | 1/2009 |
| JP | 2011-227443 A | 11/2011 |
| JP | 2011-232736 A | 11/2011 |
| JP | 2013-231794 A | 11/2013 |
| KR | 10-2011-0112219 A | 10/2011 |
| KR | 10-2011-0117553 A | 10/2011 |
| KR | 10-2015-0004346 A | 1/2015 |

OTHER PUBLICATIONS

Non-Final Office Action for U.S. Appl. No. 15/127,427, dated Sep. 20, 2019, 35 pages.
Final Office Action for U.S. Appl. No. 15/127,427, dated Apr. 25, 2019, 33 pages.
Final Office Action for U.S. Appl. No. 15/127,427, dated Jan. 31, 2020, 37 pages.
Advisory Action for U.S. Appl. No. 15/127,427, dated Jul. 11, 2019, 03 pages.
Advisory Action for U.S. Appl. No. 15/127,427, dated Apr. 15, 2020, 03 pages.
Notice of Allowance for U.S. Appl. No. 15/127,427, dated Jun. 1, 2020, 10 pages.
International Search Report with Written Opinion of PCT Application No. PCT/JP2015/056156, dated May 19, 2015, 15 pages of English Translation and 11 pages of ISRWO.
International Preliminary Report on Patentability of PCT Application No. PCT/JP2015/056156, dated Oct. 13, 2016, 15 pages of English Translation and 08 pages of IPRP.

* cited by examiner

LIQUID CRYSTAL DISPLAY

CROSS REFERENCE TO RELATED APPLICATIONS

The present application is a continuation application of U.S. patent application Ser. No. 15/127,427, filed on Sep. 20, 2016, which is a national stage of PCT/JP2015/056156, filed on Mar. 3, 2015, and claims the benefit of priority from prior Japanese Patent Application JP 2014-070957 filed in the Japan Patent Office on Mar. 31, 2014, the entire contents of which are hereby incorporated by reference.

TECHNICAL FIELD

The present disclosure relates to a liquid crystal display that includes a liquid crystal display element in which a liquid crystal layer is sealed between a pair of substrates having electrodes on facing surfaces.

BACKGROUND ART

In recent years, liquid crystal displays (LCD) are widely used as display monitors of a liquid crystal television set, a notebook personal computer, a car navigation device, and the like. Such liquid crystal displays are categorized into various display modes (systems) according to molecular alignment (orientation) of liquid crystal molecules included in the liquid crystal layer interposed between the substrates. As the display mode, for example, a twisted nematic (TN) mode in which the liquid crystal molecules are oriented in a twisted manner in a state not applied with voltage is well known. In the TN mode, the liquid crystal molecule has a property in which positive dielectric constant anisotropy, namely, the dielectric constant in a long axis direction of the liquid crystal molecule is larger compared to that in a short axis direction. Therefore, the liquid crystal molecules has a structure in which the liquid crystal molecules are aligned in a direction vertical to the substrate surfaces while orientation directions of the liquid crystal molecules are sequentially rotated within a plane parallel to substrate surfaces.

On the other hand, there has been growing attention to a vertical alignment (VA) mode in which the liquid crystal molecules are oriented vertical to the substrate surfaces in a state not applied with voltage. In the VA mode, the liquid crystal molecule has a property in which the negative dielectric constant anisotropy, namely, the dielectric constant in the long axis direction of the liquid crystal molecule is smaller compared to that in the short axis direction, and a wider viewing angle can be achieved compared to the TN mode.

In such a VA mode liquid crystal display, when voltage is applied, the liquid crystal molecules oriented in a direction vertical to the substrates make a response to the voltage so as to fall down in a direction parallel to the substrates due to the negative dielectric constant anisotropy, thereby transmitting light. However, since the falling direction of the liquid crystal molecule oriented vertical to the substrates is arbitrary, deterioration of response characteristics may be caused by disorder of orientation of the liquid crystal molecule caused by the voltage application.

Accordingly, as an approach to control orientation of the liquid crystal molecule at the time of voltage application, various kinds of techniques are proposed until today. For example, a multi-domain vertical alignment (MVA) system, a patterned vertical alignment (PVA) system, or a method of using an optical orientation film (for example, Japanese Patent Application Laid-Open No. 5-232473) is proposed. In the MVA system, a high viewing angle is achieved while performing orientation control by using a slit and a rib. Recently, in addition thereto, there is a proposed structure as a so-called solid electrode (also referred to as a fine slit structure) in which a plurality of fine slits is provided on a first electrode (specifically, a pixel electrode) formed on one of the substrates and no slit is provided on an electrode formed on the other substrate (specifically, a facing electrode) (refer to Japanese Patent Application Laid-Open No. 2002-357830, for example). However, in the fine slit structure, there are portions not applied with an electric field in the slit formed of fine lines and spaces, and furthermore, an orientation state of the liquid crystal molecules takes a twisted structure during voltage application in the vicinity of edge of a line. Therefore, there may be a problem in which light transmissivity is deteriorated.

A technology to resolve such a problem, that is, a technology forming an uneven portion instead of providing the plurality of fine slits on the pixel electrode is disclosed in Japanese Patent Application Laid-Open No. 2011-232736. Here, in one pixel, a plurality of uneven portions is formed of: a trunk projecting portion that extends in an X-axis direction and a Y-axis direction; and a plurality of branch projecting portions that extends from a side edge of the trunk projecting portion toward a pixel peripheral portion. Furthermore, a first electrode having an uneven portion can be obtained by, for example, forming unevenness on a foundation layer and forming a transparent conductive material layer on this foundation layer.

CITATION LIST

Patent Document

Patent Document 1: Japanese Patent Application Laid-Open No. 5-232473
Patent Document 2: Japanese Patent Application Laid-Open No. 2002-357830
Patent Document 3: Japanese Patent Application Laid-Open No. 2011-232736

SUMMARY OF THE INVENTION

Problems to be Solved by the Invention

In a technique disclosed in Japanese Patent Application Laid-Open No. 2011-232736, above-described problems in the fine slit structure can be prevented from occurring. However, in the case where inclination of a side surface of an uneven portion is forward tapered, when liquid crystal molecules are oriented relative to a portion of a first electrode on the side surface of the forward-tapered uneven portion, a liquid crystal orientation state is affected and optical characteristics may be deteriorated. In order to align the liquid crystal molecules in an ideal manner on the uneven portion, preferably, the side surface of the uneven portion is vertical as much as possible. However, in the case where the side surface of the uneven portion is vertical as much as possible, a so-called level disconnection may occur in a transparent conductive material layer. Furthermore, in the event of level disconnection, an electric field generated by voltage application to the first electrode becomes non-uniform, and quality deterioration of a display image may be caused.

Therefore, the present disclosure is directed to providing a liquid crystal display having a constitution and a structure in which non-uniform electric field generated by voltage application to the first electrode can be prevented and quality deterioration of a display image is hardly caused.

Solutions to Problems

The liquid crystal display according to first to fifth aspects of the present disclosure in order to achieve the above objects is formed by arraying a plurality of pixels, and the pixel includes:
a first substrate and a second substrate;
a first electrode formed on a facing surface of the first substrate that faces a second substrate;
a second electrode formed on a facing surface of the second substrate that faces the first substrate; and
a liquid crystal layer provided between the first electrode and the second electrode and including a liquid crystal molecule,
wherein
a pretilt angle is provided to a liquid crystal molecule, and the first electrode is formed of a transparent conductive material layer and a foundation layer having a plurality of projecting portions and recessed portions.

Furthermore, in the liquid crystal display according to the first aspect of the present disclosure,
a first transparent conductive material layer connected to a first power feeding unit is formed on a projecting portion top surface of the foundation layer, and
a second transparent conductive material layer connected to a second power feeding unit is formed on a recessed portion bottom surface of the foundation layer.

Furthermore, in the liquid crystal displays according to the second to third aspects of the present disclosure,
a first transparent conductive material layer is formed on a projecting portion top surface of the foundation layer,
a second transparent conductive material layer connected to the first transparent conductive material layer is formed on a recessed portion bottom surface of the foundation layer,
a projecting portion is formed of a trunk projecting portion that passes a pixel center portion and radially extends (for example, in a cross shape), and a plurality of branch projecting portions that extends from the trunk projecting portion toward a pixel peripheral portion,
a recessed portion extends from the trunk projecting portion and is located between a branch projecting portion and a branch projecting portion,
a narrowest portion exists in the recessed portion (second aspect of the present disclosure), or
a region where a level difference between the recessed portion and the projecting portion becomes smallest exists (third aspect of the present disclosure).

Furthermore, in the liquid crystal displays according to the fourth to fifth aspects of the present disclosure,
a first transparent conductive material layer is formed on a projecting portion top surface of the foundation layer,
a second transparent conductive material layer connected to the first transparent conductive material layer is formed on a recessed portion bottom surface of the foundation layer,
the projecting portion is formed of a trunk projecting portion formed in a pixel peripheral portion in a frame-like shape and a plurality of branch projecting portions extending from the trunk projecting portion toward inside of the pixel,
the recessed portion extends from the trunk projecting portion and is located between a branch projecting portion and a branch projecting portion,
a narrowest portion exists in the recessed portion (fourth aspect of the present disclosure), or
a region where a level difference between the recessed portion and the projecting portion becomes smallest exists (fifth aspect of the present disclosure).

Effects of the Invention

In the liquid crystal display according to the first aspect, the first transparent conductive material layer connected to the first power feeding unit is formed on the projecting portion top surface of the foundation layer, and the second transparent conductive material layer connected to the second power feeding unit is formed on the recessed portion bottom surface of the foundation layer. Therefore, voltage can be surely applied to the first transparent conductive material layer and the second transparent conductive material layer. Furthermore, in the liquid crystal displays according to the second to fifth aspects, the narrowest portion exists in the recessed portion or the region where the level difference between the recessed portion and the projecting portion becomes the smallest exists, or the narrowest portion in the recessed portion is formed on the basis of resolution limit design in a photo-lithography technique. Therefore, it is possible to obtain a state in which the first transparent conductive material layer formed on the projecting portion top surface and the second transparent conductive material layer formed on the recessed portion bottom surface are at least partly connected inside the pixel. Note that the above effects described in the present specification are only examples and not limited thereto, and further additional effects may also be provided.

BRIEF DESCRIPTION OF DRAWINGS

FIG. 47 is a partial schematic plan view of a portion of a branch projecting portion and the like in order to describe a forming pitch of the branch projecting portion, a width of the branch projecting portion, a width of a distal end portion of the branch projecting portion, and the like.

FIG. 48 is a partial schematic plan view of a portion of the branch projecting portion and the like in order to describe the forming pitch of the branch projecting portion, the width of the branch projecting portion, the width of the distal end portion of the branch projecting portion, and the like.

MODE FOR CARRYING OUT THE INVENTION

Figure 1:
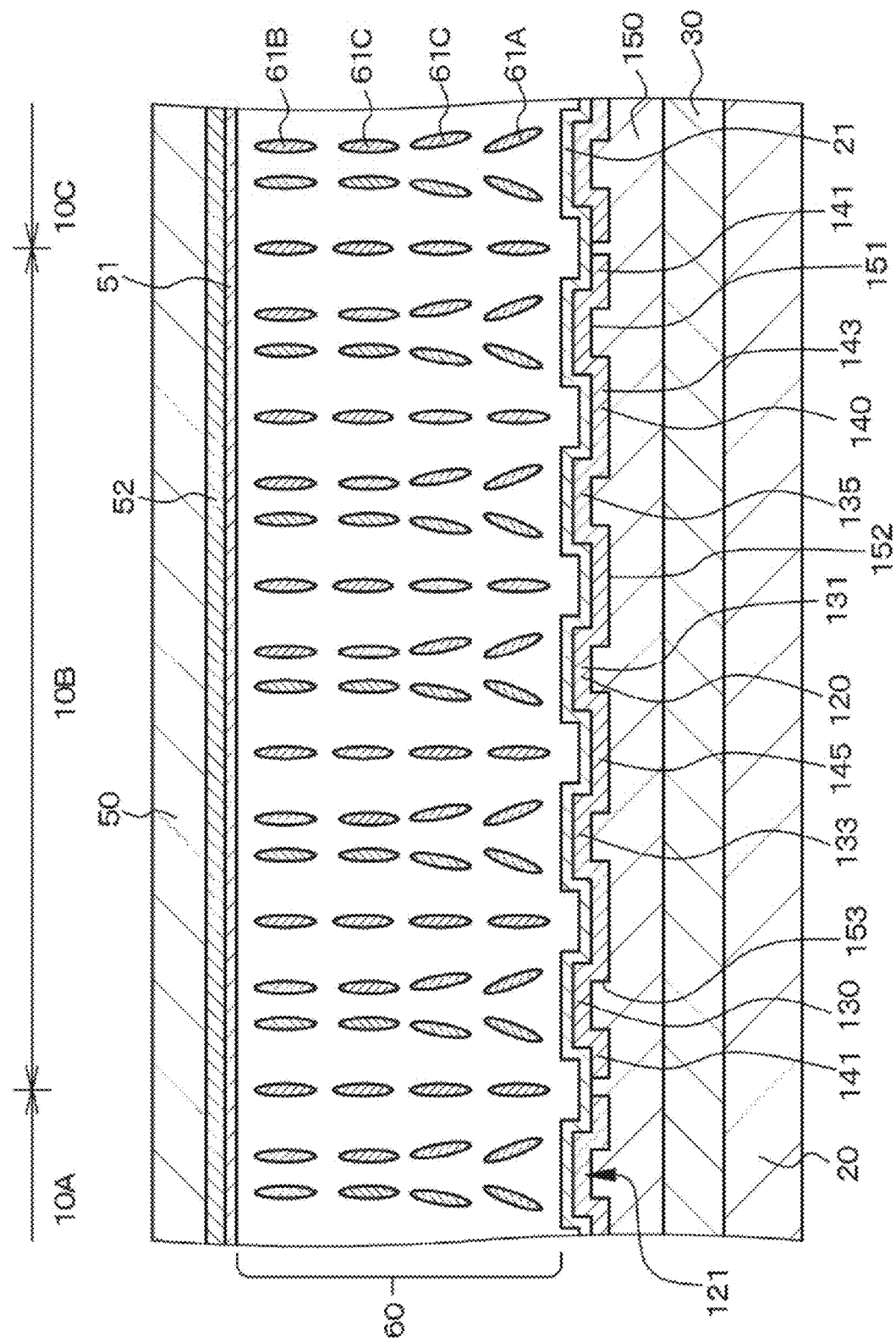
FIG. 1 is a schematic partial cross-sectional view of a liquid crystal display of a first work example.

In the following, the present disclosure will be described with reference to the drawing on the basis of work examples, but note that the present disclosure is not limited to the work examples and various values and materials in the work examples are just examples. Note that the description will be provided in the following order.
1. Description for Liquid Crystal Displays According to First to Fourth Aspects of Present Disclosure and General Information
2. First Work Example (Liquid Crystal Displays According to First Aspect and First-A Aspect of Present Disclosure)
3. Second Work Example (Liquid Crystal Displays According to Modification of First Work Example and First-B Aspect of Present Disclosure)
4. Third Work Example (Liquid Crystal Displays According to Second Aspect and Third Aspect of Present Disclosure)
5. Fourth Work Example (Liquid Crystal Display According to Fourth Aspect, Fourth-A aspect, Fifth Aspect, and Fifth-A Aspect of Present Disclosure)
6. Fifth Work Example (Liquid Crystal Displays According to Modification of Fourth Work Example, Fourth-B Aspect, and Fifth-B Aspect of Present Disclosure)
7. Sixth Work Example (Liquid Crystal Displays According to Modification of Fourth to Fifth Work Examples, Fourth-C Aspect, and Fifth-C Aspect of Present Disclosure)
8. Seventh Work Example (Liquid Crystal Displays According to Modification of Fourth to Fifth Work Examples, Fourth-D Aspect, and Fifth-D Aspect of Present Disclosure)
9. Eighth Work Example (Liquid Crystal Displays According to Modification of Fourth to Sixth Work Examples, Fourth-E Aspect, and Fifth-E Aspect of Present Disclosure)
10. Ninth Work Example (Modification of First Work Example, Third Work Example, and Fourth Work Example)
11. Tenth Work Example (Modification of First to Fifth Work Examples)
12. Eleventh Work Example (Liquid Crystal Displays According to Modification of First to Tenth Work Examples and Sixth Aspect of Present Disclosure)
13. Twelfth Work Example (Liquid Crystal Displays According to Modification of First to Eleventh Work Examples and Seventh Aspect of Present Disclosure)
14. Thirteenth Work Example (Modification of First Work Example and Fourth Work Example)
15. Fourteenth Work Examples (Modification of First to Thirteenth Work Examples)

[Description for Liquid Crystal Displays According to First to Fifth Aspects of Present Disclosure and General Information]

In a liquid crystal display according to a first aspect of the present disclosure, all of first transparent conductive material layers are connected and all of second transparent conductive material layers are connected inside a pixel. Further, in liquid crystal displays according to second to fifth aspects of the present disclosure, a first transparent conductive material layer formed on a trunk projecting portion is connected to a power feeding unit.

Furthermore, in the liquid crystal display according to the first aspect of the present disclosure, it may be possible to have a configuration in which
a projecting portion is formed of a trunk projecting portion that passes a pixel center portion and radially extends (for example, in a cross shape), and a plurality of branch projecting portions that extends from the trunk projecting portion toward a pixel peripheral portion, and
a recessed portion is formed of a trunk recessed portion that is formed in a pixel peripheral portion in a frame-like shape and surrounds the projecting portion, and a branch recessed portion that extends from the trunk recessed portion and is located between a branch projecting portion and a branch projecting portion. Note that such a configuration may be conveniently referred to as "liquid crystal display according to a first-A aspect of the present disclosure".

Alternatively, in the liquid crystal display according to the first aspect of the present disclosure, it may be possible to have a configuration in which
the projecting portion is formed of a trunk projecting portion formed in the pixel peripheral portion in a frame-like shape, and a plurality of branch projecting portions that extends from the trunk projecting portion toward inside of the pixel, and
the recessed portion is formed of a trunk recessed portion that passes the pixel center portion and radially extends (for example, in a cross shape), and a branch recessed portion that extends from the trunk recessed portion toward the pixel peripheral portion and is located between a branch projecting portion and a branch projecting portion. Note that such a configuration may be conveniently referred to as "liquid crystal display according to a first-B aspect of the present disclosure".

In the liquid crystal display according to the first aspect of the present disclosure including the various preferable kinds of configurations described above, it may be possible to have a constitution in which a first power feeding unit and a second power feeding unit are common, and in this case, it may be possible to have a constitution in which the common first power feeding unit and second power feeding unit are provided in the pixel peripheral portion. Alternatively, it may be possible to have a constitution in which the first power feeding unit is provided in the pixel center portion and the second power feeding unit is provided in the pixel peripheral portion. Alternatively, it may be possible to have a constitution in which the first power feeding unit and the second power feeding unit are provided in the pixel peripheral portion.

In the liquid crystal display according to the first aspect of the present disclosure, it may be possible to have a configuration in which a first transparent conductive material layer formed on a projecting portion top surface and a second transparent conductive material layer formed on a recessed portion bottom surface are at least partly connected inside the pixel. In the liquid crystal displays according to the second aspect or the fourth aspect of the present disclosure, it may be possible to have a configuration in which a width of the recessed portion becomes narrowest at a portion where the recessed portion starts extending from the trunk projecting portion. In other words, the narrowest portion corresponds to the portion where the recessed portion starts extending from the trunk projecting portion. In the liquid crystal displays according to the third aspect or the fifth aspect of the present disclosure, it may be possible to have a configuration in which a level difference between the recessed portion and the projecting portion is smallest at a portion where the recessed portion starts extending from the trunk projecting portion.

In the liquid crystal display according to the first aspect of the present disclosure or the liquid crystal displays according to the second to fifth aspects of the present disclosure including the various preferable kinds of configurations described above,
in the case of assuming a (X, Y) coordinate system in which straight lines passing the pixel center portion and parallel to the pixel peripheral portion are set as an X-axis and a Y-axis respectively, it may be possible to have a configuration in which
a plurality of branch projecting portions occupying a first quadrant extends in parallel in a direction in which a value of the Y-coordinate increases when a value of the X-coordinate increases,
a plurality of branch projecting portions occupying a second quadrant extends in parallel in a direction in which the value of the Y-coordinate increases when the value of the X-coordinate decreases,
a plurality of branch projecting portions occupying a third quadrant extends in parallel in a direction in which the value of the Y-coordinate decreases when the value of the X-coordinate decreases, and
a plurality of branch projecting portions occupying a fourth quadrant extends in parallel in a direction in which the value of the Y-coordinate decreases when the value of the X-coordinate increases. Such an arrangement state of the branch projecting portions is referred to as a multi-domain electrode structure, and viewing angle characteristics can be improved because regions formed with the branch projecting portions having different extending directions are formed inside one pixel. The same is applied to the following description.

Moreover, it is preferable to have a configuration in which the plurality of branch projecting portions occupying the first quadrant extends forming a 45-degree angle between axial lines and the X-axis, the plurality of branch projecting portions occupying the second quadrant extends forming a 135-degree angle between axial lines thereof and the X-axis, the plurality of branch projecting portions occupying the third quadrant extends forming a 225-degree angle between axial lines thereof and the X-axis, and the plurality of branch projecting portions occupying the fourth quadrant extends forming a 315-degree angle between axial lines thereof and the X-axis. However, there is no limitation to these values (angles). The same is applied to the following.

In the liquid crystal displays according to the fourth aspect and the fifth aspect of the present disclosure, it may be possible to have a configuration in which the projecting portion further includes a second trunk projecting portion that passes the pixel center portion from the trunk projecting portion, radially extends (for example, in a cross shape), and is connected to a branch projecting portion. Meanwhile, such a configuration may be referred to as "liquid crystal display according to a fourth-A aspect of the present disclosure" and "liquid crystal display according to a fifth-A aspect of the present disclosure". It may be possible to have a configuration in which the width of the recessed portion becomes narrowest also at a portion where the recessed portion starts extending from the second trunk projecting portion.

Alternatively, in the liquid crystal displays according to the fourth aspect and the fifth-A aspect of the present disclosure, it may be possible to have a configuration in which a recessed portion is formed of a trunk recessed portion that passes the pixel center portion and radially extends (for example, in a cross shape), and a branch recessed portion that extends from the trunk recessed portion to the trunk projecting portion and is located between a branch projecting portion and a branch projecting portion. Meanwhile, such a configuration may be referred to as "liquid crystal display according to a fourth-B aspect of the present disclosure" and "liquid crystal display according to a fifth-B aspect of the present disclosure".

In the liquid crystal displays according to the fourth aspect and the fifth aspect of the present disclosure including the liquid crystal displays according to the fourth-A aspect, fourth-B aspect, fifth-A aspect, and the fifth-B aspect of the present disclosure described above, in the case of assuming the (X, Y) coordinate system in which the straight lines passing the pixel center portion and parallel to the pixel peripheral portion are set as the X-axis and the Y-axis respectively, it may be possible to have a configuration in which
a plurality of branch projecting portions occupying the first quadrant extends in parallel in a direction in which a value of the Y-coordinate increases when a value of the X-coordinate increases,
a plurality of branch projecting portions occupying the second quadrant extends in parallel in a direction in which the value of the Y-coordinate increases when the value of the X-coordinate decreases,
a plurality of branch projecting portions occupying the third quadrant extends in parallel in a direction in which the value of the Y-coordinate decreases when the value of the X-coordinate decreases, and a plurality of branch projecting portions occupying the fourth quadrant extends in parallel in a direction in which the value of the Y-coordinate decreases when the value of the X-coordinate increases.

Alternatively, in the liquid crystal displays according to the fourth aspect and the fifth aspect of the present disclosure, in the case of assuming the (X, Y) coordinate system in which the respective straight lines passing the pixel center portion and parallel to the pixel peripheral portion are set as the X-axis and the Y-axis, it may be possible to have a configuration in which a plurality of branch projecting portions occupying the first quadrant extends in parallel in a direction in which a value of the Y-coordinate increases when a value of the X-coordinate increases, a plurality of branch projecting portions occupying the second quadrant extends in parallel in a direction in which the value of the Y-coordinate increases when the value of the X-coordinate decreases, a plurality of branch projecting portions occupying the third quadrant extends in parallel in a direction in which the value of the Y-coordinate decreases when the value of the X-coordinate decreases, a plurality of branch projecting portions occupying a fourth quadrant extends in parallel in a direction in which the value of the Y-coordinate decreases when the value of the X-coordinate increases, the branch projecting portion extending from the trunk projecting portion in parallel to the X-axis and occupying the first quadrant and the branch projecting portion extending from the trunk projecting portion in parallel to the X-axis and occupying the fourth quadrant are formed in a connected state, the branch projecting portion extending from the trunk projecting portion in parallel to the Y-axis and occupying the first quadrant and the branch projecting portion extending from the trunk projecting portion in parallel to the Y-axis and occupying the second quadrant are formed in a connected state;

the branch projecting portion extending from the trunk projecting portion in parallel to the X-axis and occupying the second quadrant and the branch projecting portion extending from the trunk projecting portion in parallel to the X-axis and occupying the third quadrant are formed in a connected state; and the branch projecting portion extending from the trunk projecting portion in parallel to the Y-axis and occupying the third quadrant and the branch projecting portion extending from the trunk projecting portion in parallel to the Y-axis and occupying the fourth quadrant are formed in a connected state. Meanwhile, such a configuration may be referred to as "liquid crystal displays according to a fourth-C aspect of the present disclosure" and "liquid crystal display according to a fifth-C aspect of the present disclosure". In the liquid crystal displays according to the fourth-C aspect and the fifth-C aspect of the present disclosure, the second trunk projecting portion and the trunk recessed portion are not provided different from the liquid crystal displays according to the fourth-A aspect, fourth-B aspect, fifth-A aspect, and fifth-B aspect of the present disclosure.

In the liquid crystal displays according to the fourth-C aspect and the fifth-C aspect of the present disclosure, it may be possible to have a constitution in which a joint portion of the two branch projecting portions is provided with a projection extending in a direction of the pixel peripheral portion. Here, the projection may have a constitution surrounded by a plurality of line segments, also a constitution surrounded by one curved line, also a constitution surrounded by a plurality of curved lines, and also a constitution surrounded by combination of a line segment and a curved line. A tip of the projection may contact the joint portion of the two branch projecting portions adjacent to each other in the direction of the pixel peripheral portion. However, a liquid crystal display having a state in which a contact portion is long corresponds to the liquid crystal displays according to the fourth-A aspect and the fifth-A aspect of the present disclosure.

Alternatively, in the liquid crystal displays according to the fourth aspect and the fifth aspect of the present disclosure, in the case of assuming the (X, Y) coordinate system in which the respective straight lines passing the pixel center portion and parallel to the pixel peripheral portion are set as the X-axis and the Y-axis, it may be possible to have a configuration in which the plurality of branch projecting portions occupying the first quadrant extends in parallel in a direction in which a value of the Y-coordinate increases when a value of the X-coordinate increases, the plurality of branch projecting portions occupying the second quadrant extends in parallel in a direction in which the value of the Y-coordinate increases when the value of the X-coordinate decreases, the plurality of branch projecting portions occupying the third quadrant extends in parallel in a direction in which the value of the Y-coordinate decreases when the value of the X-coordinate decreases, the plurality of branch projecting portions occupying a fourth quadrant extends in parallel in a direction in which the value of the Y-coordinate decreases when the value of the X-coordinate increases, the branch projecting portion extending from the trunk projecting portion in parallel to the X-axis and occupying the first quadrant and the branch projecting portion extending from the trunk projecting portion in parallel to the X-axis and occupying the fourth quadrant are not jointed, the branch projecting portion extending from the trunk projecting portion in parallel to the Y-axis and occupying the first quadrant and the branch projecting portion extending from the trunk projecting portion in parallel to the Y-axis and occupying the second quadrant are not jointed, the branch projecting portion extending from the trunk projecting portion in parallel to the X-axis and occupying the second quadrant and the branch projecting portion extending from the trunk projecting portion in parallel to the X-axis and occupying the third quadrant are not jointed, and the branch projecting portion extending from the trunk projecting portion in parallel to the Y-axis and occupying the third quadrant and the branch projecting portion extending from the trunk projecting portion in parallel to the Y-axis and occupying the fourth quadrant are not jointed. Meanwhile, such a configuration may be referred to as "liquid crystal displays according to a fourth-D aspect of the present disclosure" and "liquid crystal display according to a fifth-D aspect of the present disclosure".

Alternatively, in the liquid crystal displays according to the fourth aspect and the fifth aspect of the present disclosure, in the case of assuming the (X, Y) coordinate system in which the respective straight lines passing the pixel center portion and parallel to the pixel peripheral portion are set as the X-axis and the Y-axis, it may be possible to have a configuration in which the plurality of branch projecting portions occupying the first quadrant extends in parallel in a direction in which a value of the Y-coordinate increases when a value of the X-coordinate increases, the plurality of branch projecting portions occupying the second quadrant extends in parallel in a direction in which the value of the Y-coordinate increases when the value of the X-coordinate decreases, the plurality of branch projecting portions occupying the third quadrant extends in parallel in a direction in which the value of the Y-coordinate decreases when the value of the X-coordinate decreases, the plurality of branch projecting portions occupying a fourth quadrant extends in parallel in a direction in which the value of the Y-coordinate decreases when the value of the X-coordinate increases, the branch projecting portion extending from the trunk projecting portion in parallel to the X-axis and occupying the first quadrant and the branch projecting portion extending from the trunk projecting portion in parallel to the X-axis and occupying the fourth quadrant are formed in a deviated state, the branch projecting portion extending from the trunk projecting portion in parallel to the Y-axis and occupying the first quadrant and the branch projecting portion extending from the trunk projecting portion in parallel to the Y-axis and occupying the second quadrant are formed in a deviated state, the branch projecting portion extending from the trunk projecting portion in parallel to the X-axis and occupying the second quadrant and the branch projecting portion extending from the trunk projecting portion in parallel to the X-axis and occupying the third quadrant are formed in a deviated state, and the branch projecting portion extending from the trunk projecting portion in parallel to the Y-axis and occupying the third quadrant and the branch projecting portion extending from the trunk projecting portion in parallel to the Y-axis and occupying the fourth quadrant are formed in a deviated state. Meanwhile, such a configuration may be referred to as "liquid crystal displays according to a fourth-E aspect of the present disclosure" and "liquid crystal display according to a fifth-E aspect of the present disclosure".

By thus forming the branch projecting portion and the branch projecting portion are formed in the state non-jointed or deviated state, an electrical field generated by the first electrode at the pixel center is distorted in a desired manner in the vicinity of the pixel center, and a falling direction of a liquid crystal molecule is determined. Furthermore, as a result thereof, orientation control force relative to the liquid crystal molecule in the vicinity of the pixel center can be enhanced, and a tilting state of the liquid crystal molecule in the vicinity of the pixel center can be surely determined. Thus, at the time of manufacturing the liquid crystal display, time required to stabilize orientation of the liquid crystal molecule exposed to a desired electrical field can be shortened although a liquid crystal layer is exposed to the desired electrical field in order to provide a pretilt angle to the liquid crystal molecule. In other words, the pretilt angle can be provided to the liquid crystal molecule in a short time, and manufacturing time of the liquid crystal display can be shortened.

In the liquid crystal displays according to the fourth-E aspect and the fifth-E aspect of the present disclosure, in the case of assuming a forming pitch of the branch projecting portions along the X-axis is $P_X$ and assuming a forming pitch of the branch projecting portions along the Y-axis is $P_Y$, it is preferable to have a configuration in which the branch projecting portion extending from the trunk projecting portion in parallel to the X-axis and occupying the first quadrant and the branch projecting portion extending from the trunk projecting portion in parallel to the X-axis and occupying the fourth quadrant are formed in a state deviated from each other by $P_X/2$, the branch projecting portion extending from the trunk projecting portion in parallel to the Y-axis and occupying the first quadrant and the branch projecting portion extending from the trunk projecting portion in parallel to the Y-axis and occupying the second quadrant are formed in a state deviated from each other by $P_Y/2$, the branch projecting portion extending from the trunk projecting portion in parallel to the X-axis and occupying the second quadrant and the branch projecting portion extending from the trunk projecting portion in parallel to the X-axis and occupying the third quadrant are formed in a state deviated from each other by $P_X/2$, and the branch projecting portion extending from the trunk projecting portion in parallel to the Y-axis and occupying the third quadrant and the branch projecting portion extending from the trunk projecting portion in parallel to the Y-axis and occupying the fourth quadrant are formed in a state deviated from each other by $P_Y/2$.

Furthermore, in the liquid crystal displays according to the fourth-C aspect, fourth-D aspect, fourth-E aspect, fifth-C aspect, fifth-D aspect, and fifth-E aspect of the present disclosure, a portion of the branch projecting portion extending in parallel to the X-axis or a portion of the branch projecting portion extending in parallel to the Y-axis does not exist, or even in the case of existing, a length thereof is extremely short. Therefore, orientation directions of the liquid crystal molecules can be made to conform to the extending directions of the branch projecting portions as much as possible, and generation of dark lines in regions corresponding to the X-axis and Y-axis can be suppressed. As a result, it is possible to provide a liquid crystal display that can achieve more uniform and high light transmissivity. Moreover, it is possible to provide the liquid crystal display having a constitution and a structure capable of providing a liquid crystal molecule with a pretilt angle in a short time.

In the liquid crystal displays according to the first to fifth aspects of the present disclosure including the various kinds of preferable configurations and constitutions described above, it may be possible to have a configuration in which a transparent conductive material layer is further formed on at least a part of a side surface of the foundation layer that connects the projecting portion top surface to the recessed portion bottom surface of the foundation layer.

Moreover, in the liquid crystal displays according to the first to fifth aspects of the present disclosure including the various kinds of preferable configurations and constitutions described above, it may be possible to have a configuration in which a black matrix is provided and a projection image at a portion of the first substrate located between a pixel and a pixel, a projection image in the pixel peripheral portion, and a projection image in the black matrix are overlapped.

Furthermore, in the liquid crystal displays according to the first to fifth aspects of the present disclosure including the various kinds of preferable configurations and constitutions described above, it may be possible to have a configuration in which a first orientation film to cover the first electrode and a second orientation film to cover the second electrode are further provided, and the liquid crystal molecule is provided with a pretilt angle by making polymerizable monomer (orientation control material) constituting at least the first orientation film react while a predetermined electrical field is applied to the liquid crystal layer. Alternatively, in the liquid crystal displays according to the first to fifth aspects of the present disclosure including the various kinds of preferable configurations and constitutions described above, it may be possible to have a configuration in which a first orientation film to cover the first electrode and a second orientation film to cover the second electrode are further provided, and the liquid crystal molecule is provided with a pretilt angle by making polymerizable monomer (orientation control material) included inside the liquid crystal layer react while a predetermined electrical field is applied to the liquid crystal layer.

In the liquid crystal display according to the first-A aspect, the liquid crystal display according to the second aspect, and the liquid crystal display according to the third aspect of the present disclosure, the trunk projecting portion passes the pixel center portion and radially extends (for example, in a cross shape), but specifically, the trunk projecting portion may have a configuration of extending in parallel to the X-axis and the Y-axis, for example. In the liquid crystal displays according to the fourth-A aspect of the present disclosure and the fifth-A aspect of the present disclosure, the second trunk projecting portion passes the pixel center portion from the trunk projecting portion and radially extends (for example, in a cross shape), but specifically, the second trunk projecting portion may have a configuration of extending in parallel to the X-axis and the Y-axis, for example. In the liquid crystal display according to the first-B aspect, the liquid crystal display according to the fourth-B aspect, and the liquid crystal display according to the fifth-B aspect of the present disclosure, the trunk recessed portion passes the pixel center portion and radially extends (for example, in a cross shape), but specifically, the trunk recessed portion may have a configuration of extending in parallel to the X-axis and the Y-axis, for example.

Furthermore, in these cases, when an average film thickness of the first orientation film is defined as $T_1$, and an average film thickness of the second orientation film is defined as $T_2$, $0.5 \leq T_2/T_1 \leq 1.5$ is desirably satisfied, preferably, $0.8 \leq T_2/T_1 \leq 1.2$ is satisfied. Here, an average film thickness of the orientation film is a value obtained by dividing a volume of the orientation film occupying one pixel (or one sub-pixel) by an area of one pixel (or one sub-pixel). By thus determining the value of $T_2/T_1$, in other words, by making the average film thickness of the first orientation film and the average film thickness of the second orientation film equal or almost equal, occurrence of image persistence and the like cab be surely prevented.

An exemplary minimum width of the recessed portion in the liquid crystal display according to the second aspect or the fourth aspect of the present disclosure may be 0.1 μm to 2 μm, but not limited thereto. Additionally, in the preferable configurations of the liquid crystal displays according to the third aspect or the fifth aspect of the present disclosure, a level difference between the recessed portion and the projecting portion is smallest at the portion where the recessed portion starts extending from the trunk projecting portion, for example. In other words, a depth of the recessed portion where the recessed portion starts extending from the trunk projecting portion is smallest, and the depth of the recessed portion becomes deeper and deeper as a position moves away from the trunk projecting portion. When the position moves away from the trunk projecting portion to a certain extent (such as from 20% to 80% of an entire length of the recessed portion), the depth of the recessed portion becomes constant. In the liquid crystal displays according to the third aspect or the fifth aspect of the present disclosure, as a ratio of (minimum level difference value/maximum level difference value), 0≤(minimum level difference value/maximum level difference value)≤0.5 may be exemplified, or as a minimum level difference value, 5 nm to 0.05 μm may be exemplified. Forming the narrowest portion (forming a state in which the width of the portion where the recessed portion starts extending from the trunk projecting portion is narrowest) in the liquid crystal display according to the second aspect or the fourth aspect of the present disclosure, and forming a region where the level difference between the recessed portion and the projecting portion becomes narrowest (forming a state in which the level difference between the recessed portion and the projecting portion at the portion where the recessed portion starts extending from the trunk projecting portion becomes narrowest) in the liquid crystal display according to the third aspect or the fifth aspect of the present disclosure can be achieved by a phenomenon so called a micro-loading effect or can be achieved on the basis of resolution limit design in a photo-lithography technique such as a light exposure method using a photomask having a halftone structure.

In the liquid crystal displays according to the first-A aspect, second aspect, third aspect, fourth-A aspect, and fifth-A aspect of the present disclosure, it may be possible to have a configuration in which an orientation control unit is formed at the trunk projecting portion or the portion of the second electrode corresponding to the second trunk projecting portion. By forming the orientation control unit at the trunk projecting portion or the portion of the second electrode corresponding to the second trunk projecting portion, an electrical field generated by the second electrode is distorted in the vicinity of the orientation control unit or the falling direction of the liquid crystal molecule in the vicinity of the orientation control unit is determined. As result, orientation control force relative to the liquid crystal molecule in the vicinity of the orientation control unit can be enhanced, and a tilting state of the liquid crystal molecule in the vicinity of the orientation control unit can be surely determined. Therefore, occurrence of a problem such as generation of dark lines at a portion of the image corresponding to the trunk projecting portion or the second trunk projecting portion can be surely suppressed at the time of image display. In other words, it is possible to provide the liquid crystal display capable of having more uniform and high light transmissivity while maintaining excellent voltage response characteristics. Moreover, cost for a light source constituting a back light can be reduced, low power consumption can be achieved, and reliability of a TFT can be improved.

Here, the orientation control unit may have a configuration formed of a second electrode slit structure provided at the second electrode, or may have a configuration formed of a second electrode protruding portion provided at the second electrode, or may have a constitution formed of a portion of the second electrode having a protruding shape. The second electrode protruding portion is formed of a resist material, for example, and the second electrode is not formed thereon. In order to provide the portion of the second electrode having the protruding shape, a projecting portion may be formed on a lower side of the second electrode, or the portion of the second electrode having the protruding shape may also be provided in a method of forming the projecting portion similar to the forming method of the projecting portion in the first electrode. Preferably, widths of the second electrode slit structure, second electrode protruding portion, or portion of the second electrode having the protruding shape are narrower than a width of the trunk projecting portion or the second trunk projecting portion.

Additionally, in the liquid crystal display according to the first-A aspect, first-B aspect, second aspect, third aspect, fourth-A aspect, fourth-B aspect, fourth-E aspect, fifth-A aspect, fifth-B aspect, or a fifth-E aspect of the present disclosure, it may be possible to have a configuration in which a first electrode slit structure or a first electrode protruding portion passing the pixel center portion and parallel to the pixel peripheral portion is formed in the first electrode. By forming the first electrode slit structure or the first electrode protruding portion in the first electrode passing the pixel center portion and parallel to the pixel peripheral portion, namely, by forming the first electrode slit structure or the first electrode protruding portion in the trunk projecting portion, second trunk projecting portion, and trunk recessed portion, an electrical field generated by the first electrode is distorted in the vicinity of the first electrode slit structure, or a falling direction of the liquid crystal molecule is determined in the vicinity of the first electrode protruding portion, compared to the case where a flat recessed portion without having any first electrode slit structure or the first electrode protruding portion is formed in the first electrode. As a result, orientation control force relative to the liquid crystal molecule in the vicinity of the first electrode slit structure or the first electrode protruding portion can be enhanced, and a tilting state of the liquid crystal molecule in the vicinity of the first electrode slit structure or the first electrode protruding portion can be surely determined. Therefore, at the time of image display, occurrence of a problem such as generation of dark lines at a portion of the image corresponding to the trunk projecting portion, second trunk projecting portion, and trunk recessed portion can be surely suppressed. In other words, it is possible to provide the liquid crystal display capable of having more uniform and high light transmissivity while maintaining excellent voltage response characteristics. Moreover, cost for a light source constituting a back light can be reduced, low power consumption can be achieved, and reliability of a TFT can be improved.

The first electrode protruding portion is formed of, for example, a resist material, and the first electrode is not formed thereon. Alternatively, the first electrode may have a configuration in which the projecting portion that passes the pixel center portion and is radially-shaped (for example, a cross shape) is surrounded by the recessed portion Such a radially-shaped projecting portion may be provided by radially forming a projecting portion on a lower side of the first electrode, or may be provided by a method similar to the forming method of the projecting portion in the first electrode. Alternatively, a recessed portion that passes the pixel center portion and is radially-shaped (for example, a cross shape) may be provided instead of providing the first electrode slit structure or the first electrode protruding portion (rib).

Meanwhile, the orientation control unit may also be combined with the first electrode slit structure or the first electrode protruding portion (rib).

In the liquid crystal displays according to the first to fifth aspects of the present disclosure including the preferable configurations and constitutions described above, it may be possible to have a constitution in which a projecting structure is formed from a portion of the first substrate located between a pixel and a pixel to a portion of the first substrate corresponding to the pixel peripheral portion, and a peripheral portion of the projecting portion and the recessed portion (may be collectively referred to as "uneven portion") is formed on the projecting structure. By thus forming the peripheral portion of the uneven portion on the projecting structure, a stronger electrical field is formed on the peripheral portion of the uneven portion, compared to a case where the peripheral portion of the uneven portion is flat. As a result, orientation control force relative to the liquid crystal molecule in the peripheral portion of the uneven portion can be enhanced, and a tilting state of the liquid crystal molecule in the peripheral portion of the uneven portion can be surely determined. Therefore, excellent voltage response characteristic can be maintained. The projecting structure may have a configuration formed on the basis of a black matrix formed of a known material.

Alternatively, in the liquid crystal displays according to the first to fifth aspects of the present disclosure including the preferable configurations and constitutions described above, it may be possible to have a constitution in which the width of the branch projecting portion provided at the first electrode becomes narrower toward a distal end portion. By thus forming the width of the branch projecting portion provided at the first electrode in a manner becoming narrower toward the distal end portion, generation of dark lines can be more reduced. In other words, more uniform and higher light transmissivity can be achieved, and generation of dark lines can be suppressed. It may be possible to have a configuration in which the width of the branch projecting portion is widest at a portion of the branch projecting portion jointed to the trunk projecting portion and becomes narrower toward the distal end portion from the portion jointed to the trunk projecting portion. Two side edges of the branch projecting portion facing each other and extending to the distal end portion from the portion jointed to the trunk projecting portion will be conveniently referred to as "side edges".

Furthermore, in these configurations, the branch projecting portion may have a configuration in which the width becomes linearly narrower toward the distal end portion from the portion jointed to the trunk projecting portion (configuration in which each of the side edges constituting the branch projecting portion is formed of one line segment and a change rate of the width is constant). However, not limited thereto, the branch projecting portion may have a configuration in which the width becomes narrower in a curved manner (configuration in which each of the side edges constituting the branch projecting portion is formed of one curved line and a change rate of the width is varied), or may have a configuration in which each of the side edges constituting the branch projecting portion is formed of two or more line segments or curved lines, or may have a configuration in which the width becomes narrower stepwisely (configuration in which each of the side edges constituting the branch projecting portion is formed stepwise).

In the liquid crystal displays according to the first-A aspect, second aspect, and third aspect of the present disclosure including the preferable configurations and constitutions described above, it may be possible to have a constitution in which an extending direction of a side edge portion of the trunk projecting portion not jointed to a branch projecting portion are parallel to neither the X-axis nor the Y-axis. In the liquid crystal displays according to the fourth-A aspect, fourth-E aspect, fifth-A aspect, and fifth-E aspect of the present disclosure, it may be possible to have a constitution in which the extending direction of the side edge portion of the second trunk projecting portion not jointed to a branch projecting portion are parallel to neither the X-axis nor the Y-axis. In other words, the extending direction of the side edge portion of the trunk projecting portion or the second trunk projecting portion not jointed to the branch projecting portion is different from the X-axis and the Y-axis. By adopting such a constitution, generation of dark line in regions corresponding to the X-axis and the Y-axis can be suppressed. As a result it is possible to provide the liquid crystal display capable of achieving more uniform and higher light transmissivity. Moreover, it is possible to provide the liquid crystal display having a constitution and a structure capable of providing a liquid crystal molecule with a pretilt angle in a short time.

It may be possible to have a configuration in which a side edge portion of a trunk projecting portion not jointed to a branch projecting portion is a straight line and/or a curved line, namely, a configuration of a straight line, a configuration of a curved line, or configuration of combining the straight line and the curved line. Alternatively, it may be possible to have a configuration in which a width of a portion of the trunk projecting portion not jointed to the branch projecting portion becomes narrower toward the distal end portion of the trunk projecting portion.

In the liquid crystal displays according to the first to fifth aspects of the present disclosure including the preferable configurations and constitutions described above, it may be possible to have a configuration in which a slit portion is further formed at the first electrode. In other words, the first electrode is formed with the projecting portion, recessed portion, and slit portion. In the slit portion, a transparent conductive material layer constituting the first electrode is not formed. Note that such a configuration may be conveniently referred to as "liquid crystal display according to a sixth aspect of the present disclosure". By thus providing the slit portion, an electrical field generated by the first electrode is distorted in the vicinity of the slit portion, and a falling direction of the liquid crystal molecule is firmly determined. As result, orientation control force relative to the liquid crystal molecule in the vicinity of the slit portion can be enhanced, and a tilting state of the liquid crystal molecule in the vicinity of the slit portion can be surely determined. Since not only the slit portion but also the projecting portion and the recessed portion are provided, a problem in a fine slit structure of the related art is prevented from occurring.

In the liquid crystal display according to the sixth aspect of the present disclosure, the slit portion may also be formed in a recessed region, but it is preferably to have a constitution in which the slit portion is formed in a projecting region although it depends on the constitution of liquid crystal display. Furthermore, in such a constitution, the slit portion may have a constitution provided in the projecting region including a pixel center region (center portion), or may have a constitution formed in the projecting region extending toward the pixel center region, or may have a constitution formed in the projecting region provided in a region interposed between the Y-axis and the branch projecting portion extending toward the pixel center region as a width of the slit portion, 1 μm to 4 μm, preferably, 2 μm to 3 μm may be exemplified. The same is applied to the following description for the slit portion.

Alternatively, it may also be possible to have a constitution in which the slit portion extending in parallel to the projecting portion is formed at a top portion of the projecting portion, or it may also be possible to have a constitution in which the slit portion extending in parallel to the recessed portion is formed at a bottom portion of the recessed portion Furthermore, in these cases, all of the projecting portions may be formed with the slit portions, or part of the projecting portions may be formed with the slit portions. In the case of forming the slit portion in part of the projecting portions, preferably, the slit portion is formed at the pixel center region (center portion) and a projecting portion in the vicinity thereof. Furthermore, all of the recessed portions may be formed with the slit portions, or part of the recessed portions may be formed with the slit portions. In the case of forming the slit portion in the part of the recessed portions, preferably, the slit portion is formed at the pixel center region (center portion) and a recessed portion in the vicinity thereof. Alternatively, it may be possible to have a form in which the slit portion extending in parallel to the projecting portion is formed at the top portion of the projecting portion and the slit portion extending in parallel to the recessed portion is formed at the bottom portion of the recessed portion. In this case, all of the projecting portion may be formed with the slit portions or the part of the projecting portions may be formed with the slit portions. Furthermore, all of the recessed portions may be formed with the slit portions, or part of the recessed portions may be formed with the slit portions. The first electrode is formed at a portion of a top surface of the projecting portion not provided with the slit portion, and the first electrode is formed at a portion of the bottom portion of the recessed portion no provided with the slit portion. The slit portion is required to be formed such that a projecting portion isolated from other projecting portions is not formed by the slit portion or such that a recessed portion isolated from other recessed portions is not formed by the slit portion. However, in a display device of a so-called multi-pixel drive system in which one pixel is divided into multiple regions and each of the regions is independently driven, the slit portion may be formed inside each of the regions such that the projecting portion isolated from other projecting portions is not formed by the slit portion or such that the recessed portion not to isolated from other recessed portions is not formed by the slit portion. In the case of providing the slit portion on the top surface of the projecting portion, as a width of the projecting portion and a width of the slit portion, 0.2≤(width of slit portion/width of projecting portion)≤0.8 may be exemplified. In the case of providing a bottom surface of the recessed portion, as a width of the recessed portion and the width of the slit portion, for example, 0.2≤(width of slit portion/width of recessed portion)≤0.8 may be exemplified. The same is applied to the following description for the slit portion.

Alternatively, in the liquid crystal displays according to the first to sixth aspects of the present disclosure including the preferable configurations and constitutions described above, it may be possible to have a constitution in which a dent is provided at the first electrode in the pixel center region. In other words, the projecting portion, recessed portion, and dent are formed at the first electrode. The transparent conductive material layer constituting the first electrode is formed in the dent. Note that such a constitution may be conveniently referred to as "liquid crystal display according to a seventh aspect of the present disclosure". By thus providing the dent, a liquid crystal molecule located in the vicinity of the dent becomes in a state of falling toward the pixel center. Here, the dent may have a form that becomes narrower toward the first substrate. In other words, the dent may have a constitution having a so-called forward tapered inclined plane. However, not limited thereto, the dent may also have a constitution having a vertical plane. Furthermore, in the constitution in which the dent becomes narrower toward the first substrate, the dent may have a constitutions in which an inclination angle is 5 to 60 degrees, preferably, 20 to 30 degrees. An outer edge shape of the dent may be a round shape or may also be a rectangular shape. In the latter case, an angle formed between the outer edge of the rectangular-shaped dent and the extending direction of the projecting portion (angle formed between the outer edge of the rectangular-shaped dent and the extending direction of the projecting portion where the outer edge intersects with an extending portion of the projecting portion) may be 90 degrees or may also be an acute angle. The outer edge shape of the dent is not limited thereto and may also be any shape as long as a structure that can make a liquid crystal molecule fall toward the pixel center is provided. Furthermore, it may be possible to have a constitution in which a center portion of the dent constitutes a part of a contact hole.

As average widths of the branch projecting portion and the recessed portion, 1 µm to 20 µm, preferably, 2 µm to 10 µm may be exemplified. In the case where the average widths of the branch projecting portion and the recessed portion are less than 1 µm, the branch projecting portion and the recessed portion may be hardly formed, and sufficient manufacturing yield may not be secured. On the other hand, in the case where the average widths of the branch projecting portion and the recessed portion exceed 20 µm, an appropriate oblique electric field may be hardly generated between the first electrode and the second electrode at the time of applying drive voltage to the first electrode and the second electrode. As an average width of the trunk projecting portion, $2 \times 10^{-6}$ m to $2 \times 10^{-5}$ m, preferably, $4 \times 10^{-6}$ m to $1.5 \times 10^{-5}$ m may be exemplified. As an average height from the recessed portion to the projecting portion, $5 \times 10^{-8}$ m to $1 \times 10^{-6}$ m, preferably, $1 \times 10^{-7}$ m to $5 \times 10^{-7}$ m may be exemplified. Furthermore, this enables excellent orientation control, and sufficient manufacturing yield can be secured, and also degradation of the light transmissivity and extension of a process time can be prevented.

Alternatively, as minimum widths and maximum widths of the branch projecting portion and the recessed portion, 1 µm and 25 µm, preferably, 2 µm and 20 µm may be exemplified. In the case where the minimum widths of the branch projecting portion and the recessed portion are less than 1 µm, the branch projecting portion and the recessed portion may be hardly formed, and sufficient manufacturing yield may not be secured. On the other hand, in the case where the maximum widths of the branch projecting portion and the recessed portion exceed 25 µm, an appropriate proper oblique electric field may be hardly generated between the first electrode and the second electrode at the time of applying drive voltage to the first electrode and the second electrode. As a width of the trunk projecting portion, $2 \times 10^{-6}$ m to $2 \times 10^{-5}$ m, preferably, $4 \times 10^{-6}$ m to $1.5 \times 10^{-5}$ m may be exemplified. As an average height from the recessed portion to the projecting portion, $5 \times 10^{-8}$ m to $1 \times 10^{-6}$ m, preferably, $1 \times 10^{-7}$ m to $1 \times 10^{-6}$ m, and more preferably, $2 \times 10^{-7}$ m to $6 \times 10^{-7}$ m may be exemplified. Furthermore, this enables excellent orientation control, and sufficient manufacturing yield can be secured, and also degradation of the light transmissivity and extension of a process time can be prevented.

Except for the liquid crystal displays according to the fourth-D aspect and the fifth-D aspect of the present disclosure, in the liquid crystal displays according to the first to fifth aspects of the present disclosure, preferably, the branch projecting portions are line-symmetric with respect to the X-axis, and also line-symmetric with respect to the Y-axis. Alternatively, in the liquid crystal displays according to the first to fifth aspects of the present disclosure, the branch projecting portions are rotationally symmetric (point-symmetric) at 180 degrees with respect to the pixel center.

Figure 47:
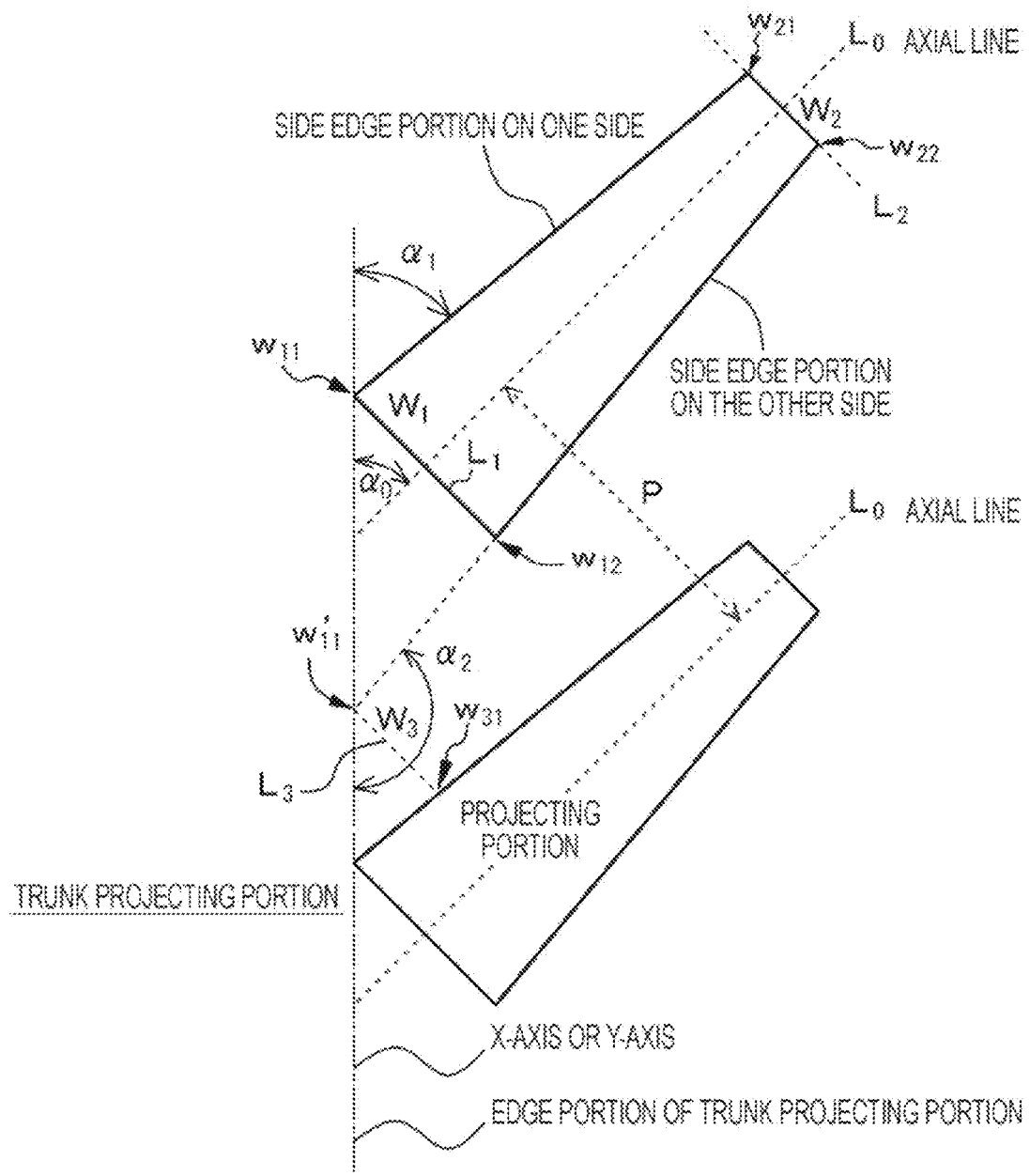
Figure 48:
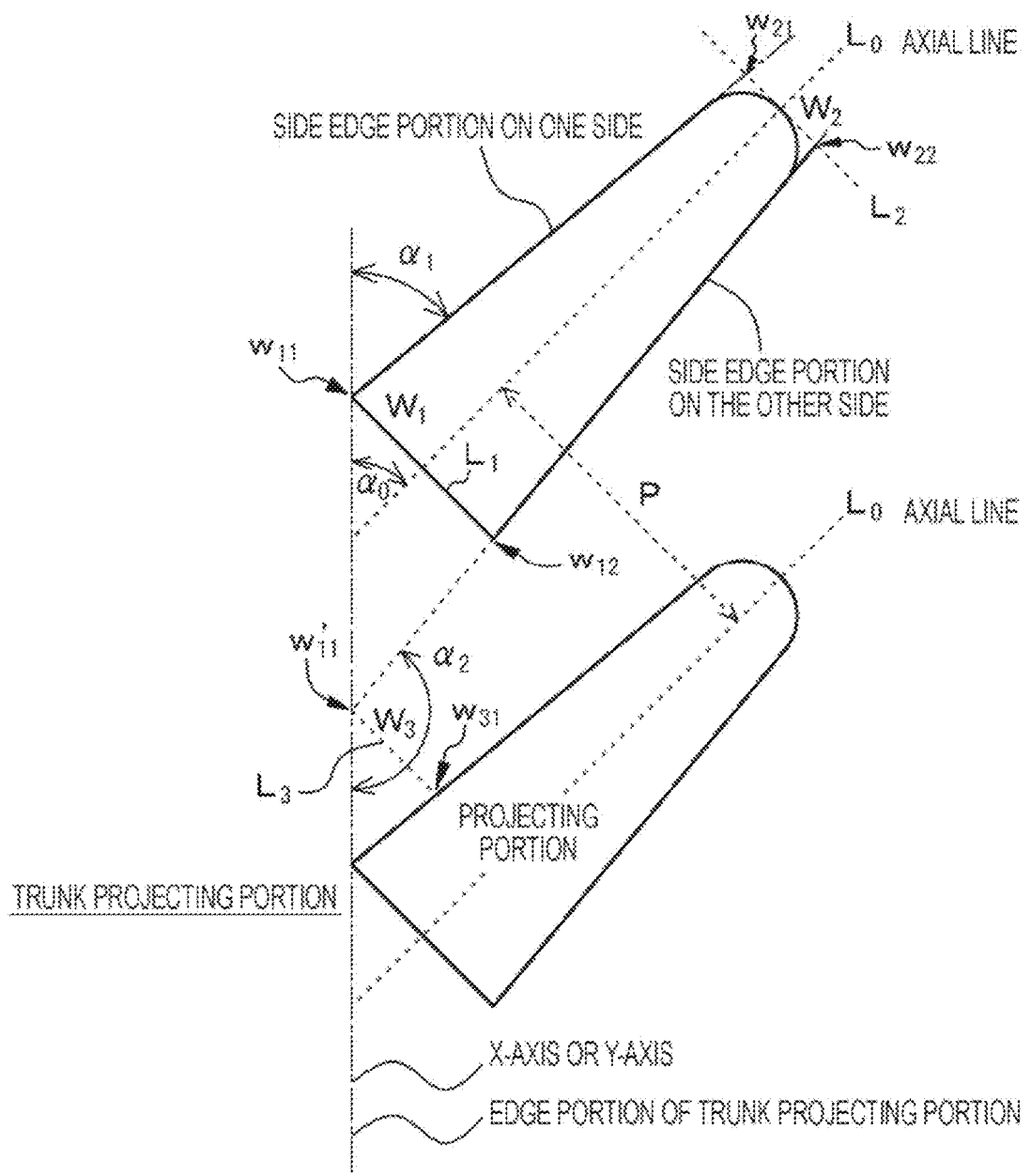

In the liquid crystal displays according to the first to seventh aspects including the preferable configurations and constitutions described above, as described above, it may be possible to have a configuration in which the width of the branch projecting portion is widest at the portion of the branch projecting portion jointed to the trunk projecting portion or the portion of the branch projecting portion at the X-axis or the vicinity thereof and at the Y-axis and the vicinity thereof (conveniently referred to "root portion of the branch projecting portion"), and the width becomes narrower toward the pixel peripheral portion, namely, the distal end portion of the branch projecting portion. Here, a forming pitch of the branch projecting portions is defined as "P", the width of the root portion of the branch projecting portion is defined as "$W_1$", and the width of the distal end portion of the branch projecting portion is defined as "$W_2$". As illustrated in FIGS. 47 and 48, in the case of defining, as $\alpha_1$, an angle formed between an edge portion of the trunk projecting portion where the branch projecting portion is jointed to the trunk projecting portion and an edge portion on one side of the branch projecting portion (side edge portion) (or an angle formed between the X-axis or the Y-axis and an edge portion on the one side of the branch projecting portion (side edge portion)), and defining, as $\alpha_2$, an angle formed between the outer edge of the trunk projecting portion where the branch projecting portion is jointed to the trunk projecting portion and a side edge portion on the other side of the branch projecting portion (or an angle formed between the X-axis or the Y-axis and a side edge portion on the other side of the branch projecting portion), an angle $\alpha_0$ formed between an axial line $L_0$ of the branch projecting portion and the outer edge of the trunk projecting portion (or an angle $\alpha_0$ formed between the axial line $L_0$ of the branch projecting portion and the X-axis or the Y-axis) in the vicinity of the outer edge of the trunk projecting portion can be expressed by: $\alpha_0 = \{\alpha_1 + (180 - \alpha_2)\}/2$. However, $0 < \alpha_1 \leq 90$ degrees, and $90 \leq \alpha_2 < 180$ degrees are satisfied. Furthermore, in this case, in the case of defining, as $w_{11}$, an intersection point between the outer edge of the trunk projecting portion and the side edge portion on the one side of the branch projecting portion (or intersection point between the X-axis or the Y-axis and the side edge portion on the one side of the branch projecting portion), defining, as $w'_{11}$, an intersection point between the X-axis or the Y-axis and the side edge portion on the other side of the branch projecting portion, and defining, as $w_{12}$, an intersection point between the side edge portion on the other side of the branch projecting portion and a straight line $L_1$ that passes the intersection point $w_{11}$ and extends orthogonal to the axial line $L_0$ of the branch projecting portion, a distance from the intersection point $w_{11}$ to the intersection point $w_{12}$ is defined as the width $W_1$ of the root portion of the branch projecting portion. In the case of defining, as $w_{21}$, an intersection point between the side edge portion on the one side of the branch projecting portion and a straight line $L_2$ corresponding to a straight line that is orthogonal to the axial line $L_0$ of the branch projecting portion and contacts the distal end portion of the branch projecting portion (or intersection point with an extending line of the side edge portion on the one side of the branch projecting portion), and defining, as $w_{22}$, an intersection point between the straight line $L_2$ and the side edge portion on the other side of the branch projecting portion (or intersection point with an extending line of the side edge portion on the other side of the branch projecting portion), a distance from the intersection point $w_{21}$ to the intersection point $w_{22}$ is defined as the width $W_2$ of the distal end portion of the branch projecting portion. Note that the extending line of the side edge portion is indicated by a dot-and-dash line in FIG. 48. Additionally, a distance between the axial lines $L_0$ of adjacent branch projecting portions is defined as a forming pitch P of the branch projecting portion. Furthermore, in the case of defining, as $w_{31}$, an intersection point at which a straight line $L_3$ that passes the intersection point $w'_{11}$ and parallel to the straight line $L_1$ intersects with the side edge portion on the one side of the branch projecting portion facing (adjacent to) the side edge portion on the other side of the branch projecting portion, a distance from the intersection point $w'_{11}$ to the intersection point $w_{31}$ is defined as a distance $W_3$ between the branch projecting portions. An entire tapered width TP of the branch projecting portion may be defined as $TP=W_1-W_2$. Additionally, an average width of the branch projecting portion $W_{ave1}$ and an average width $W_{ave2}$ of the recessed portion may be expressed by $W_{ave1}=(W_1+W_2)/2$ $W_{ave2}=P-W_{ave1}$. Here, as a value of $w_3$, 1 µm to 10 µm, preferably, 2 µm to 5 µm may be exemplified, as a value of $W_2$, 1 µm to 10 µm, preferably, 2 µm to 5 µm may be exemplified, and as a value of P, 2 µm to 20 µm, preferably, 2 µm to 10 µm may be exemplified. Furthermore, as a value of TP, 0.1 times to 10 times of $W_3$ may be exemplified. Note that these values may be applied to the branch projecting portion having the longest length.

The second aspect and the third aspect of the present disclosure may be combined, and the fourth aspect and the fifth aspect of the present disclosure may be combined. Additionally, the first aspect and the second aspect of the present disclosure may be combined, the first aspect and the third aspect of the present disclosure may be combined, the first aspect and the fourth aspect of the present disclosure may be combined, and the first aspect and the fifth aspect of the present disclosure may be combined.

In the liquid crystal displays according to the first to seventh aspects of the present disclosure including the various preferable kinds of configurations and constitutions described above (hereinafter, these may be simply and correctively referred to as "liquid crystal display of the present disclosure"), it may be possible to have a configuration in which a liquid crystal molecule has negative dielectric constant anisotropy.

The liquid crystal display or the liquid crystal display element of the present disclosure can be obtained by a manufacturing method of a liquid crystal display or a liquid crystal display element, including steps of;
forming a first electrode on a first substrate and forming a first orientation film on the first electrode and on a facing surface of the first substrate that faces a second substrate;
forming the second electrode on the second substrate and forming a second orientation film on the second electrode and on a facing surface of the second substrate that faces the first substrate;
arranging the first substrate and the second substrate such that the first orientation film faces the second orientation film and to seal a liquid crystal layer between the first orientation film and the second orientation film; and
orienting a liquid crystal molecule by applying a predetermined electrical field.

Furthermore, in this case, it is preferable to apply the electrical field so as to orient the liquid crystal molecule in an oblique direction relative to a surface of at least one of the pair of the substrates. Meanwhile, an azimuth angle (deviation angle) of the liquid crystal molecule when provided with a pretilt angle is determined by intensity and a direction of the electrical field, and a polar angle (zenith angle) is determined by the intensity of the electrical field. As the case may be, the azimuth angle (deviation angle) and the polar angle (zenith angle) of the liquid crystal molecule when provided with a pretilt angle may also be further determined by a molecular structure of an orientation film material.

The step of orienting the liquid crystal molecule by applying the predetermined electrical field is formed of a step in which the liquid crystal molecule is oriented and the pretilt angle is provided by making an orientation control material react while the predetermined electrical field is applied to the liquid crystal layer including the liquid crystal molecule and a polymerizable monomer (orientation control material). Such a manufacturing system of the liquid crystal display is called a polymer stabilized alignment system (PSA system). Alternatively, the step of orienting the liquid crystal molecules by applying the predetermined electrical field is formed of a step in which the liquid crystal molecule is oriented and the pretilt angle is provided by making the orientation control material react while the predetermined electrical field is applied to the liquid crystal layer in a state that an orientation film including the polymerizable monomer (orientation control material) is formed on the electrode and on the facing surface of at least one of the substrates. Such a manufacturing system of the liquid crystal display is called a field-induced photo-reactive alignment system (FPA system).

The pair of substrates is formed of a substrate including a pixel electrode and a substrate including a facing electrode, and for example, the first substrate may be the substrate including the pixel electrode and the second substrate may be the substrate including the facing electrode. A color filter layer is formed on a side of the substrate including the facing electrode (second substrate), or a color filter layer is formed on a side of the substrate including the pixel electrode (first substrate). A circuit to drive a pixel of the TFT and the like is provided on the substrate including the pixel electrode (first substrate). Meanwhile, a layer including the circuit to drive the pixel of the TFT and the like may be referred to as a "TFT layer". In the case where the color filter layer is formed on the side of the substrate including the facing electrode (second substrate), a smoothing film corresponding to the foundation layer is formed on a TFT layer, and the first electrode is formed on the smoothing film. On the other hand, in the case where the color filter layer is formed on the side of the substrate including the pixel electrode (first substrate), the color filter layer is formed on the TFT layer, and the first electrode is formed on the color filter layer (corresponding to foundation layer), or on an overcoat layer (corresponding to foundation layer) formed on the color filter layer, or a passivation film (corresponding to foundation layer) formed of an inorganic material. In the liquid crystal display, in the case where the pixel is formed of a plurality of sub-pixels, the pixel may be replaced with the sub-pixels. The first electrode and the second electrode may be formed of a transparent conductive material having transparency such as ITO (indium tin oxide), IZO, ZnO, and SnO. Further, the second electrode may be a so-called solid electrode (electrode not patterned). For example, a first polarizing plate is pasted on an outer surface of the first substrate and a second polarizing plate is pasted on an outer surface of the second substrate. The first polarizing plate and the second polarizing plate are arranged such that respective absorption axes are orthogonal to each other. It is preferable to have a configuration in which the absorption axis of the first polarizing plate is parallel to the X-axis or the Y-axis, and the absorption axis of the second polarizing plate is parallel to the Y-axis or the X-axis, but not limited thereto.

The liquid crystal display is irradiated by a known surface illumination device (backlight). The surface illumination device may be a direct type surface light source device, or an edge light type (also called a sidelight type) surface light source device. Here, the direct type surface light source device is formed of, for example, a light source arranged inside a casing, a reflection member which is arranged in a portion of the casing located under the light source and reflects emitted light from the light source upward, and a diffusion plate which is installed at a casing opening portion located above the light source and diffuses and transmits the emitted light from the light source and reflected light from the reflection member. On the other hand, the edge light type surface light source device is formed of, for example, a light guide plate and a light source arranged on the side surface of the light guide plate. A reflection member is arranged under the light guide plate, and a diffusion sheet and a prism sheet are arranged above the light guide plate. The light source includes, for example, a cold cathode fluorescent lamp, and emits white light. Alternatively, the light source is formed of, for example, a light emitting device such as an LED or a semiconductor laser device. An image can be displayed at the liquid crystal display by controlling transmission of the light from the surface illumination device (backlight) by using the liquid crystal display.

Meanwhile, depending on the orientation state of the liquid crystal molecule, the light of the surface illumination device passes through the liquid crystal layer, and a portion of an pixel where contrast of an image (light transmissivity in the liquid crystal layer) become non-uniform may be generated. In such a case, it is preferable to provide a light shielding region such that the light does not enter the portion related to the pixel. As the case may be, it may be possible to have a configuration in which a wiring layer also functions as the light shielding region.

First Work Example

Figure 2:
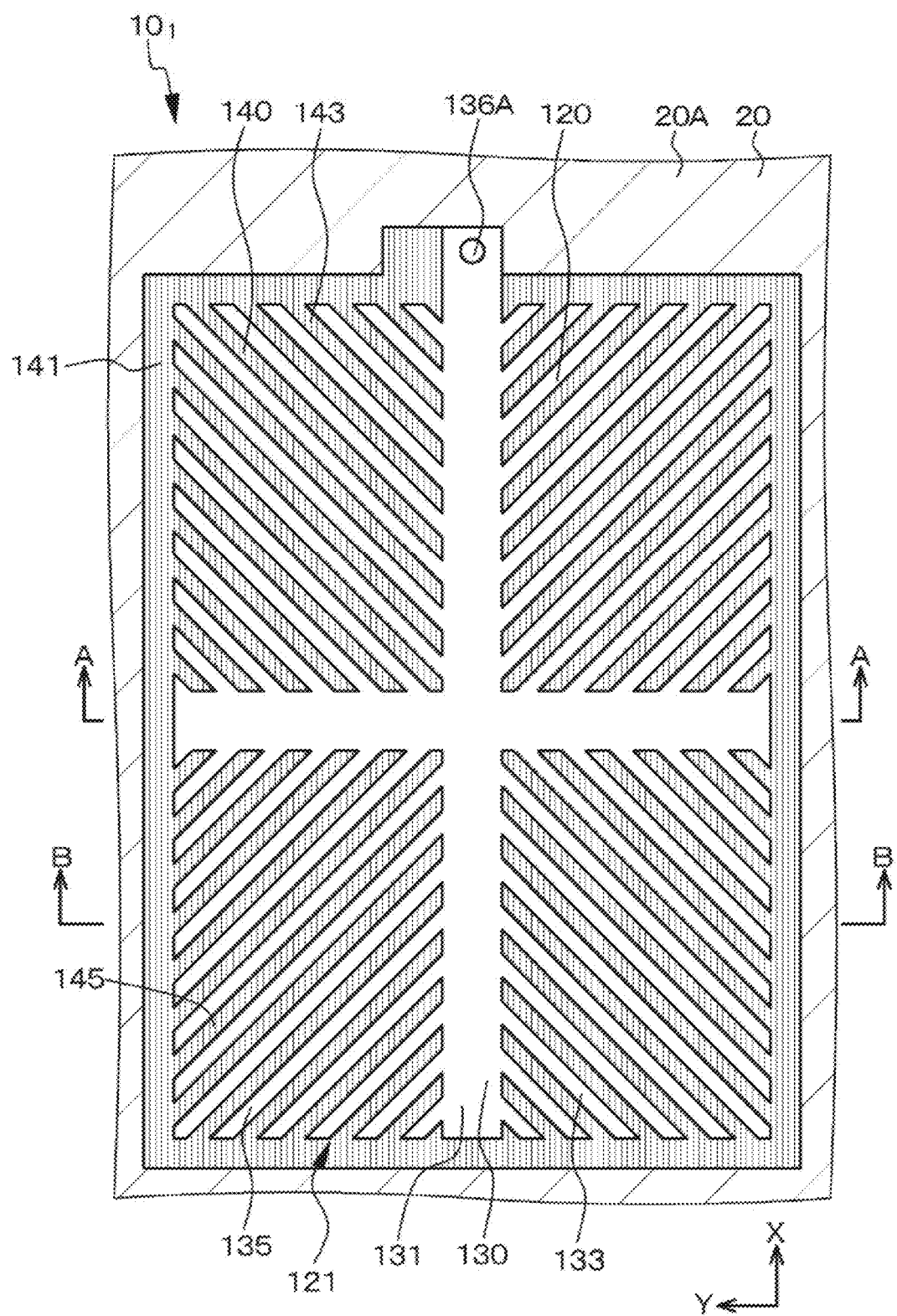
FIG. 2 is a schematic diagram of a pixel in a first substrate constituting the liquid crystal display of the first work example when viewed from above.
Figure 5A:
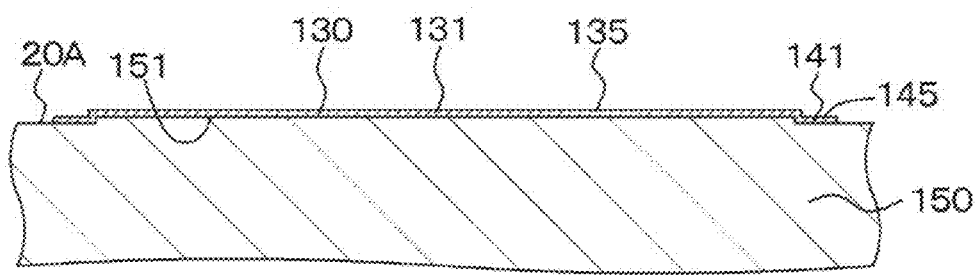
FIGS. 5A and 5B are schematic end face views of the liquid crystal display of the first work example taken along an arrow A-A and taken along an arrow B-B in FIG. 2 respectively.
Figure 5B:
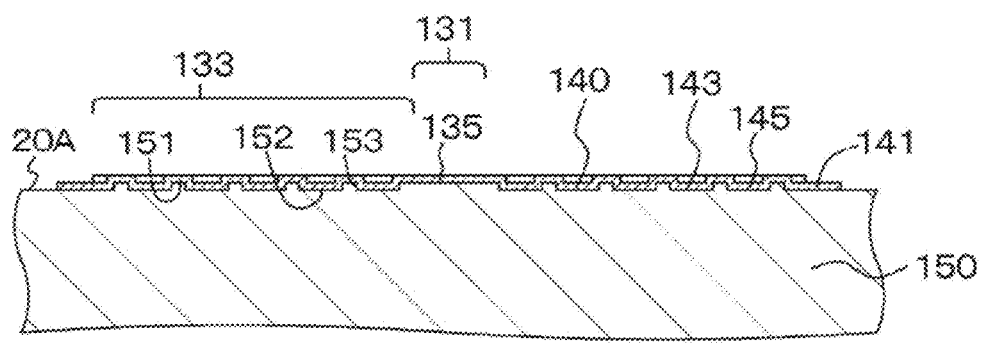
Figure 5C:
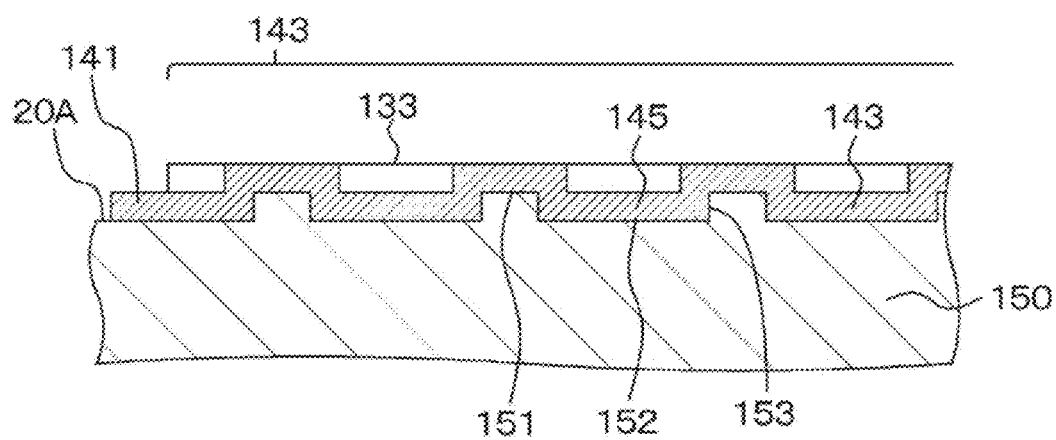
FIG. 5C is an enlarged partial cross-sectional view of a part of FIG. 5B.

A first work example relates to a liquid crystal display according to a first aspect of the present disclosure, specifically, a liquid crystal display according to a first-A aspect of the present disclosure. FIG. 1 is a schematic partial cross-sectional view of the liquid crystal display of the first work example, FIG. 2 is a schematic diagram of a pixel $10_1$ in a first substrate 20 when viewed from above, FIG. 5A is a schematic end face view taken along an arrow A-A in FIG. 2, and FIG. 5B is a schematic end face view taken along an arrow B-B in FIG. 2.

The liquid crystal display of the first work example, or the liquid crystal displays according to second to fourteenth work examples described later are liquid crystal displays formed by arraying a plurality of pixels. The pixel includes:
the first substrate 20 and a second substrate 50;
a first electrode (pixel electrode) 120 formed on a facing surface of the first substrate 20 facing the second substrate 50;
a second electrode (facing electrode) 52 formed on a facing surface of the second substrate 50 facing the first substrate 20; and
a liquid crystal layer 60 provided between the first electrode 120 and the second electrode 52 and including liquid crystal molecules 61, 61A, 61B, 61C. The liquid crystal molecule 61 is provided with a pretilt angle, and the first electrode 120 is formed of: a foundation layer 150 having a plurality of projecting portions and recessed portions; and transparent conductive material layers 135, 145. The liquid crystal molecule is at least provided with a pretilt angle on a side of the first electrode 120 and has dielectric constant anisotropy.

Furthermore, in the liquid crystal display of the first work example, the first transparent conductive material layer 135 connected to a first power feeding unit is formed on a projecting portion top surface 151 of the foundation layer 150. Furthermore, the second transparent conductive material layer 145 connected to a second power feeding unit is formed on a recessed portion bottom surface 152 of the foundation layer 150. Moreover, a transparent conductive material layer is further formed on at least a part of a side surface 153 of the foundation layer 150 that connects the projecting portion top surface 151 to the recessed portion bottom surface 152 of the foundation layer 150. A reference sign 20A is a portion of the first substrate 20 located between a pixel and a pixel. Inside the pixel, an entire portion of the first transparent conductive material layer 135 is connected, and an entire portion of the second transparent conductive material layer 145 is connected. Furthermore, inside the pixel, the first transparent conductive material layer 135 formed on the projecting portion top surface 151 is at least partly connected to the second transparent conductive material layer 145 formed on the recessed portion bottom surface 152.

In the liquid crystal display of the first work example, a projecting portion 130 is formed of: a trunk projecting portion (main projecting portion) 131 that passes a pixel center portion and extends radially (for example, in a cross shape); and a plurality of branch projecting portions (sub-projecting portions) 133 that extends toward a pixel peripheral portion from the trunk projecting portion 131. Specifically, the trunk projecting portion 131 extends, for example, in parallel to an X-axis and a Y-axis described later. On the other hand, a recessed portion 140 is formed of: a trunk recessed portion (main recessed portion) 141 that is formed in the pixel peripheral portion in a frame-like shape and surrounds the projecting portion 130; and a branch recessed portion (sub-recessed portion) 143 that extends from the trunk recessed portion 141 and is located between the branch projecting portion 133 and the branch projecting portion 133. Meanwhile, in the schematic diagram of one pixel in the first substrate 20 when viewed from above, the recessed portion is indicated by thin vertical hatching in order to clearly distinguish the projecting portion from the recessed portion. The same is applied to the following.

Figure 3:
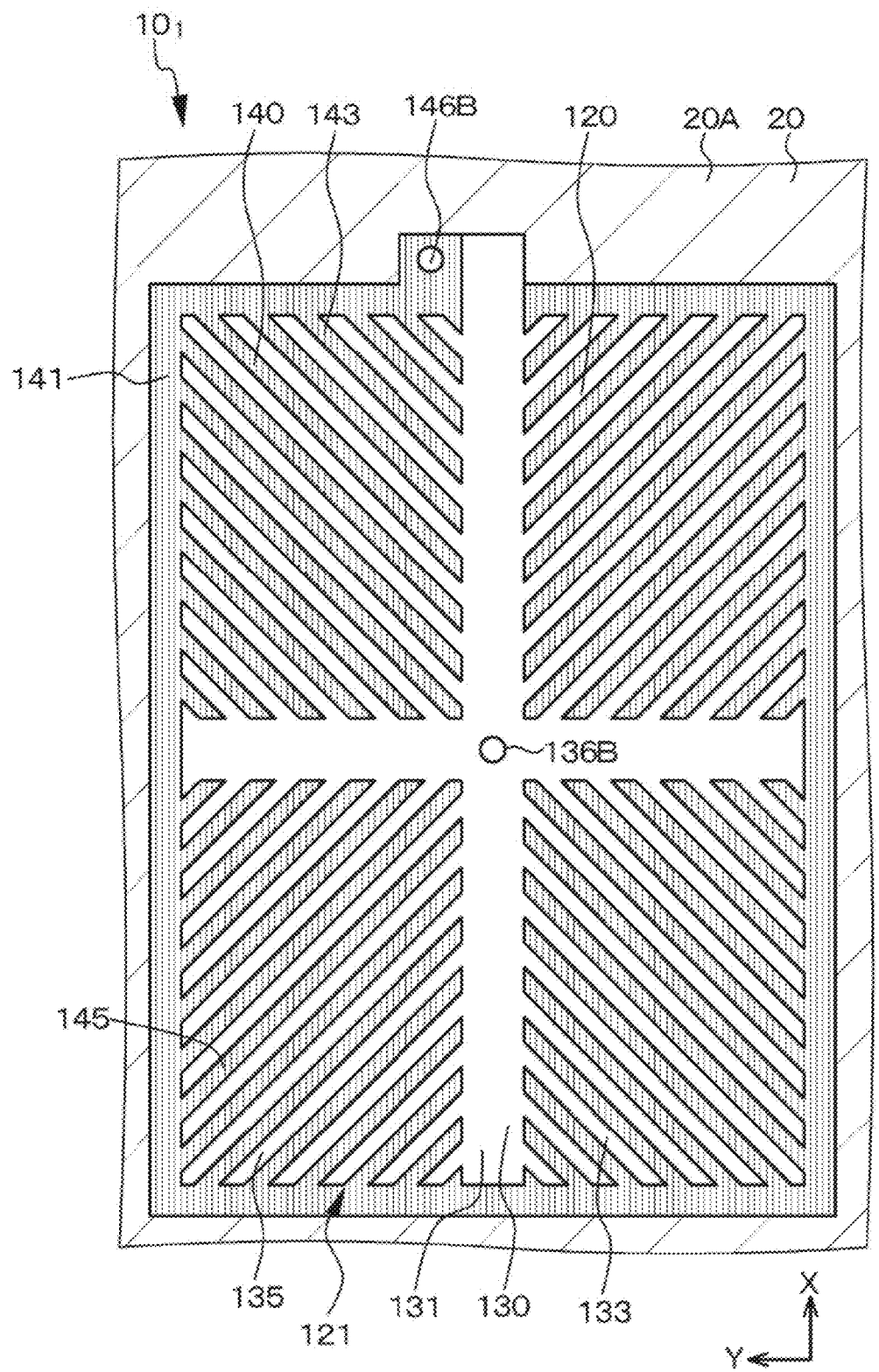
FIG. 3 is a schematic diagram of a pixel in a modified example of the first substrate constituting the liquid crystal display of the first work example when viewed from above.
Figure 4:
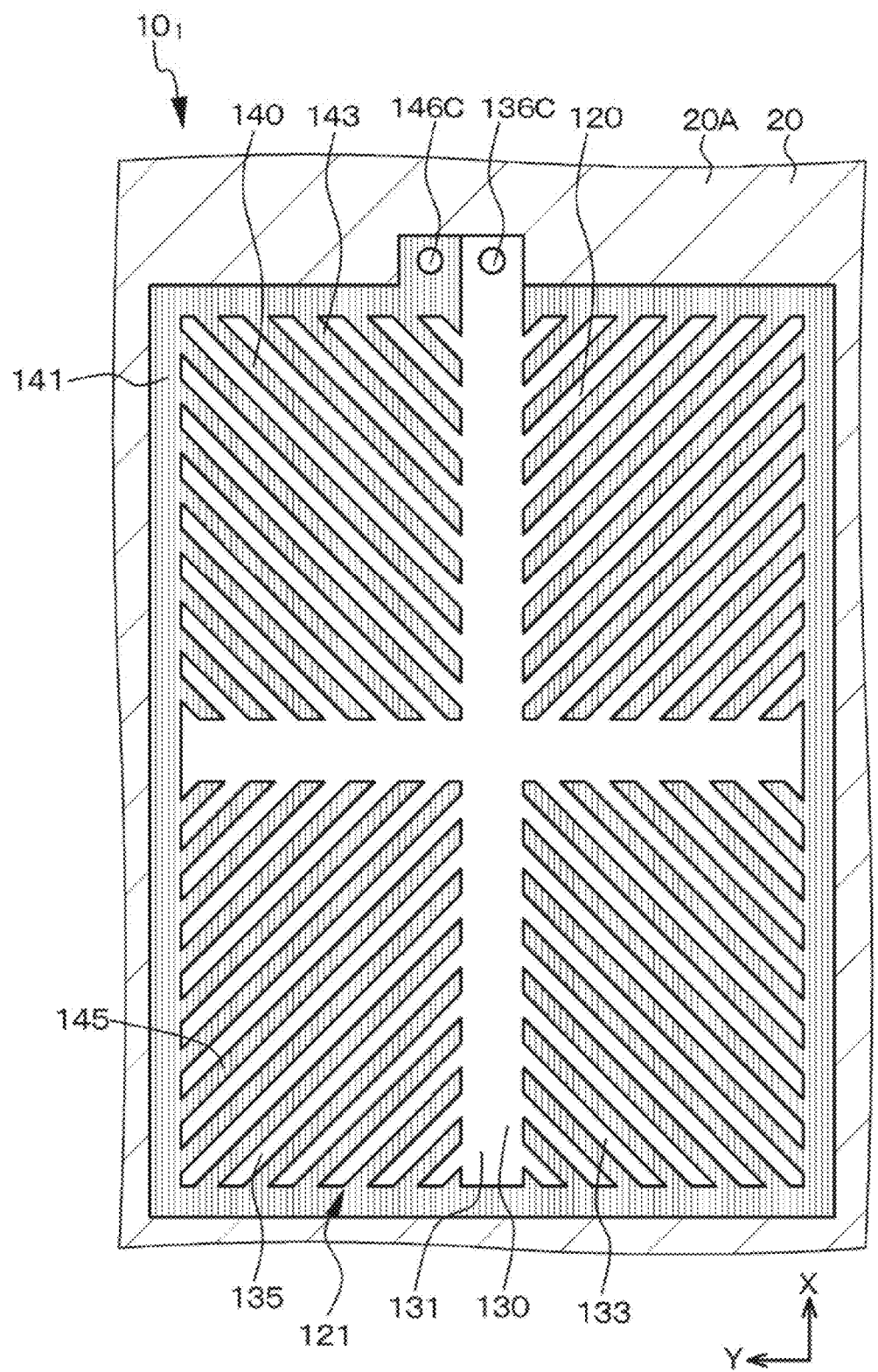
FIG. 4 is a schematic diagram of a pixel in another modified example of the first substrate constituting the liquid crystal display of the first work example when viewed from above.

In the liquid crystal display illustrated in FIG. 2, the first power feeding unit and the second power feeding unit are common, and the common power feeding unit 136A is provided at the pixel peripheral portion. Furthermore, in the liquid crystal display illustrated in FIG. 3, a first power feeding unit 136B is provided at the pixel center portion, and a second power feeding unit 146B is provided at the pixel peripheral portion. Furthermore, in the liquid crystal display illustrated in FIG. 4, a first power feeding unit 136C and a second power feeding unit 146C are separately provided at the pixel peripheral portion. These power feeding units 136A, 136B, 146B, 136C, 146C are each formed of an extending portion of a connecting hole 35 described later. Furthermore, the first power feeding unit 136B and the second power feeding unit 146B are mutually connected, and the first power feeding unit 136C and the second power feeding unit 146C are mutually connected.

In the liquid crystal display of the first work example or the liquid crystal display of the second to fifth work examples described later, in the case of assuming a (X, Y) coordinate system in which respective straight lines passing the pixel center portion and parallel to the pixel peripheral portion are set as an X-axis and a Y-axis, a plurality of branch projecting portions 133, 233, 333, 433, 533 occupying a first quadrant extends in parallel in a direction in which a value of the Y-coordinate increases when a value of the X-coordinate increases;

a plurality of branch projecting portions 133, 233, 333, 433, 533 occupying a second quadrant extends in parallel in a direction in which the value of the Y-coordinate increases when the value of the X-coordinate decreases;

a plurality of branch projecting portions 133, 233, 333, 433, 533 occupying a third quadrant extends in parallel in a direction in which the value of the Y-coordinate decreases when the value of the X-coordinate decreases; and a plurality of branch projecting portions 133, 233, 333, 433, 533 occupying a fourth quadrant extends in parallel in a direction in which the value of the Y-coordinate decreases when the value of the X-coordinate increases. By adopting such a multi-domain electrode structure, viewing angle characteristics can be improved because regions formed with the branch projecting portions having different extending directions are formed in one pixel.

Meanwhile, the plurality of branch projecting portions 133, 233, 333, 433, 533 occupying the first quadrant extends forming a 45-degree angle between axial lines thereof and the X-axis, the plurality of branch projecting portions 133, 233, 333, 433, 533 occupying the second quadrant extends forming a 135-degree angle between axial lines thereof and the X-axis, the plurality of branch projecting portions 133, 233, 333, 433, 533 occupying the third quadrant extends forming a 225-degree angle between axial lines thereof and the X-axis, and the plurality of branch projecting portions 133, 233, 333, 433, 533 occupying the fourth quadrant extends forming a 315-degree angle between axial lines thereof and the X-axis although not intended to limit thereto.

Figure 44A:
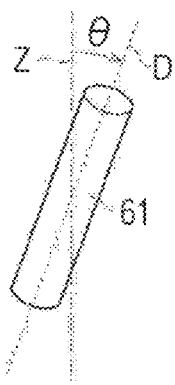
FIG. 44A is a schematic diagram to describe pretilt of a liquid crystal molecule.

The liquid crystal molecule 61 may have following categories: the liquid crystal molecule 61A held by the first orientation film 21 in the vicinity of an interface with the first orientation film 21; the liquid crystal molecule 61B held by the second orientation film 51 in the vicinity of an interface with the second orientation film 51; and the liquid crystal molecule 61C other than the mentioned liquid crystal molecules. The liquid crystal molecule 61C is located in a middle region in a thickness direction of the liquid crystal layer 60, and aligned such that a long axis direction (director) of the liquid crystal molecule 61C is substantially vertical to the first substrate 20 and the second substrate 50 when drive voltage is in an off state. Here, when the drive voltage is turned on, the director of the liquid crystal molecule 61C is oriented in a tilting manner so as to be parallel to the first substrate 20 and the second substrate 50. Such behavior is caused by a property in which dielectric constant of the long axis direction is smaller than the dielectric constant of the short axis direction in the liquid crystal molecule 61C. Since the liquid crystal molecules 61A, 61B have a similar property, basically the behavior thereof is similar to the liquid crystal molecule 61C in accordance with the on/off state of the drive voltage. However, when the drive voltage is in the off state, the liquid crystal molecule 61A is provided with a pretilt angle $\theta_1$ by the first orientation film 21 or provided with the pretilt angle $\theta_1$ by a polymerizable monomer preliminarily mixed inside liquid crystal, and the director thereof is set in a posture tilted from a normal direction of the first substrate 20 and the second substrate 50. In a similar manner, the liquid crystal molecule 61B is provided with a pretilt angle $\theta_2$ by the second orientation film 51 or provided with the pretilt angle $\theta_2$ by a polymerizable monomer preliminarily mixed inside liquid crystal, and the director thereof is set in a posture tilted from a normal direction of the first substrate 20 and the second substrate 50. Meanwhile, "held" herein means that orientation of the liquid crystal molecule 61 is controlled without fixing the liquid crystal molecules 61A, 61B to the fixing the orientation films 21, 51. Additionally, "pretilt angle $\theta$ ($\theta_1$, $\theta_2$)" indicates a tilted angle of a director D of the liquid crystal molecule 61 (61A, 61B) relative to a Z-direction when the drive voltage is in the off state in the case of defining, as Z, a direction vertical to surfaces of the first substrate 20 and the second substrate 50 (normal direction) as illustrated in FIG. 44A. The same is applied to various kinds of work examples described below.

In the liquid crystal layer 60, both of the pretilt angles $\theta_1$, $\theta_2$ have values larger than zero degrees. In the liquid crystal layer 60, the pretilt angles $\theta_1$, $\theta_2$ may be the same angle ($\theta_1 = \theta_2$) or may also be different angles ($\theta_1 \neq \theta_2$), but preferably, the pretilt angles $\theta_1$, $\theta_2$ have different angles. This improves a response speed relative to application of drive voltage more than the response speed in a case where both of the pretilt angles $\theta_1$, $\theta_2$ are zero degrees, and also it is possible to achieve contrast substantially equal to the contrast in the case where both of the pretilt angles $\theta_1$, $\theta_2$ are zero degrees. Therefore, while the response characteristics are improved, a light transmission amount at the time of black display can be reduced and the contract can be improved. In the case where the pretilt angles $\theta_1$, $\theta_2$ are set to different angles, preferably, a larger pretilt angle $\theta$ out of the pretilt angles $\theta_1$, $\theta_2$ is one degree or more and four degrees or less. By setting the larger pretilt angle $\theta$ within the above-described range, especially high effects can be obtained. The same is applied to various kinds of work examples described below.

A TFT layer 30 (details will be described later) is formed on the first substrate 20, and the foundation layer 150 formed of an organic insulation material, such as a photosensitive polymide resin or an acryl resin, and functioning also as a smoothing film is formed on the TFT layer 30, and the first electrode 120 is formed on the foundation layer 150. The foundation layer 150 may also be formed of an inorganic insulation material such as $SiO_2$, SiN, and SiON. The same may be applied to the various kinds of work examples described below.

An uneven portion can be obtained by, for example:

(a) forming a resist material layer on the smoothing film (or color filter layer) which is the foundation layer (smoothing film and color filter layer are collectively referred to as "smoothing film and the like");

(b) forming an uneven portion on the resist material layer by performing light exposure/development;

(c) forming an uneven portion on the smoothing film and the like (foundation layer) by performing etch-back for the resist material layer and the smoothing film and the like (foundation layer); and (d) forming a transparent conductive material layer on the smoothing film and the like (foundation layer) and patterning the same.

Alternatively, the uneven portion can be obtained by, for example:

(a) forming a resist material layer on the foundation layer formed on a smoothing film and the like;

(b) forming an uneven portion on the resist material layer by performing light exposure/development;

(c) forming an uneven portion on the foundation layer by performing etch-back for the resist material layer and the foundation layer; and (d) forming a transparent conductive material layer on the foundation layer and patterning the same.

Alternatively, the uneven portion can be formed by:
(a) forming an insulation material layer on a smoothing film and the like;
(b) forming a resist material layer on the insulation material layer and patterning the resist material layer;
(c) forming a foundation layer having an uneven portion by patterning the insulation material layer by using the resist material layer as a mask for etching (recessed portion bottom surface is formed of the smoothing film and the like, projecting portion is formed of the insulation material layer, and foundation layer is formed of insulation material layer and the smoothing film and the like); and
(b) forming a transparent conductive material layer on the foundation layer and patterning the same.

Alternatively, the uneven portion may be obtained by, for example, forming a projecting portion on a smoothing film by utilizing influence of a thickness of a constituent element (e.g., various kinds of signal lines, auxiliary capacitance electrode, gate electrode, source/drain electrodes, various kinds of wiring) of the liquid crystal display formed on the first substrate or above the first substrate by optimizing the thickness of the smoothing film.

The above description related to the uneven portion can be applied to the various kinds of work examples described below.

Preferably, a side surface (side wall) of the projecting portion, trunk projecting portion, or branch projecting portion is a vertical surface as much as possible, or preferably, has a reverse tapered shape.

A first polarizing plate (not illustrated) is pasted on an outer surface of the first substrate 20, and a second polarizing plate (not illustrated) is pasted on an outer surface of the second substrate 50. The first polarizing plate and the second polarizing plate are arranged such that respective absorption axes are orthogonal to each other. An absorption axis of the first polarizing plate is parallel to the X-axis or the Y-axis, and an absorption axis of the second polarizing plate is parallel to the Y-axis or the X-axis. The same is applied to the following work examples.

Additionally, a color filter layer (not illustrated) and a black matrix (not illustrated) are formed on the second substrate 50, the second electrode 52 which is a so-called solid electrode is formed thereon, and the second orientation film 51 is formed on the second electrode 52. Furthermore, a projection image at a portion of the first substrate 20 located between the pixel 10₁ and the pixel 10₁, a projection image at the pixel peripheral portion, and a projection image at the black matrix are overlapped. The same may be applied to the various kinds of work examples described later. The common power feeding unit 136A, second power feeding unit 146B, first power feeding unit 136C, and second power feeding unit 146C are located within the projection image at the black matrix.

Figure 45:
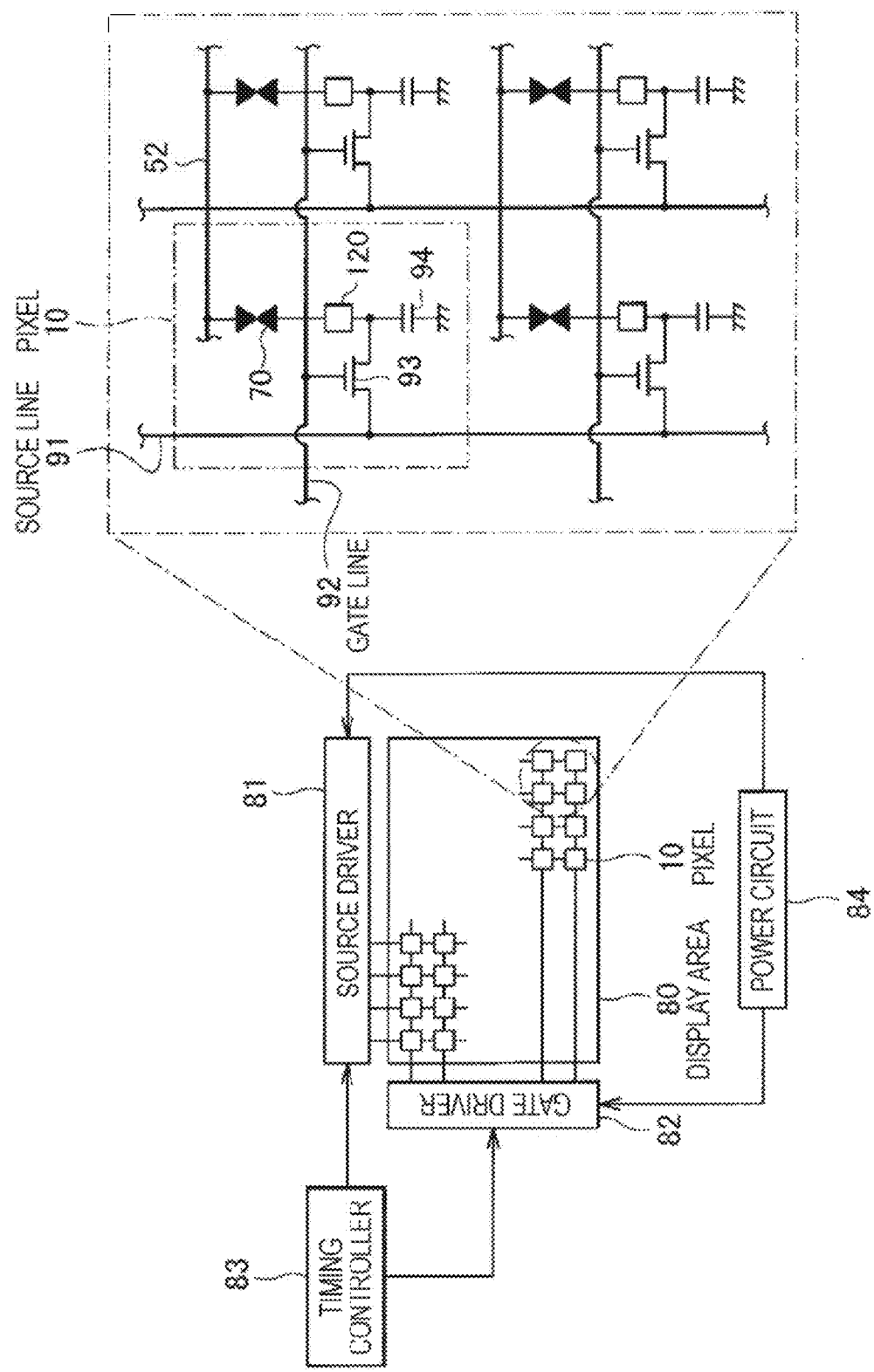
FIG. 45 is a circuit configuration diagram of the liquid crystal display illustrated in FIG. 1.

FIG. 45 illustrates a circuit configuration in the liquid crystal display illustrated in FIG. 1 or the liquid crystal displays of the various kinds of work examples described later.

As illustrated in FIG. 45, the liquid crystal display is formed by including a liquid crystal display element having a plurality of pixels 10 provided inside a display area 80. In the liquid crystal display, a source driver 81, a gate driver 82, a timing controller 83 adapted to control the source driver 81 and the gate driver 82, and a power circuit 84 adapted to supply power the source driver 81 and the gate driver 82 are provided around the display area 80.

The display area 80 is an area on which an image is displayed and also the area adapted to be able to display an image because the plurality of pixels 10 is arrayed in a matrix. Meanwhile, in FIG. 45, not only the display area 80 including the plurality of pixels 10 is illustrated but also an area corresponding to four of the pixels 10 is separately illustrated in an enlarged manner.

In the display area 80, a plurality of source lines 91 is arrayed in a row direction and also a plurality of gate lines 92 is arrayed in a column direction. The pixels 10 are arranged at respective positions where the source lines 91 and the gate lines 92 intersect with one another. Each of the pixels 10 is formed by including a TFT 93 and a capacitor 94 together with the first electrode 120 and the liquid crystal layer 60. In each TFT 93, a source electrode is connected to the source line 91, a gate electrode is connected to the gate line 92, and a drain electrode is connected to the capacitor 94 and the first electrode 120. Each of the source lines 91 is connected to the source driver 81, and an image signal is supplied from the source driver 81. Each of the gate lines 92 is connected to the gate driver 82, and a scan signal is sequentially supplied from the gate driver 82.

The source driver 81 and the gate driver 82 select a specific pixel 10 from among the plurality of pixels 10.

The timing controller 83 outputs, to the source driver 81, image signals (e.g., respective RGB image signals corresponding to red, green, and blue) and a source driver control signal in order to control operation of the source driver 81, for example. Furthermore, the timing controller 83 outputs, to the gate driver 82, a gate driver control signal in order to control operation of the gate driver 82. As the source driver control signal, a horizontal synchronization signal, a start pulse signal, a clock signal for the source driver, or the like may be exemplified. As the gate driver control signal, a vertical synchronization signal, a clock signal for the gate driver, and the like are exemplified.

In manufacturing the liquid crystal display of the first work example, first the TFT is formed on the basis of a method described below, and then the transparent conductive material layers 135, 145 made of ITO are formed on the facing surface of the first substrate 20 on which foundation layer 150 is formed. The first substrate 20 is formed of a glass substrate having a thickness of 0.7 mm.

Figure 46A:
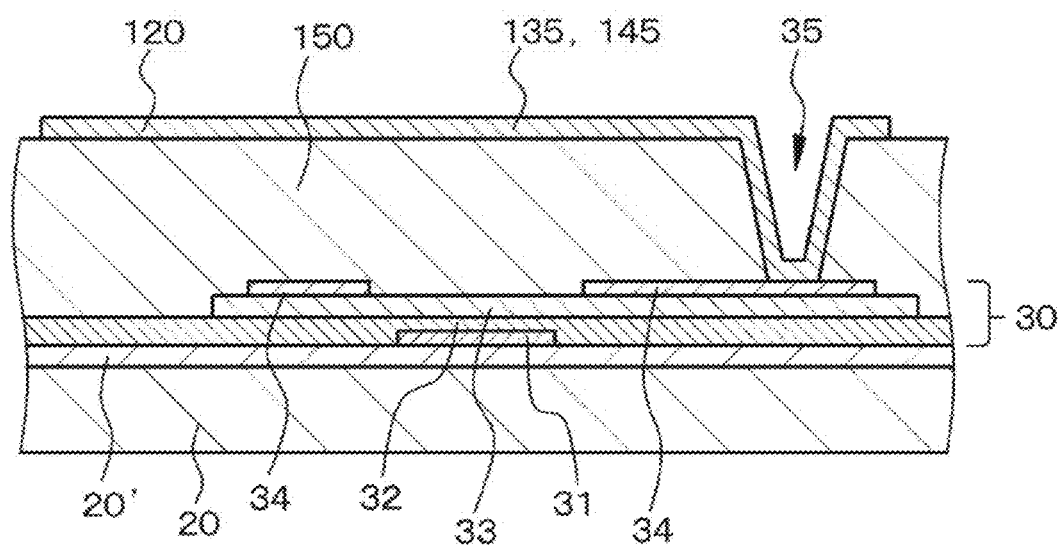
FIGS. 46A and 46B are schematic partial end face views of a first substrate on which a TFT and the like, and the first electrode are formed.

In other words, as illustrated in FIG. 46A, a gate electrode 31 is formed on an insulation film 20' formed on the first substrate 20, and a gate insulation layer 32 is formed on the gate electrode 31 and the insulation film 20'. The gate insulation layer 32 is formed of, for example, $SiO_2$, SiN, SiON, and metal oxide. Next, a semiconductor layer 33 to be a channel forming region is formed on the gate insulation layer 32, and then a source/drain electrodes 34 are formed on the semiconductor layer 33. The semiconductor layer 33 is formed of, for example, polysilicon or amorphous silicon, and the source/drain electrodes 34 is formed of metal films such as titanium, chromium, aluminum, molybdenum, tantalum, tungsten, and copper, or formed of an alloy film thereof or a stacking film thereof. Thus, the TFT layer 30 can be obtained. The above-described TFT layer 30 may be formed on the basis of a known method. Meanwhile, the TFT is not limited to a so-called bottom gate/top contact type, and a bottom gate/bottom contact type may also be applied, a top gate/top contact type may also be applied, and a top gate/bottom contact type may also be applied.

After that, the foundation layer 150 having a thickness of 2.5 μm is formed on an entire surface, and then the connecting hole 35 is formed at the foundation layer 150 located above one of the source/drain electrodes 34. A bottom portion of the connecting hole 35 is exposed to the one of the source/drain electrodes 34. Next, after the resist material layer is formed on the foundation layer 150, an uneven portion having a predetermined depth is formed on the resist material layer by performing light exposure/development. Furthermore, an uneven portion 121 is formed on the foundation layer 150 by performing etch-back for the resist material layer and the foundation layer 150.

Alternatively, after that, a smoothing film is formed on an entire surface, and then the connecting hole 35 is formed on the smoothing film located above the one of the source/drain electrodes 34. A bottom portion of the connecting hole 35 is exposed to the one of the source/drain electrodes 34. Then, an insulation material layer is formed on the smoothing film including the inside of the connecting hole 35, and additionally a resist material layer is formed on the insulation material layer. The resist material layer to form an uneven portion extends through the inside of the connecting hole 35. After that, the resist material layer is patterned by performing light exposure/development for the resist material layer. Then, the uneven portion 121 may be formed on the foundation layer 150 by removing the resist material layer by performing etching for the insulation material layer by using the resist material layer as a mask for etching. The recessed portion bottom surface 152 is formed of the smoothing film, the projecting portion is formed of the insulation material layer, and the foundation layer 150 is formed of the smoothing film and the insulation material layer. The uneven portion 121 of the foundation layer 150 extends through the inside of the connecting hole 35, and is formed up to the one of the source/drain electrodes 34 exposed to the bottom portion of the connecting hole 35.

After that, the uneven portion 121 (projecting portion 130 and recessed portion 140) can be obtained on the entire surface by forming the transparent conductive material layer 135, 145 formed of ITO and having a predetermined thickness. The transparent conductive material layers extend up to the one of the source/drain electrodes 34 exposed to the bottom portion of the connecting hole 35. Furthermore, the first electrode 120 may be provided in a matrix by patterning the transparent conductive material layers 135, 145 on the basis of a known method. Specification of the projecting portion 130, the recessed portion 140, and the like are as shown in Table 1.

On the other hand, on the second substrate 50, a color filter layer (not illustrated) is formed on the second substrate 50 made of a glass substrate having a thickness of 0.7 mm, and the second electrode 52 of a so-called solid electrode is formed on the color filter layer.

TABLE 1

| | |
|---|---|
| Average height of projecting portion | 0.4 μm |
| Forming pitch of projecting portion | 5.0 μm |
| Width of projecting portion | 2.5 μm |
| Width of recessed portion | 2.5 μm |
| Thickness of transparent conductive material layer | 0.1 μm |
| Inclination angle of side surface of branch projecting portion | 90 degrees |
| Average film thickness of first orientation film | 0.1 μm |
| Average film thickness of second orientation film | 0.1 μm |
| $T_2/T_1$ | 1 |

After that, the first orientation film 21 is formed on the first electrode 120, and the second orientation film 51 is formed on the second electrode 52. Specifically, an orientation film material is coated or printed on each of the first electrode 120 and the second electrode 52, and heating process is applied. As the orientation film material, JALS2131-R6, which is a vertical orientation film material and manufactured by JSR Corporation, is used. A temperature of the heating processing is, preferably, 80° C. or more, and more preferably, 150° C. or more and 200° C. or less. Also, a heating temperature may be changed stepwisely in the heating processing. Consequently, solvent included in the coated or printed orientation film material is evaporated, and the orientation films 21, 51 including high-molecular compounds are formed. After that, processing such as rubbing may be applied, if necessary. More specifically, as the first orientation film 21 and the second orientation film 51, the vertical orientation film material is coated on the first electrode 120 and the second electrode 52 on the basis of a spin coating method. Then, 60-minute baking is performed at 200° C. after a 80-second drying step is performed on a hot plate at 80° C., and the first orientation film 21 and the second orientation film 51 are obtained.

Next, the first substrate 20 and the second substrate 50 are arranged such that the orientation film 21 and the orientation film 51 face each other, and the liquid crystal layer 60 including the liquid crystal molecule 61 is sealed between the orientation film 21 and the orientation film 51. Specifically, spacer protruding objects adapted to secure a cell gap, such as a plastic beads each having a diameter 3.0 μm and the like, are dispersed on a surface formed with the orientation films 21, 51 on either one of the first substrate 20 and the second substrate 50, and on the other hand, a sealing portion is formed by coating an ultraviolet cured resin including a silica particle having a particle diameter of 3.5 μm to an outer edge on the second substrate 50 by, for example, a screen printing method. Then, a liquid crystal material in which a negative liquid crystal is mixed with 0.3 mass % of the polymerizable monomer (specifically, acryl monomer, A-BP-2E manufactured by Shin Nakamura Chemical Co., Ltd.) corresponding to the orientation control material is dropped and injected into a portion surrounded by the sealing portion. This kind of manufacturing method of the liquid crystal display is called a PSA method. After that, the first substrate 20 and the second substrate 50 are pasted each other, and the sealing portion is cured under the conditions such as 120° C. for one hour. Thus, the liquid crystal layer 60 is sealed. Next, voltage is applied between the first electrode 120 and the second electrode 52 by using a voltage application means. The voltage is, for example, 3 to 30 volts, specifically, a square-wave alternating electric field of 7-volt effective value voltage (60 Hz). At the same time, heating processing is applied in order to make the polymerizable monomer react although it depends on a used polymerizable monomer, or ultraviolet is emitted (for example, uniform ultraviolet of 10 J (measured at a wavelength 360 nm). Consequently, the electrical field (electric field) in a direction forming a predetermined angle relative to the surfaces of the first substrate 20 and the second substrate 50 is generated, and the liquid crystal molecule 61 is oriented in a manner tilted in a predetermined direction from the vertical direction of the first substrate 20 and the second substrate 50. In other words, an azimuth angle (deviation angle) of the liquid crystal molecule 61 at this point is determined by intensity and direction of the electrical field and the polymerizable monomer mixed inside the liquid crystal, and a polar angle (zenith angle) is determined by the intensity of the electrical field and the polymerizable monomer mixed inside the liquid crystal. Therefore, by suitably adjusting a value of the voltage, the values of the pretilt angles $\theta_1$, $\theta_2$ of the liquid crystal molecules 61A, 61B can be controlled. An oblique electric field is added between the first substrate 20 and the second substrate 50 by the uneven portion 121 formed on the first electrode 120. Also, a high-molecular layer is formed by reaction of the polymerizable monomer mixed inside the liquid crystal in the vicinity of the facing surface of the substrate. Additionally, a direction in which the liquid crystal molecule 61 is to react is determined by the high-molecular layer thus formed, and the pretilted state of the liquid crystal molecule 61 in the vicinity of the first substrate 20 and the second substrate 50 is fixed by a reaction product of the polymerizable monomer. As described above, a liquid crystal cell is completed.

On the other hand, the orientation film having a function to store the pretilt angle is coated and formed on at least one of the electrodes, and then in the FPA method in which negative liquid crystal is injected for sealing, the sealing portion is formed, and subsequently a liquid crystal material formed of the negative liquid crystal is dropped and injected into the portion surrounded by the sealing portion. Then, the first substrate 20 and the second substrate 50 are pasted each other, and the sealing portion is cured by using ultraviolet having a wavelength of 410 nm. Next, voltage is applied between the first electrode 120 and the second electrode 52 by using a voltage application means. The voltage is, for example, 3 to 30 volts, specifically, a square-wave alternating electric field of 7-volt effective value voltage (60 Hz). Consequently, the electrical field (electric field) in a direction forming a predetermined angle relative to the surfaces of the first substrate 20 and the second substrate 50 is generated, and the liquid crystal molecule 61 is oriented in a manner tilted in a predetermined direction from the vertical direction of the first substrate 20 and the second substrate 50. In other words, the azimuth angle (deviation angle) of the liquid crystal molecule 61 at this point is determined by intensity, a direction of the electrical field and a molecular structure of the orientation film material, and the polar angle (zenith angle) is determined by the intensity of the electrical field and the molecular structure of the orientation film material. Therefore, by suitably adjusting a value of the voltage, the values of the pretilt angles $\theta_1$, $\theta_2$ of the liquid crystal molecules 61A, 61B can be controlled. Then, an energy line (specifically, ultraviolet UV) such as uniform ultraviolet (measured at the wavelength 360 nm) of 10 J is emitted to the orientation films 21, 51 from, for example, the outside of the first substrate 20 while voltage is kept applied. In other words, the ultraviolet is emitted while an electrical field or a magnetic field is applied such that the liquid crystal molecule 61 is aligned in an oblique direction relative to the surfaces of the pair of the substrates 20, 50. Consequently, a crosslinkable functional group or a polymerizable functional group included in the polymerizable monomer (orientation control material) inside the orientation films 21, 51 is made to react and crosslinked. An oblique electric field is added between the first substrate 20 and the second substrate 50 by the uneven portion 121 formed on the first electrode 120. Thus, the direction in which the liquid crystal molecule 61 is to respond is stored by the high-molecular compound obtained by polymerizing the polymerizable monomer, and the pretilt angle is provided to the liquid crystal molecule 61 in the vicinity of the orientation films 21 and 51. Furthermore, as a result thereof, the liquid crystal molecules 61A, 61B located in the vicinity of the interfaces with the orientation films 21, 51 in the liquid crystal layer 60 are provided with the pretilt angles $\theta_1$, $\theta_2$ in a non-driving state. As the ultraviolet UV, ultraviolet including a large amount of optical components having a wavelength of about 295 nm to 365 nm is preferable. In the case of using ultraviolet including a large amount of optical components of a short wavelength band shorter than the mentioned wavelength band, the liquid crystal molecule 61 may be optically decomposed and deteriorated. Meanwhile, at this point, the ultraviolet UV is emitted from the outside of the first substrate 20, but the ultraviolet UV may also be emitted from the outside of the second substrate 50, or may be emitted from the outside of both substrates of the first substrate 20 and the second substrate 50. In this case, preferably, the ultraviolet UV is emitted from a side of one of the substrates having higher light transmissivity. Additionally, in the case of emitting the ultraviolet UV from the outside of the second substrate 50, crosslink reaction may become difficult because the ultraviolet is absorbed to the color filter layer depending on the wavelength band of the ultraviolet UV. Therefore, preferably, the ultraviolet is emitted from the outside of the first substrate 20 (on the side of the substrate having the pixel electrode).

As described above, the pretilt angle is provided to the liquid crystal molecule 61 by making the polymerizable monomer (orientation control material) constituting at least the first orientation film 21 react while the predetermined electrical field is kept applied to the liquid crystal layer 60 (FPA method). Alternatively, the pretilt angle is provided to the liquid crystal molecule 61 by making the polymerizable monomer (orientation control material) included in the liquid crystal layer 60 while the predetermined electrical field is kept applied to the liquid crystal layer 60 (PSA method).

In the case of setting an average film thickness of the first orientation film 21 as $T_1$ and an average film thickness of the second orientation film 51 as $T_2$, preferably $0.5 \leq T_2/T_1 \leq 1.5$ is satisfied, and desirably $0.8 \leq T_2/T_1 \leq 1.2$ is satisfied. Thus, by determining the value of $T_2/T_1$, specifically, by making the average film thickness of the first orientation film 21 and the average film thickness of the second orientation film 51 equal or almost equal, occurrence of image persistence and the like cab be surely avoided.

The liquid crystal display (liquid crystal display element) illustrated in FIG. 1, in which the liquid crystal molecules 61A on the sides of the first substrate 20 and the second substrate 50 are provided with pretilt angles, can be completed in accordance with the above-described processes. Finally, the pair of the polarizing plates (not illustrated) is pasted to the outside of the liquid crystal display such that the absorption axes thereof become orthogonal to each other. Meanwhile, the liquid crystal displays of the various kinds of work examples described later can be also manufactured by a substantially same method.

In operation of the liquid crystal display (liquid crystal display element), when drive voltage is applied to a selected pixel 10, an orientation state of the liquid crystal molecule 61 included in the liquid crystal layer 60 is changed in accordance with a potential difference between the first electrode 120 and the second electrode 52. Specifically, in the liquid crystal layer 60, the liquid crystal molecules 61A, 61B located in the vicinities of the orientation films 21, 51 is rotated and fall from a state before applying the drive voltage illustrated in FIG. 1 in an own tilting direction by applying drive voltage, and further such operation is transmitted to another liquid crystal molecule 61C. As a result, the liquid crystal molecule 61 responds so as to take a posture substantially horizontal (parallel) to the first substrate 20 and the second substrate 50. Consequently, optical characteristics of the liquid crystal layer 60 is changed, incident light to the liquid crystal display element is changed to modulated emitted light, and an image is displayed by gradation expression on the basis of this emitted light.

In this liquid crystal display, an image is displayed by applying the drive voltage between the first electrode (pixel electrode) 120 and the second electrode (facing electrode) 52 in the following procedure. Specifically, the source driver 81 receives a source driver control signal from the timing controller 83, thereby supplying an individual image signal to a predetermined source line 91 on the basis of an image signal also received from the same timing controller 83. At the same time, the gate driver 82 sequentially supplies a scan signal to the gate line 92 at predetermined timing by receipt of the gate driver control signal from the timing controller 83. Consequently, a pixel 10 located at an intersecting position between the source line 91 supplied with the image signal and the gate line 92 supplied with the scan signal is selected, and drive voltage is applied to the pixel 10.

Figure 46B:
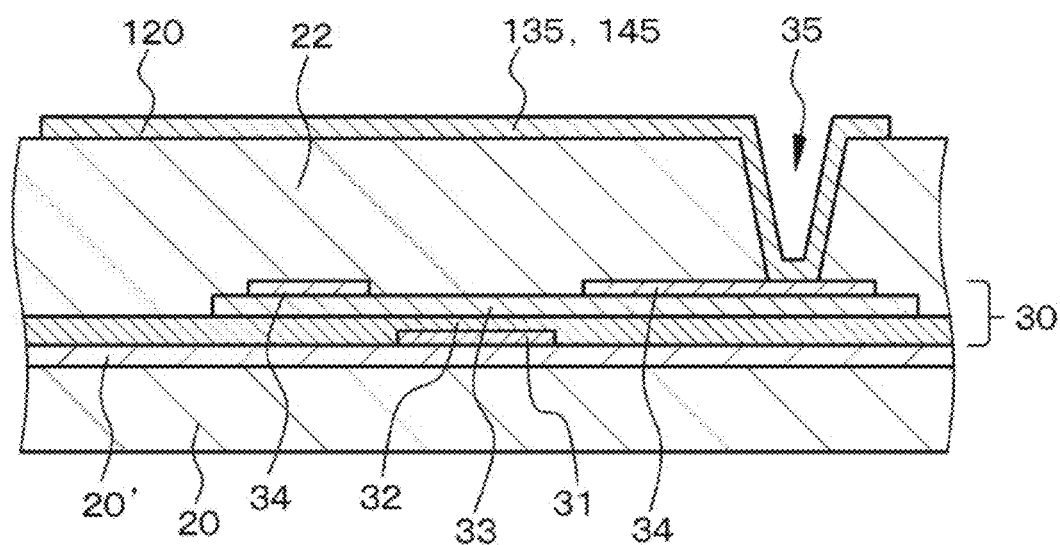

The color filter layer may also be formed on the first substrate 20. Specifically, as described above, after forming the TFT layer 30 on the first substrate 20, the color filter layer 22 is formed on the TFT layer 30 instead of the foundation layer 150 on the basis of the known method. Thus, a color filter on array (COA) structure can be obtained. Then, after forming the connecting hole 35 on the color filter layer 22 located above one of the source/drain electrodes 34, an uneven portion may be formed on the color filter layer 22 including the connecting hole 35, and additionally the first electrode 120 (transparent conductive material layers 135, 145) may be formed (refer to FIG. 46B).

In the liquid crystal display of the first work example, the first transparent conductive material layer connected to the first power feeding unit is formed on the projecting portion top surface of the foundation layer, and the second transparent conductive material layer connected to the second power feeding unit is formed on the recessed portion bottom surface of the foundation layer. Therefore, voltage can be surely applied to the first transparent conductive material layer and the second transparent conductive material layer. Therefore, quality deterioration of a displayed image can be surely prevented.

Second Work Example

Figure 6:
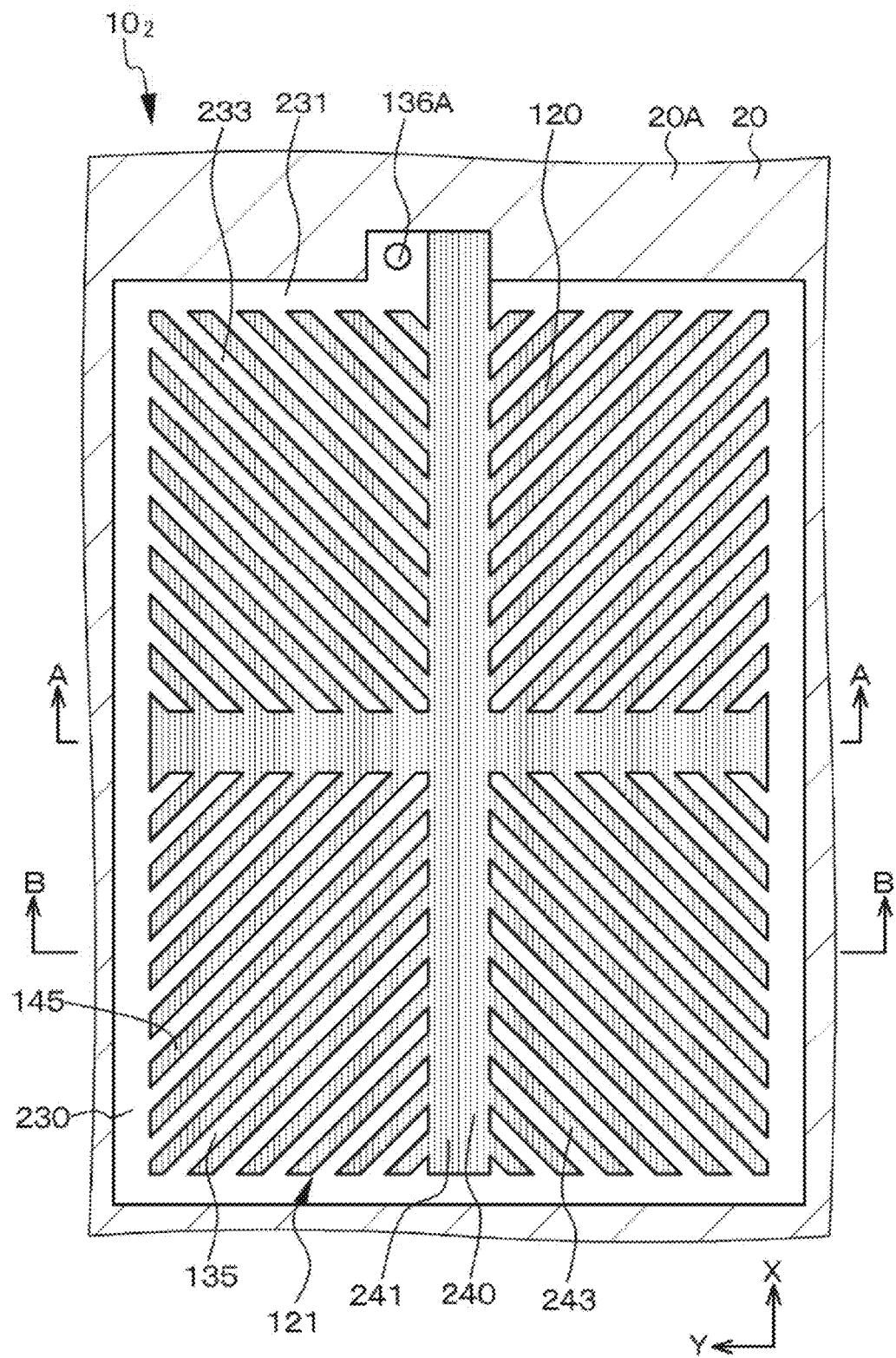
FIG. 6 is a schematic diagram of a pixel in a first substrate constituting a liquid crystal display of a second work example when viewed from above.
Figure 18A:
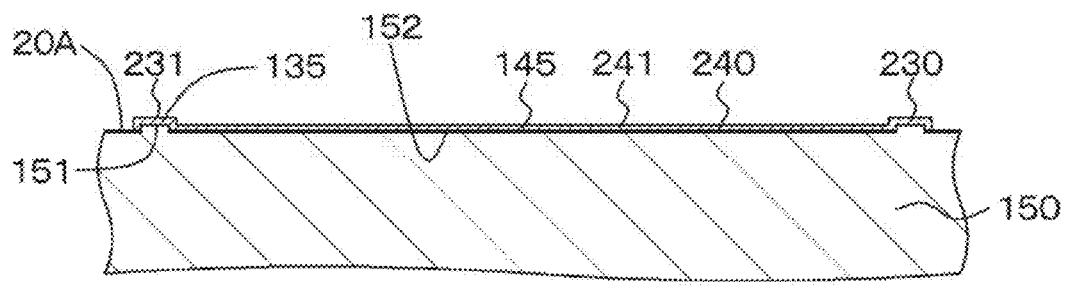
FIG. 18A is a schematic end face view of the liquid crystal displays of the second work example and the fifth work example taken along an error A-A in FIG. 6 (second work example) and FIG. 15 (fifth work example)
Figure 18B:
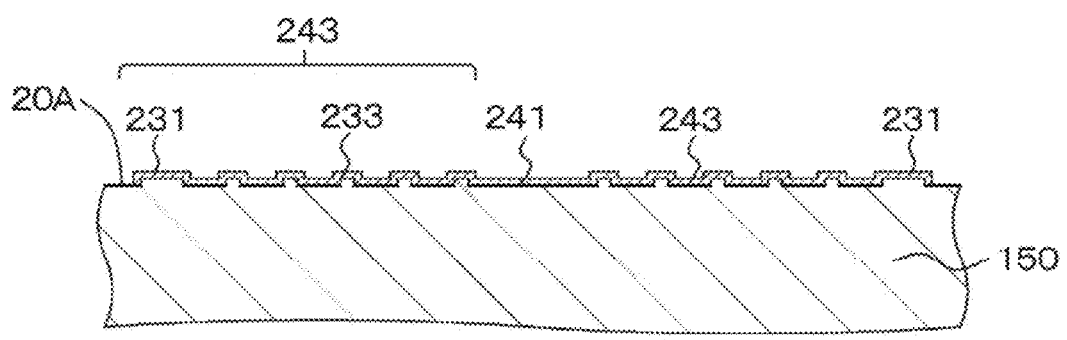
FIG. 18B is a schematic end face view of the same taken along an arrow B-B in FIG. 6 (second work example)

A second work example is a modification of the first work example and relates to a liquid crystal display according to the first-B aspect of the present disclosure. A schematic diagram of a pixel $10_2$ in the first substrate 20 constituting the liquid crystal display of the second work example when viewed from above is illustrated in FIG. 6, a schematic end face view taken along an arrow A-A in FIG. 6 is illustrated in FIG. 18A, and a schematic end face view taken along an arrow B-B in FIG. 6 is illustrated in FIG. 18B. The liquid crystal display of the second work example illustrated in FIG. 6 is a modification of the liquid crystal display of the first work example illustrated in FIG. 2, but not limited thereto, the liquid crystal display may also modifications of the liquid crystal display of the first work example illustrated in FIGS. 3 and 4.

In the liquid crystal display of the second work example, a projecting portion 230 is formed of: a trunk projecting portion 231 formed in the pixel peripheral portion in a frame-like shape; and a plurality of branch projecting portions 233 that extends from the trunk projecting portion 231 toward the inside of the pixel, and a recessed portion 240 is formed of: a trunk recessed portion 241 that passes the pixel center portion and radially extends (for example, in a cross shape); and a branch recessed portion 243 that extends from the trunk recessed portion 241 toward the pixel peripheral portion and is located between a branch projecting portion 233 and a branch projecting portion 233. Specifically, the trunk recessed portion 241 extends, for example, in parallel to the X-axis and the Y-axis described later.

A schematic partial end face view of the liquid crystal display of the second work example is substantially the same as FIG. 1. Except for the above-described points, the liquid crystal display of the second work example may have a constitution and a structure similar to the liquid crystal display of the first work example, and therefore, detailed description will be omitted.

Third Work Example

Figure 7:
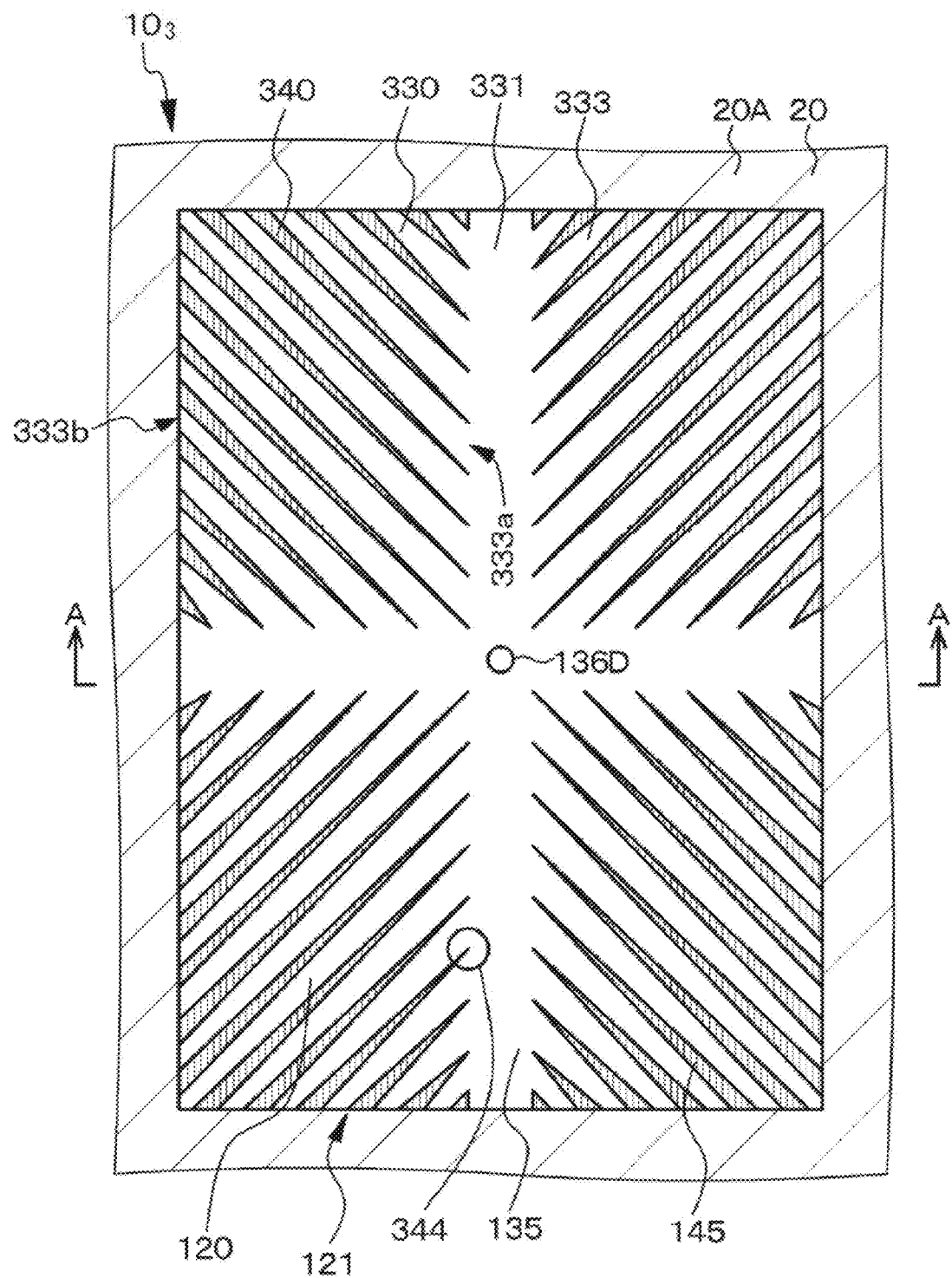
FIG. 7 is a schematic diagram of a pixel in a first substrate constituting a liquid crystal display of a third work example when viewed from above.
Figure 18C:
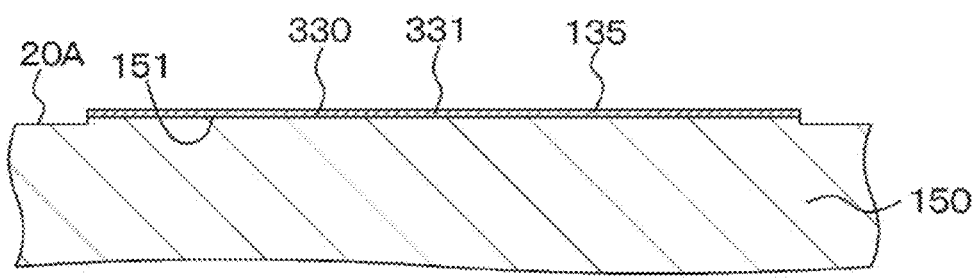
FIG. 18C is a schematic end face view of the liquid crystal display of the third work example taken along an arrow A-A in FIG. 7.
Figure 18D:
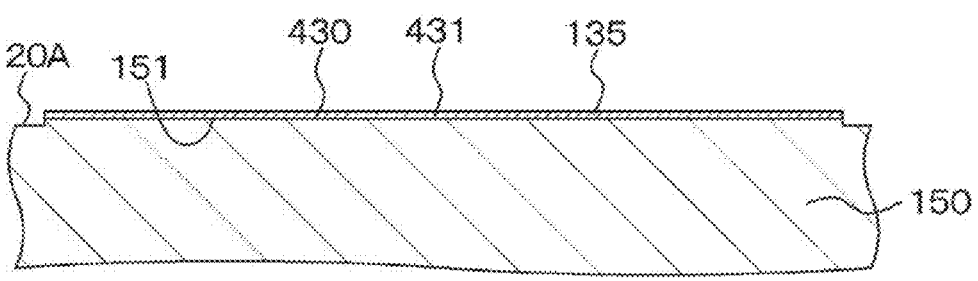
FIG. 18D is a schematic end face view of the liquid crystal display of the fourth work example taken along an arrow A-A in FIG. 12.

A third work example relates to a liquid crystal display according to a second aspect and a third aspect of the present disclosure. As illustrated in a schematic diagram of FIG. 7 illustrating a pixel $10_3$ in a first substrate 20 constituting a liquid crystal display of the third work example when viewed from above and also as illustrated in a schematic end face view of FIG. 18C taken along an arrow A-A in FIG. 7, in the liquid crystal display of the third work example, a first transparent conductive material layer 135 is formed on a projecting portion top surface 151 of a foundation layer 150, a second transparent conductive material layer 145 connected to the first transparent conductive material layer 135 is formed on a recessed portion bottom surface 152 of the foundation layer 150, a projecting portion 330 is formed of a trunk projecting portion 331 that passes a pixel center portion and radially extends (for example, in a cross shape) and a plurality of branch projecting portions 333 that extends toward a pixel peripheral portion from the trunk projecting portion 331, a recessed portion 340 extends from the trunk projecting portion 331 and is located between a branch projecting portion 333 and a branch projecting portion 333, and a narrowest portion exists in the recessed portion 340 (specifically, a width of the recessed portion 340 is narrowest at a portion where the recessed portion 340 starts extending from the trunk projecting portion 331 (in FIG. 7, indicated by a region 344 surrounded by a round shape)), or a region where a level difference between the recessed portion 340 and the projecting portion 330 becomes smallest exists (specifically, the level difference between the recessed portion and the projecting portion becomes smallest at a portion 344 where the recessed portion 340 starts extending from the trunk projecting portion 331). The portion where the recessed portion 340 starts extending from the trunk projecting portion 331 is formed on the basis of, for example, resolution limit design in a photo-lithography technique as described later. Meanwhile, specifically, the trunk projecting portion 331 extends, for example, in parallel to an X-axis and a Y-axis.

Note that reference sign 136D indicates a power feeding unit provided at the pixel center portion and connected to the first transparent conductive material layer 135 in the trunk projecting portion 331. Additionally, in the liquid crystal displays of a third work example or fourth to fifth work examples described later, the first transparent conductive material layer 135 formed on the trunk projecting portion is connected to the power feeding unit. Meanwhile, in the power feeding unit 136D or in the vicinity thereof, light from a surface illumination device passes through a liquid crystal layer 60 depending on an orientation state of a liquid crystal molecule 61, and contrast of an image (light transmissivity in the liquid crystal layer) may become non-uniform. In such a case, it is preferable to provide a light shielding region such that the light does not enter the power feeding unit 136D or the vicinity thereof. As the case may be, it may also be possible to have a configuration in which a wiring layer also functions as the light shielding region.

A schematic partial end face view of the liquid crystal display of the third work example is substantially the same as FIG. 1. Except for the above-described points, the liquid crystal display of the third work example may have a constitution and a structure similar to a liquid crystal display of a first work example, and therefore, detailed description will be omitted.

When etching is performed in order to form an uneven portion on the foundation layer 150, a phenomenon called micro-loading effect occurs. In this phenomenon, an etching rate is reduced when an aspect ratio of a process pattern (ratio between a pattern size and a depth) is increased. The width of the recessed portion 340 is narrowest at the portion 344 where the recessed portion 340 starts extending from the trunk projecting portion 331. Therefore, the depth of the recessed portion 340 is smallest at the portion 344 where the recessed portion 340 starts extending from the trunk projecting portion 331. As a result, in the portion 344 where the recessed portion 340 starts extending from the trunk projecting portion 331, the first transparent conductive material layer 135 formed on the trunk projecting portion top surface 151 and the second transparent conductive material layer 145 formed on the recessed portion bottom surface 152 can be set in a surely connected state without generating any disconnection. Therefore, quality deterioration of a displayed image can be surely prevented. The same is applied to the fourth to fifth work examples described below.

Alternatively, when etching is performed in order to form the uneven portion on the foundation layer 150, a resist material layer is formed on the foundation layer 150, and light exposure and development are performed on the basis of a photo-lithography technique using this resist material layer as a photomask are performed. At this point, a photomask having a halftone structure is applied to a photomask portion in order to form, on the foundation layer 150, the uneven portion corresponding to the portion 344 where the recessed portion 340 starts extending from the trunk projecting portion 331. Since light exposure and development is performed for the resist material layer by using the photomask having the halftone structure, there is no level difference or there is just a little level difference in the uneven portion of the foundation layer corresponding to the portion 344 where the recessed portion 344 starts extending from the trunk projecting portion 331. Therefore, in the portion 344 where the recessed portion 340 starts extending from the trunk projecting portion 331, the first transparent conductive material layer 135 formed on the trunk projecting portion top surface 151 and the second transparent conductive material layer 145 formed on the recessed portion bottom surface 152 can be set in a surely connected state without generating any disconnection. Therefore, quality deterioration of a displayed image can be surely prevented. The same is applied to the fourth to fifth work examples described below.

Figure 8:
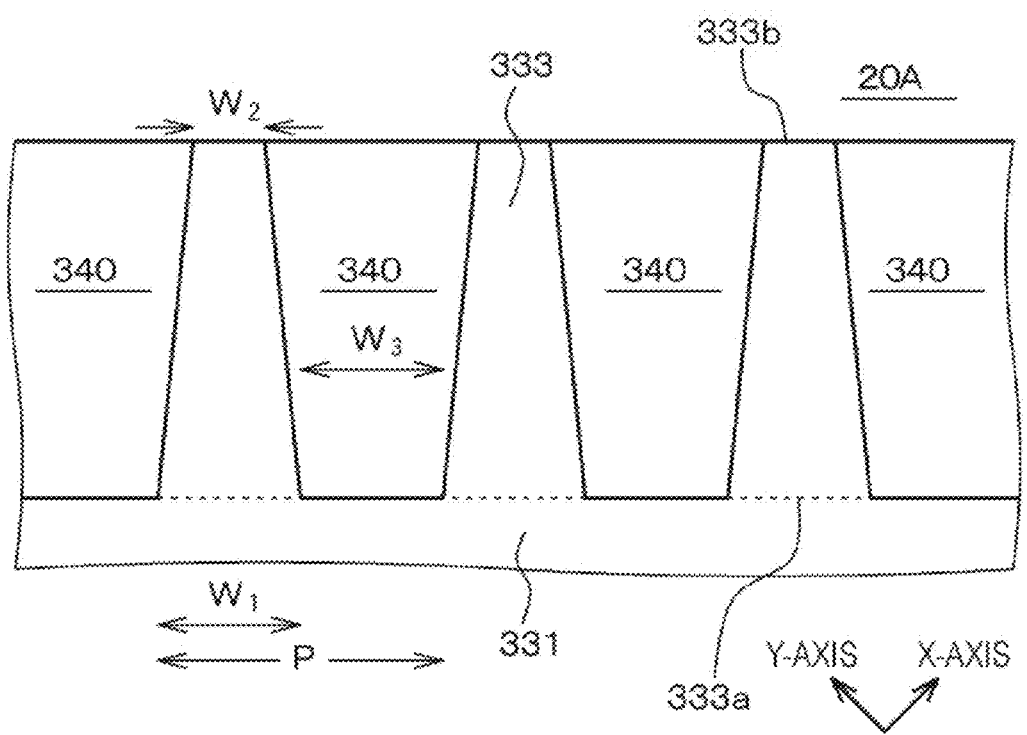
FIG. 8 is a schematic plan view in which a portion of a first electrode of one pixel constituting the liquid crystal display of the third work example is enlarged.

In the third work example, the width of the recessed portion 340 is the narrowest at the portion where the recessed portion 340 starts extending from the trunk projecting portion 331 (indicated by the region 344 surrounded by the round shape in FIG. 7). In other words, it can be said that the width of the branch projecting portion 333 is widest at a portion 333a of the branch projecting portion jointed to the trunk projecting portion 331, and the width becomes narrower (specifically, becomes linearly narrower) toward a distal end portion 333b from the portion 333a jointed to the trunk projecting portion 331. A schematic plan view in which a portion of a first electrode of one pixel constituting the liquid crystal display of the third work example is enlarged is illustrated in FIG. 8.

Figure 9A:
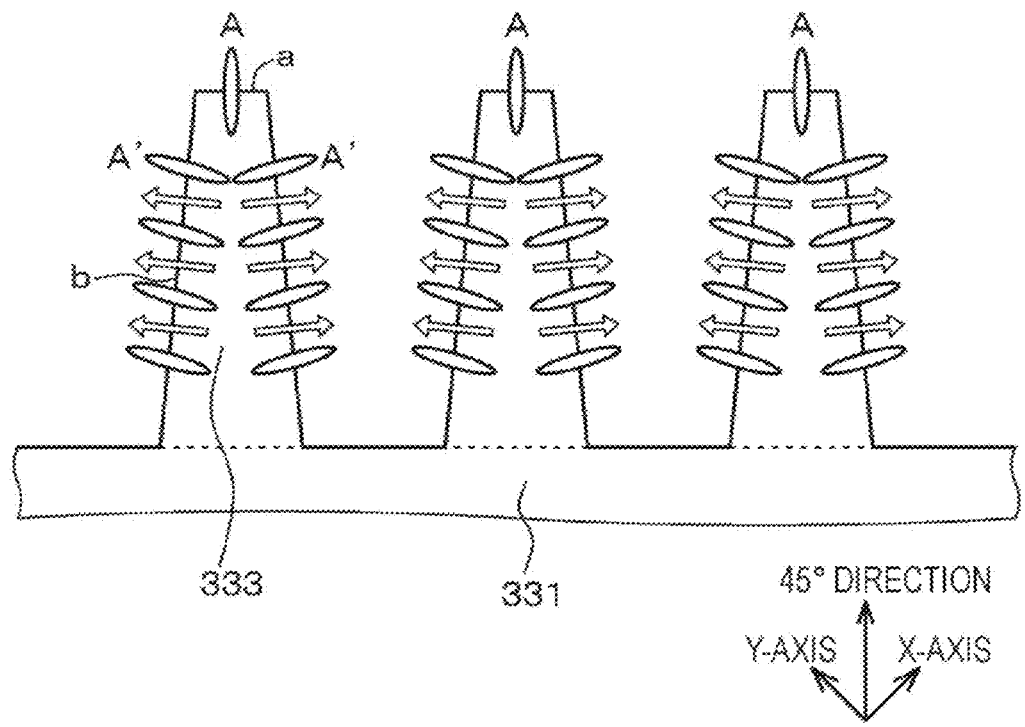
FIGS. 9A and 9B are schematic diagrams to describe the third work example and behavior of liquid crystal molecules at a branch projecting portion of the liquid crystal display in which the branch projecting portion is not tapered.
Figure 9B:
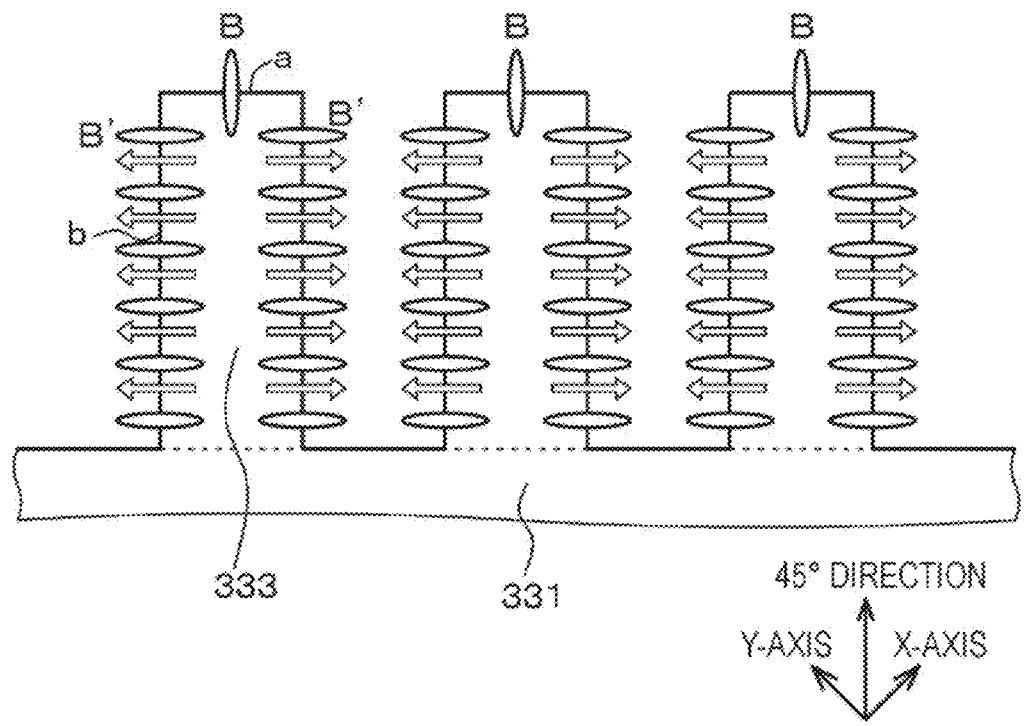

At the time of manufacturing the liquid crystal display, a pretilt angle is provided to a liquid crystal molecule in a state that voltage is applied to an electrode. At this point, as illustrated in FIGS. 9A and 9B, a liquid crystal molecule A located at a distal end edge portion a or vicinity thereof (conveniently referred to as "distal end region") has a long axis direction (director) thereof tilted toward the trunk projecting portion. Then, in the liquid crystal layer, in the case of assuming a region in a thickness direction including the liquid crystal molecule A, movement of the liquid crystal molecule A is transmitted to liquid crystal molecules in an entire pixel (conveniently referred to as "liquid crystal molecules A'") excluding an edge portion of the branch projecting portion that receives influence of a local electrical field caused by the structure, and directors of the liquid crystal molecules A' are tilted toward the trunk projecting portion. Here, movement of the liquid crystal molecule A is more easily transmitted to the liquid crystal molecules A' or movement of the liquid crystal molecule A is transmitted to the liquid crystal molecules A' in a shorter time in a liquid crystal display having tapered branch projecting portions as illustrated in FIG. 9A than in a liquid crystal display having non-tapered branch projecting portions as illustrated in FIG. 9B. Meanwhile, in FIGS. 8, 9A, and 9B, a portion of the trunk projecting portion 331 located between a portion of the trunk projecting portion 331 from where a branch projecting portion 333 extends and a portion of the trunk projecting portion 331 from where a branch projecting portion 333 extends (indicated by dotted lines in FIGS. 8, 9A, and 9B) is illustrated non-parallel to the X-axis for the Y-axis, but actually, this portion is parallel to the X-axis for the Y-axis.

In the case of applying voltage to an electrode at the time of displaying an image on the liquid crystal display, the directors of the liquid crystal molecules are changed to be parallel to the first substrate and the second substrate in the entire liquid crystal layer. In FIGS. 9A and 9B, directions of electrical fields in a side edge portion are indicated by outlined arrows. Here, in the case of assuming a column shape region in a thickness direction in the liquid crystal layer including a liquid crystal molecule B located at a side edge portion b or in the vicinity thereof (conveniently referred to as "side edge region"), liquid crystal molecules aligned in the thickness direction inside the column shape region are rotated. In other words, directions of directors of the liquid crystal molecules B located in the side edge region differ from directions of directors of liquid crystal molecules B' (conveniently referred to as "liquid crystal molecule B') aligned in the thickness direction inside the column shape region including the liquid crystal molecule B. An angle formed between the directors of these liquid crystal molecules B and the directors of the liquid crystal molecules B' is defined as β. Here, as illustrated in FIG. 9B, in the liquid crystal display having the non-tapered branch projecting portions, a rotation angle range of the liquid crystal molecule is large (specifically, the angle β is large). Therefore, a proportion of the liquid crystal molecules having retardation in the X-axis for the Y-axis may be small. On the other hand, as illustrated in FIG. 9A, in the liquid crystal display having the tapered branch projecting portion, a rotation angle range of the liquid crystal molecule is small (specifically, the angle β is small). Therefore, the proportion of the liquid crystal molecules having retardation in the X-axis for the Y-axis may be large. Therefore, non-uniform light transmissivity is not caused at the branch projecting portions, and generation of dark line can be more surely suppressed.

In a fine slit structure in the related art, an electrical field cannot influence a liquid crystal molecule at a slit not provided with an electrode, and the liquid crystal molecule is hardly oriented in a desired direction (hardly falls). Therefore, a dark line is generated corresponding to the slit, and light transmissivity is degraded. In the third work example, the liquid crystal molecules are influenced by the electrical field in an entire area inside a pixel. Therefore, there is no phenomenon like generation of dark line in the fine slit structure. Additionally, in the fine slit structure in the related art, an area ratio between the electrode and the slit largely influences the light transmissivity. In contrast, in the third work example, such a problem does not occur because there is no slit.

As described above, in the liquid crystal display of the third work example, a plurality of uneven portions is formed in the first electrode and the width of the branch projecting portion provided at the first electrode becomes narrower toward the distal end portion. Therefore, generation of dark line can be more reduced. In other words, more uniform light transmissivity can be achieved, and more excellent voltage response characteristic can be obtained. Furthermore, since improvement of initial orientation can be expected, time to provide a pretilt angle to the liquid crystal molecule can be shortened at the time of providing the pretilt angle to the liquid crystal molecule by emitting uniform ultraviolet in a state that a square-wave alternating electric field is applied to a liquid crystal cell as described above. Also, since reduction of orientation failure can be expected, yield is improved and manufacturing cost for the liquid crystal display can be reduced. Moreover, since the light transmissivity can be improved, power consumption of backlight can be reduced and reliability of a TFT can be improved. In the fourth work example also, the width of the branch projecting portion 433 is widest at a portion 433$a$ of the branch projecting portion jointed to a trunk projecting portion 431, and becomes narrower toward a distal end portion 433$b$ from the portion 433$a$ jointed to the trunk projecting portion 431, and the above-described discussion is established.

Figure 10:
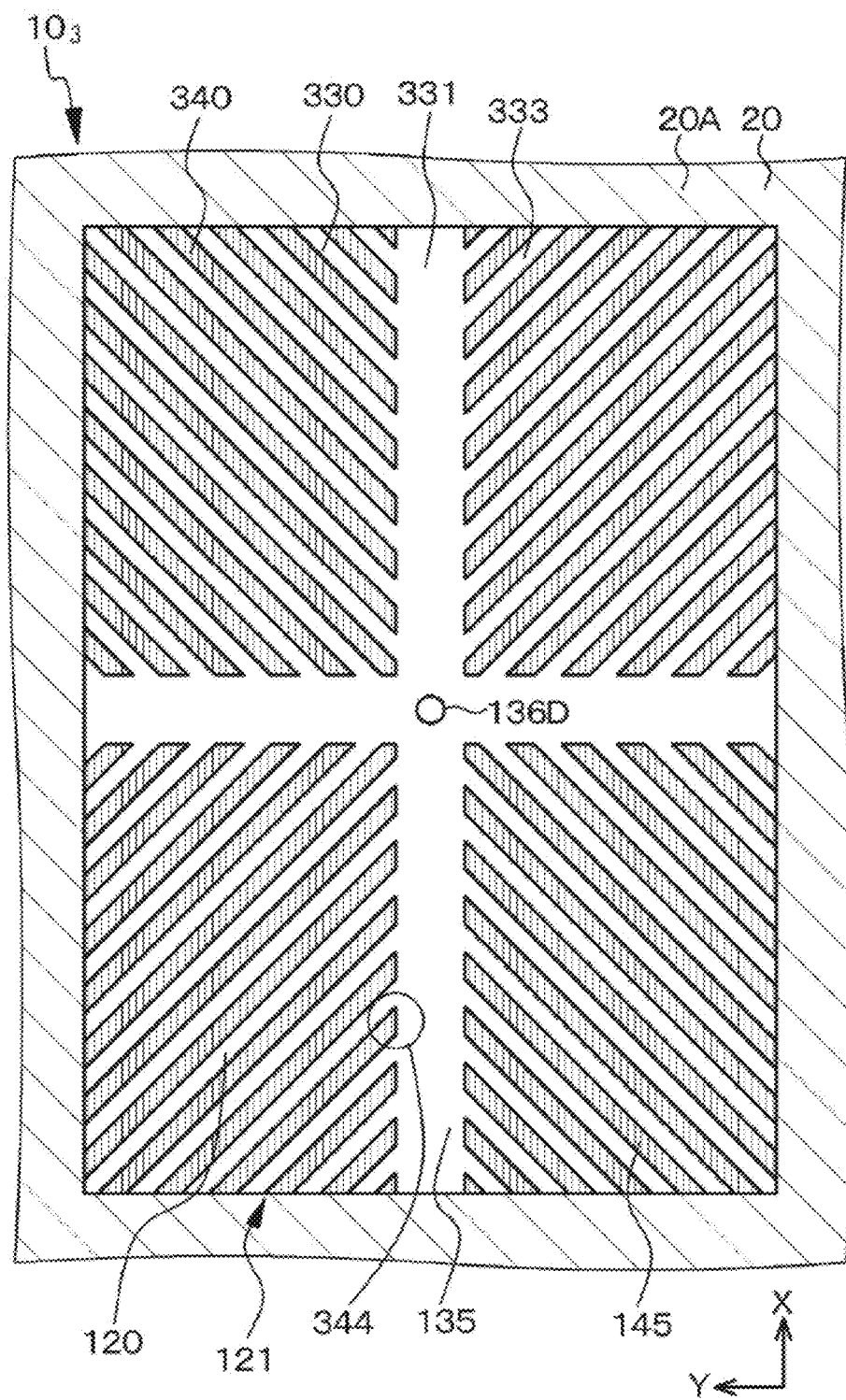
FIG. 10 is a schematic diagram of a pixel in a modified example of the first substrate constituting the liquid crystal display of the third work example when viewed from above.
Figure 11:
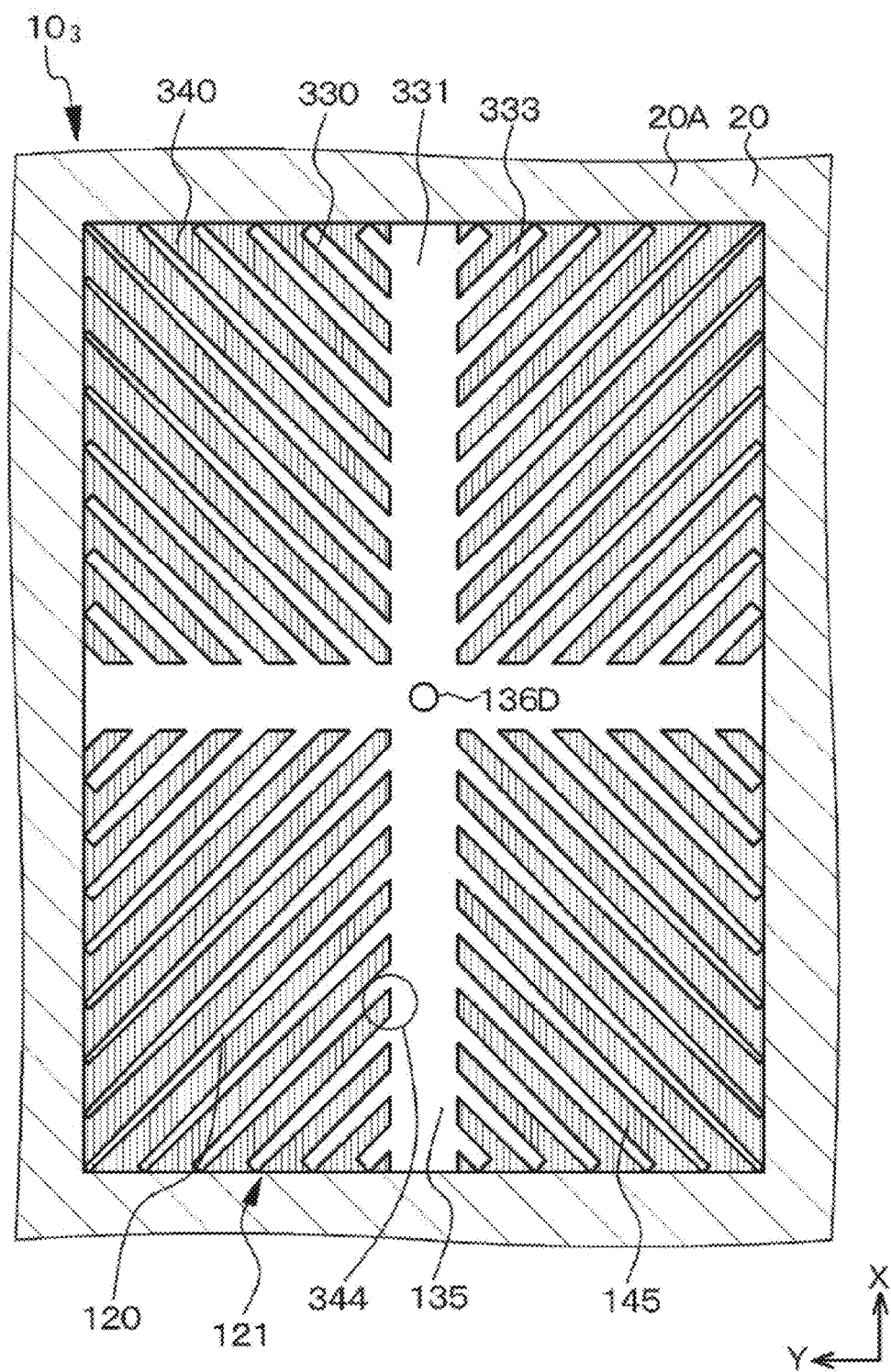
FIG. 11 is a schematic diagram of a pixel in another modified example of the first substrate constituting the liquid crystal display of the third work example when viewed from above.

Meanwhile, the liquid crystal display of the third work example illustrated in FIG. 7 is the liquid crystal display obtained by combining the second aspect and the third aspect of the present disclosure, but in the third work example, the liquid crystal display according to the third aspect of the present disclosure can be singularly applied. FIG. 10 is a schematic diagram illustrating a pixel on the first substrate constituting a liquid crystal display in which the liquid crystal display according to the third aspect of the present disclosure is singularly applied when viewed from above. In the liquid crystal display exemplified in FIG. 10, the width of the recessed portion 340 is constant. However, the level difference between the recessed portion 340 and the trunk projecting portion 331 is smallest at the portion 344 where the recessed portion 340 starts extending from the trunk projecting portion 331. Furthermore, in a liquid crystal display exemplified in FIG. 11, the width of the portion 344 where the recessed portion 340 starts extending from the trunk projecting portion 331 is wider than the example illustrated in FIG. 7. The liquid crystal display of the third work example may also be combined with that of the first work example.

Fourth Work Example

Figure 12:
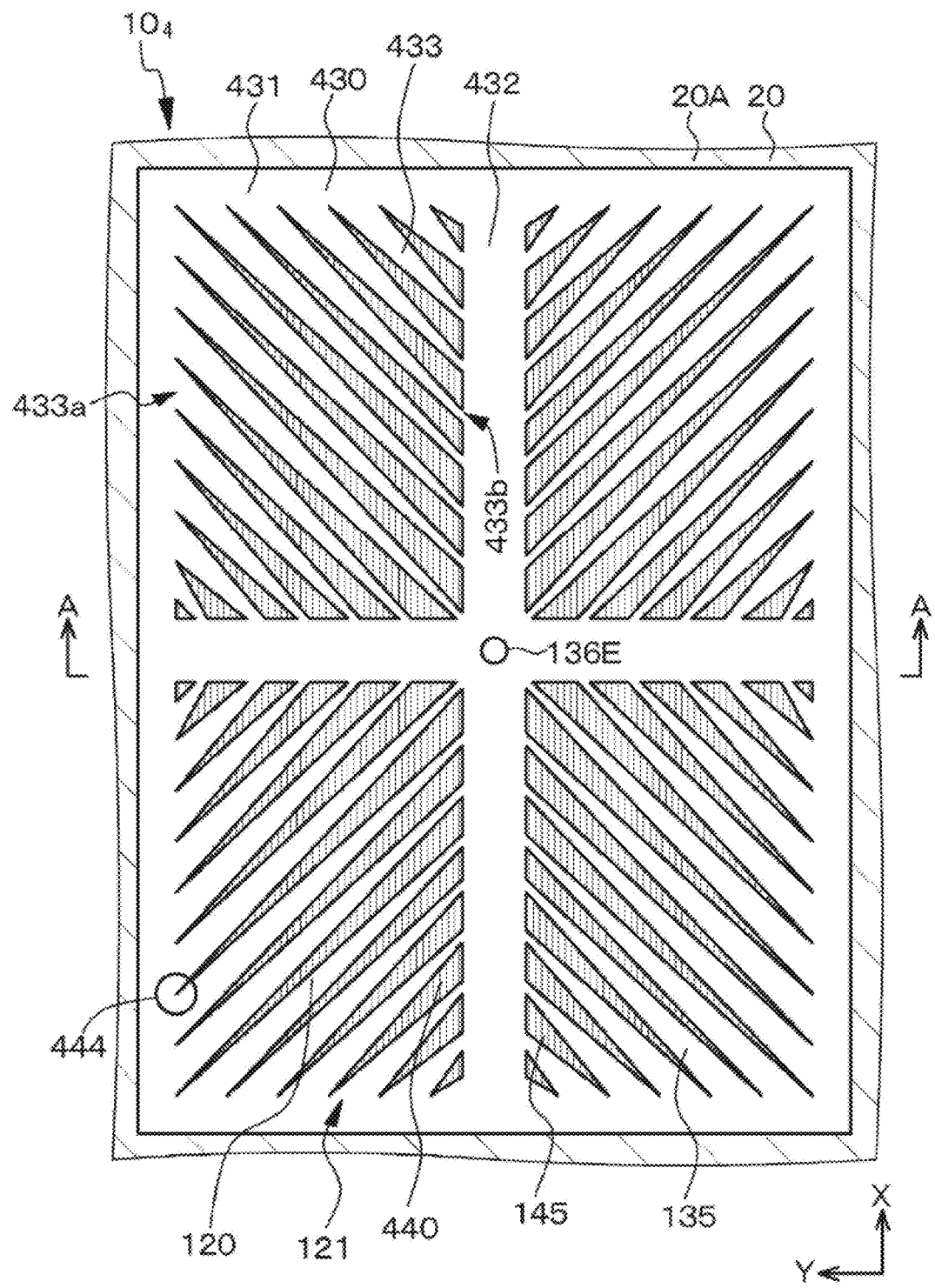
FIG. 12 is a schematic diagram of a pixel in a first substrate constituting a liquid crystal display of a fourth work example when viewed from above.
Figure 13:
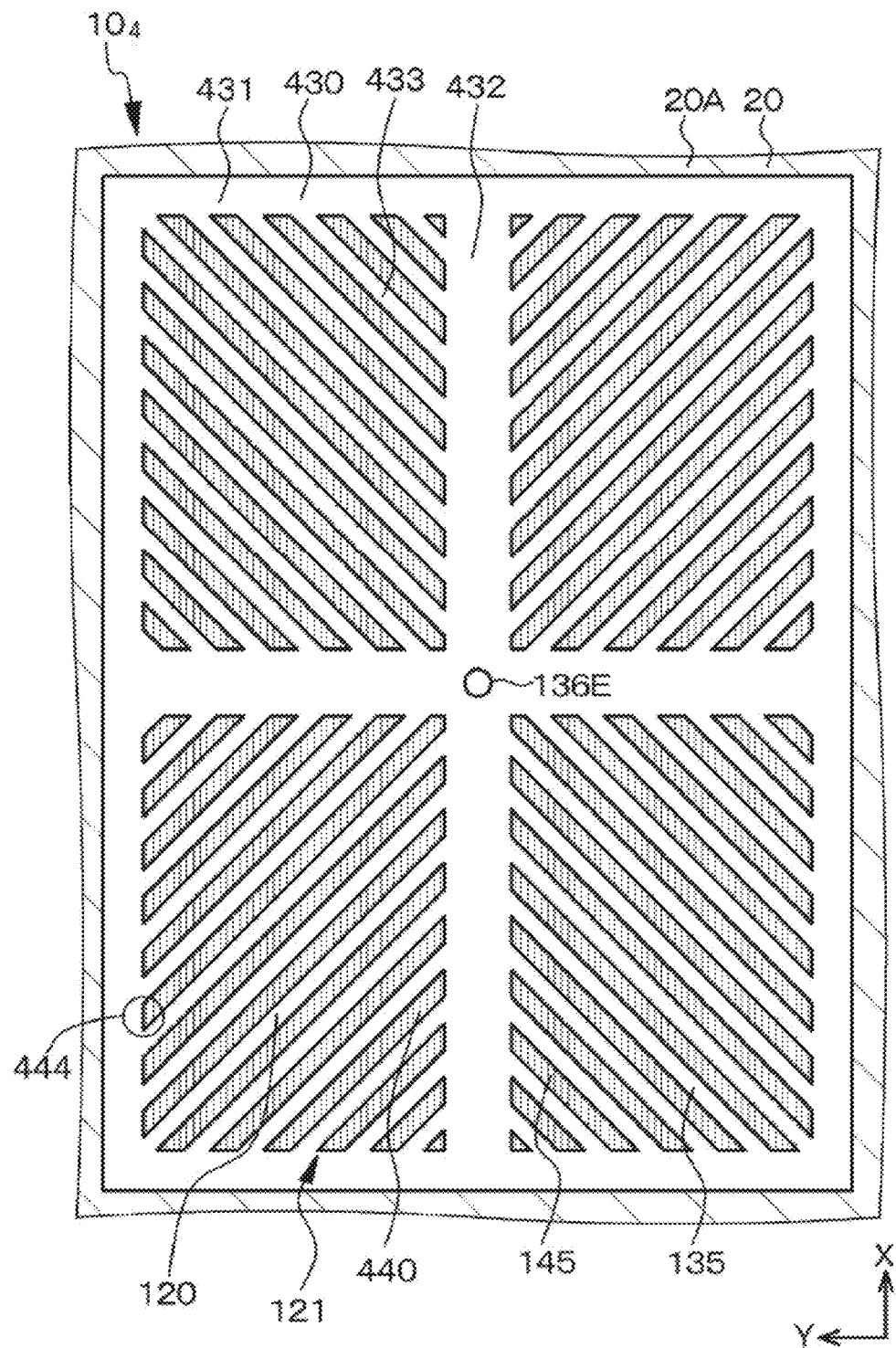
FIG. 13 is a schematic diagram of a pixel in a modified example of the first substrate constituting the liquid crystal display of the fourth work example when viewed from above.

A fourth work example relates to liquid crystal displays according to a fourth aspect and a fifth aspects of the present disclosure, specifically, liquid crystal displays according to a fourth-A aspect and a fifth-A aspect of the present disclosure. As illustrated in a schematic diagram of FIG. 12 or 13 illustrating a pixel 10$_4$ in a first substrate 20 constituting a liquid crystal display of the fourth work example when viewed from above, in the liquid crystal display of the fourth work example, a first transparent conductive material layer 135 is formed on a projecting portion top surface 151 of a foundation layer 150, a second transparent conductive material layer 145 connected to the first transparent conductive material layer 135 is formed on a recessed portion bottom surface 152 of the foundation layer 150, a projecting portion 430 is formed of a trunk projecting portion 431 formed in a pixel peripheral portion in a frame-like shape and a plurality of branch projecting portions 433 that extends from the trunk projecting portion 431 toward the inside of the pixel, a recessed portion 440 extends from the trunk projecting portion and is located between a branch projecting portion 433 and a branch projecting portion 433, and a narrowest portion exists in the recessed portion 44 (specifically, a width of the recessed portion 440 is narrowest at a portion where the recessed portion 440 starts extending from the trunk projecting portion 431 (in FIG. 12, indicated by a region 444 surrounded by a round shape)), or a region where a level difference between the recessed portion 440 and the projecting portion 430 is smallest exists (specifically, the level difference between the recessed portion and the projecting portion is smallest at a portion 444 where the recessed portion 440 starts extending from the trunk projecting portion 431, or the level difference between the recessed portion and the projecting portion is smallest at the portion 444 where the recessed portion 440 starts extending from the trunk projecting portion 431). The schematic end face view taken along an arrow A-A in FIG. 12 is similar to the one illustrated in FIG. 18C.

Furthermore, in the liquid crystal display of the fourth work example, the projecting portion 430 further includes a second trunk projecting portion 432 that passes a pixel center portion and radially extends from the trunk projecting portion 431 (for example, in a cross shape), and is connected to the branch projecting portions 433. Reference sign 136E indicates a power feeding unit provided at the pixel center portion and connected to the first transparent conductive material layer 135 in the second trunk projecting portion 432. Specifically, the second trunk projecting portion 432 extends, for example, in parallel to an X-axis and a Y-axis.

A schematic partial end face view of the liquid crystal display of the fourth work example is substantially the same as FIG. 1. Except for the above-described points, the liquid crystal display of the fourth work example may have a constitution and a structure similar to a liquid crystal display of a first work example, and therefore, detailed description will be omitted.

Figure 14:
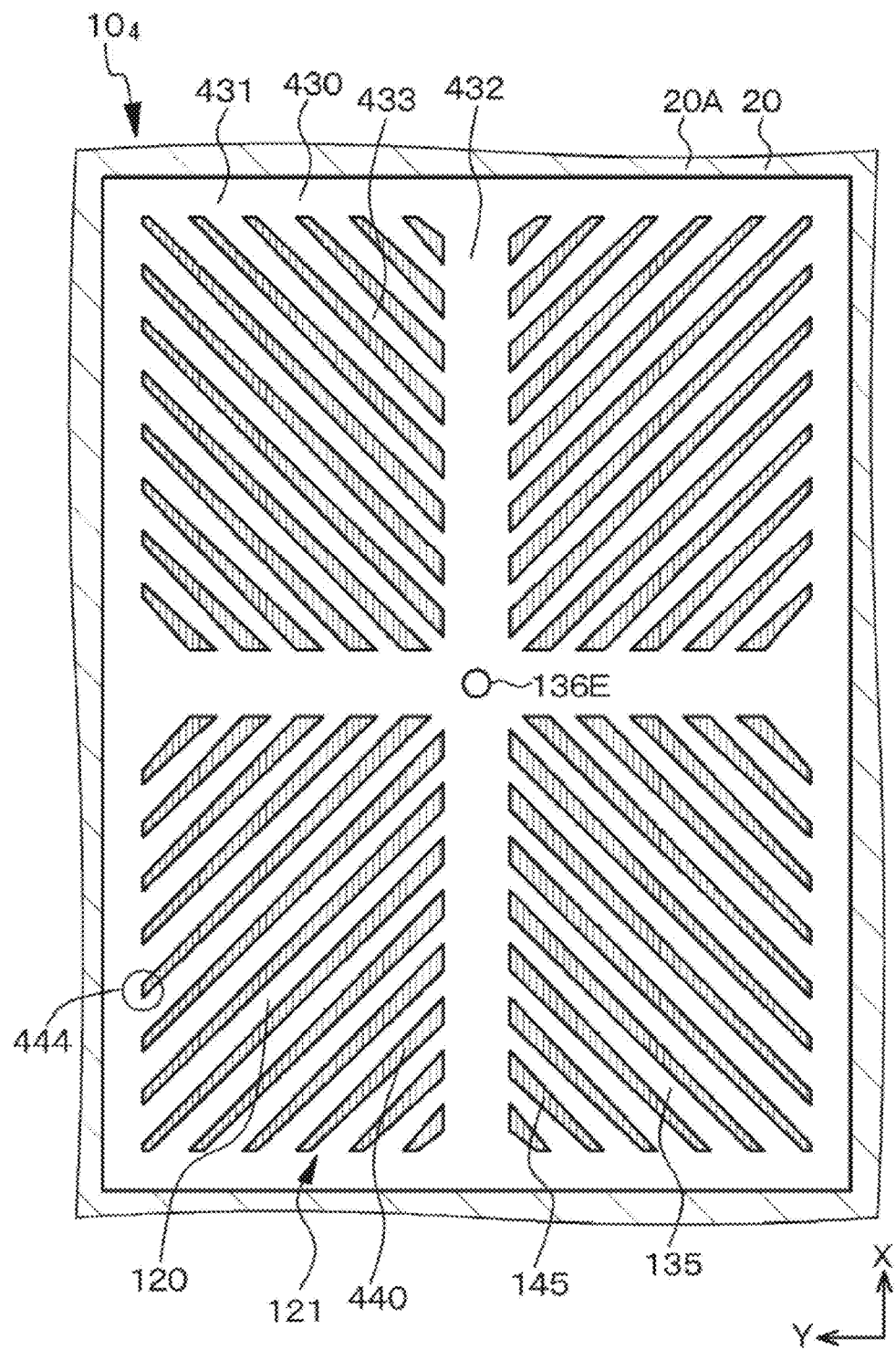
FIG. 14 is a schematic diagram of a pixel in another modified example of the first substrate constituting the liquid crystal display of the fourth work example when viewed from above.

Meanwhile, the liquid crystal display of the fourth work example illustrated in FIG. 12 is the liquid crystal display obtained by combining the fourth aspect and the fifth aspect of the present disclosure, but in the fourth work example, the liquid crystal display according to the fifth aspect of the present disclosure can be singularly applied. FIG. 13 is a schematic diagram illustrating a pixel on the first substrate constituting a liquid crystal display in which the liquid crystal display according to the fifth aspect of the present disclosure is singularly applied when viewed from above. In the liquid crystal display exemplified in FIG. 13, the width of the recessed portion 440 is constant. However, the level difference between the recessed portion 440 and the trunk projecting portion 431 is smallest at the portion 444 where the recessed portion 440 starts extending from the trunk projecting portion 431. Furthermore, in a liquid crystal display exemplified in FIG. 14, the width of the portion 444 where the recessed portion 440 starts extending from the trunk projecting portion 431 is wider than the example illustrated in FIG. 12. The liquid crystal display of the fourth work example may be combined with that of the first work example.

Fifth Work Example

Figure 15:
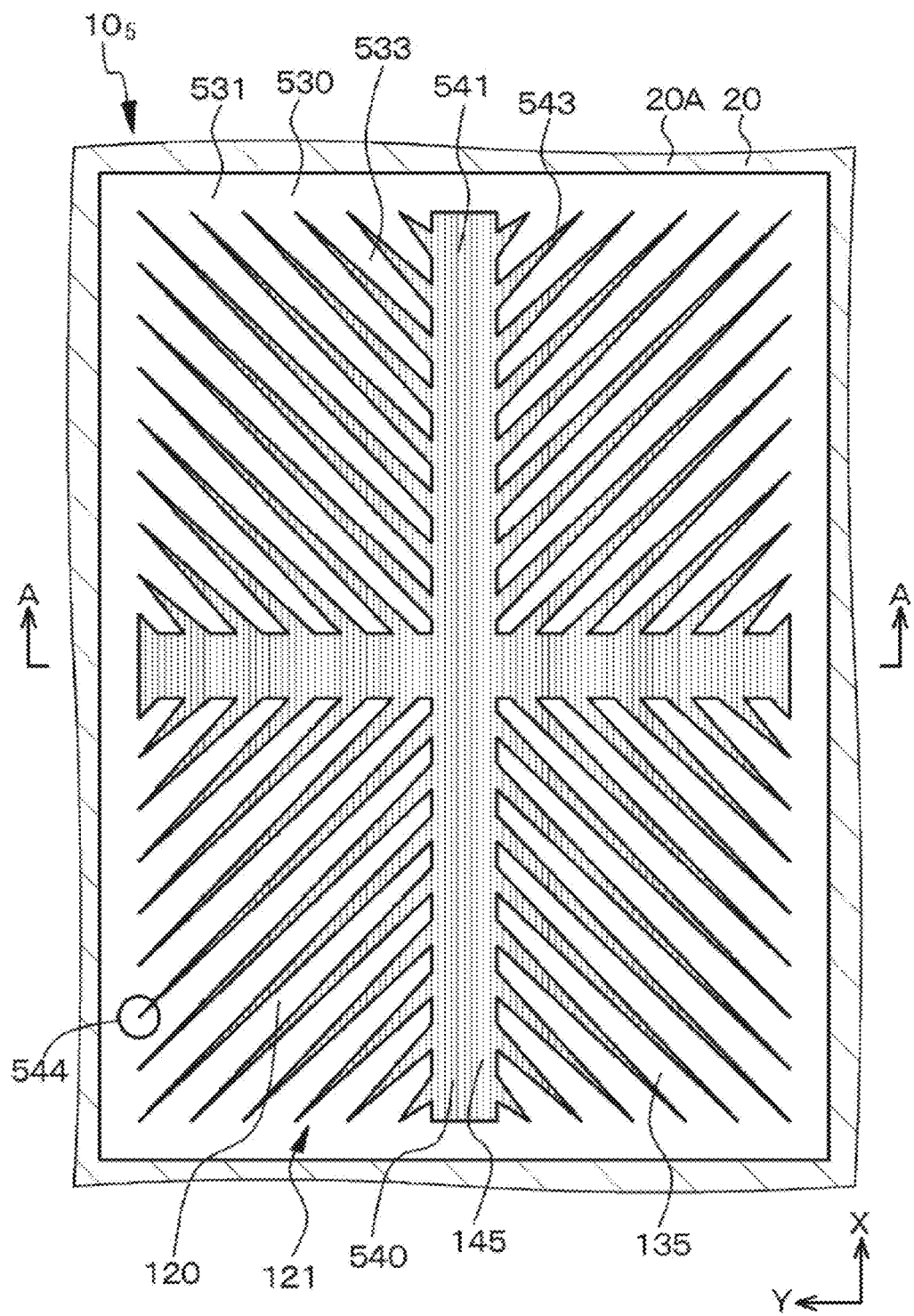
FIG. 15 is a schematic diagram of a pixel in a first substrate constituting a liquid crystal display of a fifth work example when viewed from above.

A fifth work example is a modification of the fourth work example and relates to liquid crystal displays according to a fourth-B aspect and a fifth-B aspect of the present disclosure. As illustrated in a schematic diagram of FIG. 15 illustrating a pixel $10_5$ in the first substrate 20 constituting the liquid crystal display of the fifth example when viewed from above, in the liquid crystal display of the fifth work example, a recessed portion 540 is formed of a trunk recessed portion 541 that passes a pixel center portion and radially extends (for example, in a cross shape) and a branch recessed portion 543 that extends from the trunk recessed portion 541 toward a trunk projecting portion 531 and is located between a branch projecting portion 533 and a branch projecting portion 533. Specifically, the trunk recessed portion 541 extends, for example, in parallel to the X-axis and the Y-axis described later. A width of the branch recessed portion 543 is narrowest at a portion where the branch recessed portion 543 starts extending from the trunk projecting portion 531 (indicated by a region 544 surrounded by a round shape in FIG. 15). Alternatively, a level difference between the recessed portion and the projecting portion is smallest at the portion 544 where the recessed portion 540 starts extending from the trunk projecting portion 531. The schematic end face view taken along an arrow A-A in FIG. 15 is similar to the one illustrated in FIG. 18A. Additionally, illustration of a power feeding unit is omitted. Note that reference signs 530, 630, 730, 830 indicate projecting portions.

A schematic partial end face view of the liquid crystal display of the fifth work example is substantially the same as FIG. 1. Except for the above-described points, the liquid crystal display of the fifth work example may have a constitution and a structure similar to a liquid crystal display of a first work example, and therefore, detailed description will be omitted.

Figure 16:
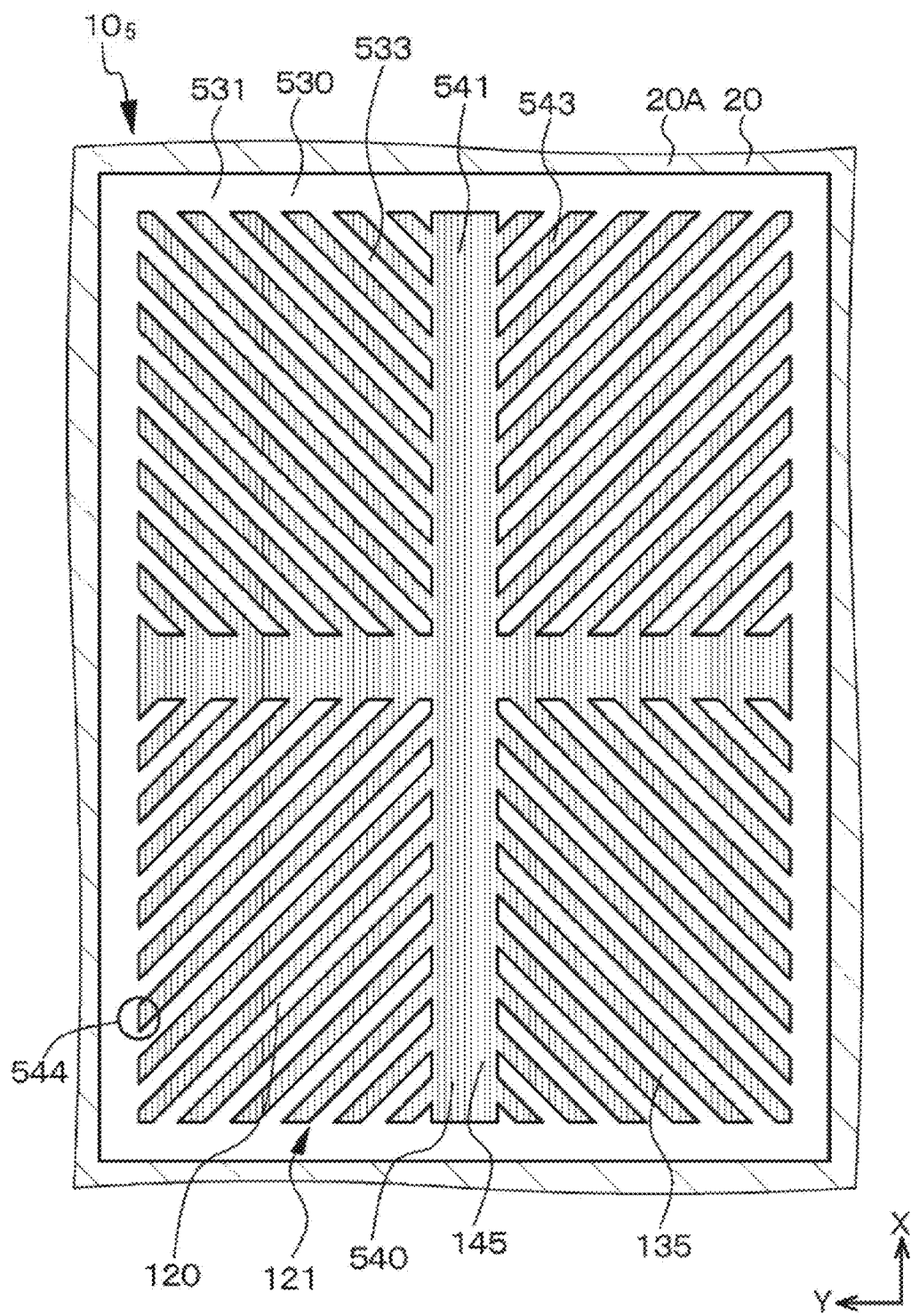
FIG. 16 is a schematic diagram of a pixel in a modified example of the first substrate constituting the liquid crystal display of the fifth work example when viewed from above.

Meanwhile, the liquid crystal display of the fifth work example illustrated in FIG. 15 is the liquid crystal display obtained by combining the fourth aspect and the fifth aspect of the present disclosure, but in the fifth work example also, the liquid crystal display according to the fifth aspect of the present disclosure can be singularly applied. FIG. 16 is a schematic diagram illustrating the pixel on the first substrate constituting the liquid crystal display in which the liquid crystal display according to the fifth aspect of the present disclosure is singularly applied when viewed from above. In the liquid crystal display exemplified in FIG. 16, the width of the recessed portion 540 is constant. However, the level difference between the recessed portion 540 and the trunk projecting portion 531 is smallest at the portion 544 where the recessed portion 540 starts extending from the trunk projecting portion 531. Furthermore, in a liquid crystal display exemplified in FIG. 17, the width of the portion 544 where the recessed portion 540 starts extending from the trunk projecting portion 531 is wider than the example illustrated in FIG. 15. The liquid crystal displays of the fifth work example and the first work example may also be combined.

Sixth Work Example

Figure 19:
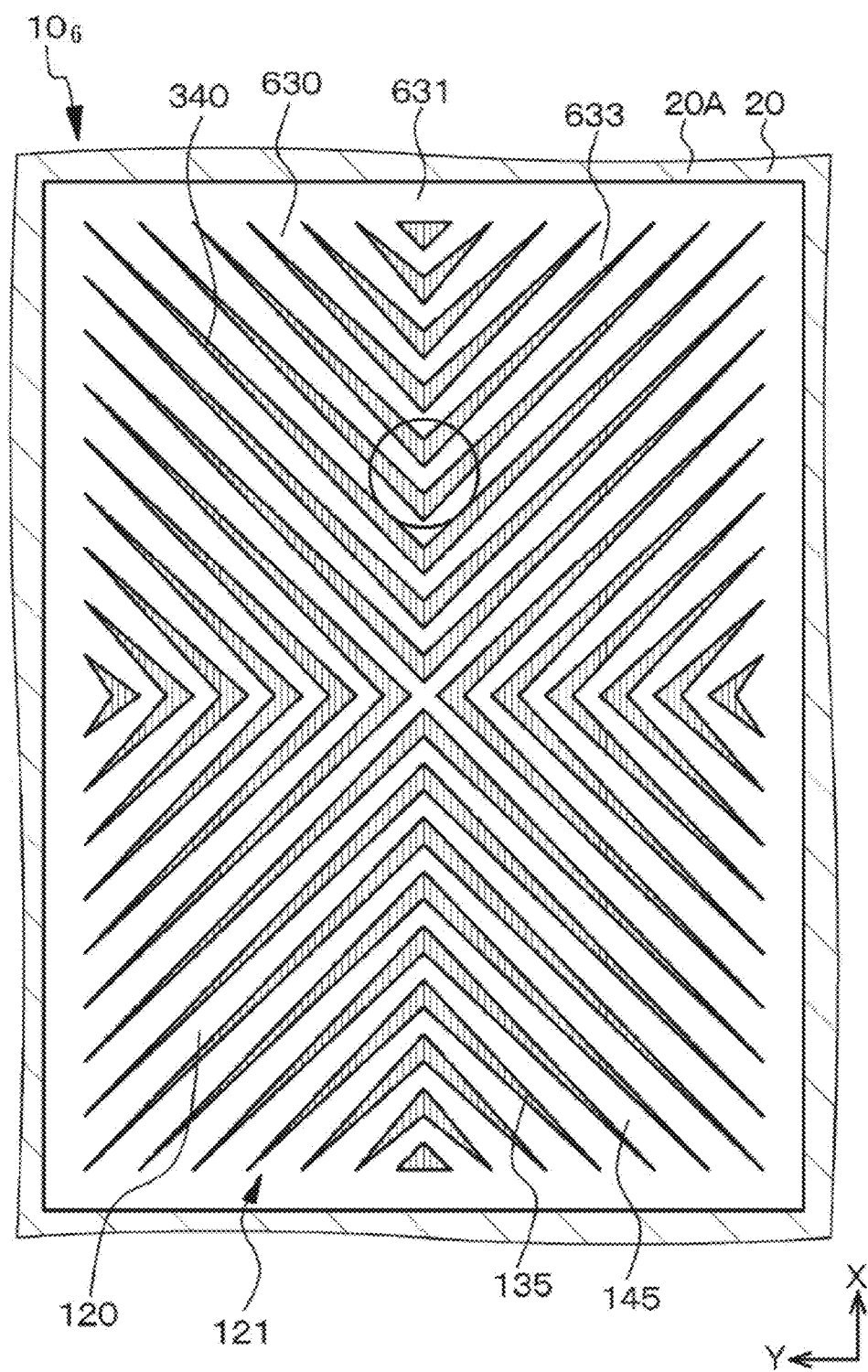
FIG. 19 is a schematic plan view of a first electrode of one pixel constituting a liquid crystal display of a sixth work example.

A sixth work example is a modification of the fourth to fifth work examples and relates to liquid crystal displays according to a fourth-C aspect and a fifth-C aspect of the present disclosure. A schematic diagram of a pixel $10_6$ in the first substrate 20 constituting the liquid crystal display of the sixth work example when viewed from above is illustrated in FIG. 19. A schematic partial end face view of the liquid crystal display of the sixth work example is substantially the same as FIG. 1.

In the liquid crystal displays of the sixth work example, in the case of assuming a (X, Y) coordinate system in which respective straight lines passing the pixel center portion and parallel to the pixel peripheral portion are set as the X-axis and the Y-axis, a plurality of branch projecting portions 633 occupying a first quadrant extends in parallel in a direction in which a value of Y-coordinate increases when a value of X-coordinate increases, a plurality of branch projecting portions 633 occupying a second quadrant extends in parallel in a direction in which the value of the Y-coordinate increases when the value of the X-coordinate decreases, a plurality of branch projecting portions 633 occupying a third quadrant extends in parallel in a direction in which the value of the Y-coordinate decreases when the value of the X-coordinate decreases, a plurality of branch projecting portions 633 occupying a fourth quadrant extends in parallel in a direction in which the value of the Y-coordinate decreases when the value of the X-coordinate increases, the branch projecting portion 633 extending from a trunk projecting portion 631 in parallel to the X-axis and occupying the first quadrant and the branch projecting portion 633 extending from the trunk projecting portion 631 in parallel to the X-axis and occupying the fourth quadrant are formed in a connected state;

the branch projecting portion 633 extending from the trunk projecting portion 631 in parallel to the Y-axis and occupying the first quadrant and the branch projecting portion 633 extending from the trunk projecting portion 631 in parallel to the Y-axis and occupying the second quadrant are formed in a connected state;

the branch projecting portion 633 extending from the trunk projecting portion 631 in parallel to the X-axis and occupying the second quadrant and the branch projecting portion 633 extending from the trunk projecting portion 631 in parallel to the X-axis and occupying the third quadrant are formed in a connected state; and the branch projecting portion 633 extending from the trunk projecting portion 631 in parallel to the Y-axis and occupying the third quadrant and the branch projecting portion 633 extending from the trunk projecting portion 631 in parallel to the Y-axis and occupying the fourth quadrant are formed in a connected state. In other words, in the liquid crystal display of the sixth work example, neither a second trunk projecting portion nor a trunk recessed portion is provided different from the liquid crystal displays according to the fourth and fifth work examples.

The plurality of branch projecting portions 633 occupying the first quadrant extends forming a 45-degree angle between axial lines thereof and the X-axis, the plurality of branch projecting portions 633 occupying the second quadrant extends forming a 135-degree angle between axial lines thereof and the X-axis, the plurality of branch projecting portions 633 occupying the third quadrant extends forming a 225-degree angle between axial lines thereof and the X-axis, and the plurality of branch projecting portions 633 occupying the fourth quadrant extends forming a 315-degree angle between axial lines thereof and the X-axis. The branch projecting portions 633 are line-symmetric with respect to the X-axis, and also line-symmetric with respect to the Y-axis, and furthermore rotationally symmetric (point-symmetric) at 180 degrees with respect to the center of the pixel $10_6$. Additionally, a planar shape of the branch projecting portion 633 is a "V" shape.

Specification of the branch projecting portion 633 and the recessed portion 340 are as shown in Table 2 below.

TABLE 2

| | |
|---|---|
| Height of branch projecting portion | 0.2 μm |
| Forming pitch of branch projecting portion | 5.0 μm |
| Average width of branch projecting portion | 2.5 μm |
| Average of recessed portion | 2.5 μm |

In the liquid crystal display of the sixth work example, the plurality of branch projecting portions 633 occupying the first quadrant extends in parallel in a direction in which a value of the Y-coordinate increases when a value of the X-coordinate increases, the plurality of branch projecting portions 633 occupying the second quadrant extends in parallel in a direction in which the value of the Y-coordinate increases when the value of the X-coordinate decreases, the plurality of branch projecting portions 633 occupying the third quadrant extends in parallel in a direction in which the value of the Y-coordinate decreases when the value of the X-coordinate decreases, and the plurality of branch projecting portions 633 occupying a fourth quadrant extends in parallel in a direction in which the value of the Y-coordinate decreases when the value of the X-coordinate increases. In other words, a portion of the branch projecting portion extending in parallel to the X-axis or a portion of the branch projecting portion extending in parallel to the Y-axis do not exist except for a root portion of the branch projecting portion 633. Here, an absorption axis of a first polarizing plate is parallel to the X-axis or the Y-axis, and an absorption axis of a second polarizing plate is parallel to the Y-axis or the X-axis. Therefore, generation of dark line can be more reduced. In other words, more uniform light transmissivity can be achieved, and more excellent voltage response characteristic can be obtained. Furthermore, since initial orientation is improved, time to provide a pretilt angle to a liquid crystal molecule can be shortened at the time of providing the pretilt angle to the liquid crystal molecule by emitting uniform ultraviolet in a state that a square-wave alternating electric field is applied to a liquid crystal cell as described above. Additionally, since reduction of orientation failure can be expected, yield is improved and manufacturing cost for the liquid crystal display can be reduced. Moreover, since the light transmissivity can be improved, power consumption of backlight can be reduced and reliability of a TFT can be improved. The same is applied to the seventh and eighth work examples described below.

Figure 20A:
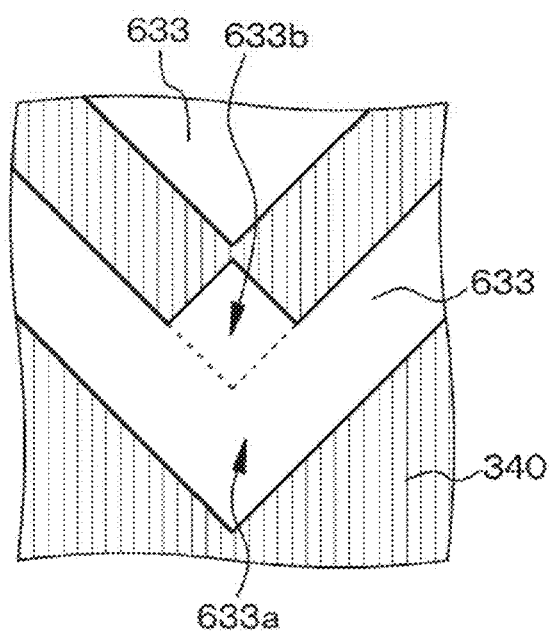
FIGS. 20A and 20B are schematic plan views of a portion of a first electrode of one pixel constituting a modified example of the liquid crystal display of the sixth work example respectively.
Figure 20B:
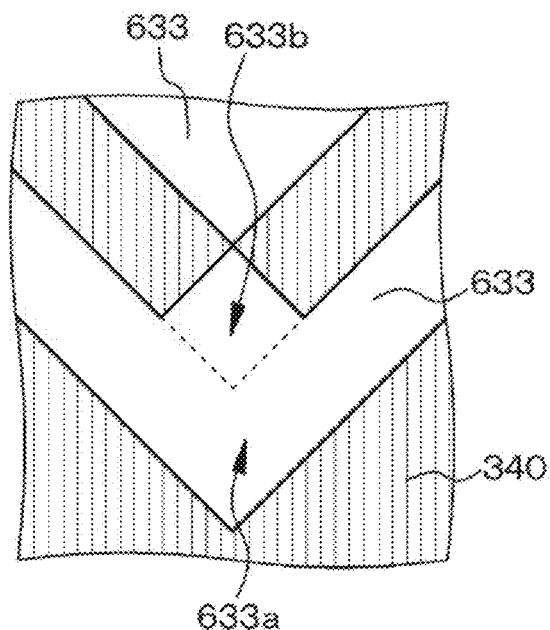
Figure 21A:
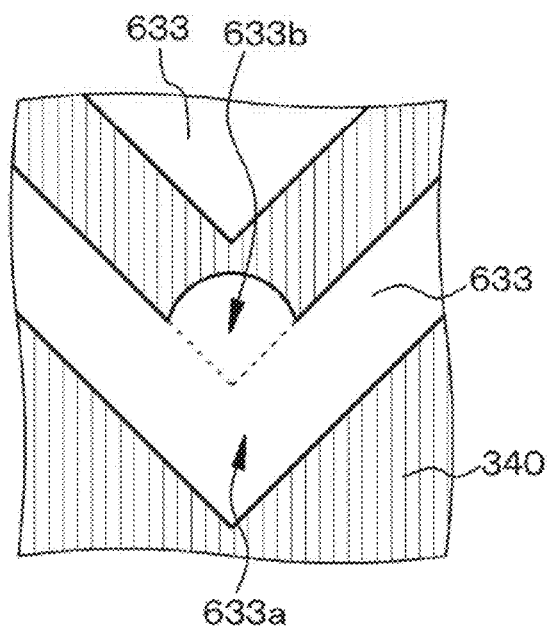
FIGS. 21A and 21B are schematic plan views of a portion of a first electrode of one pixel constituting another modified example of the liquid crystal display of the sixth work example respectively.
Figure 21B:
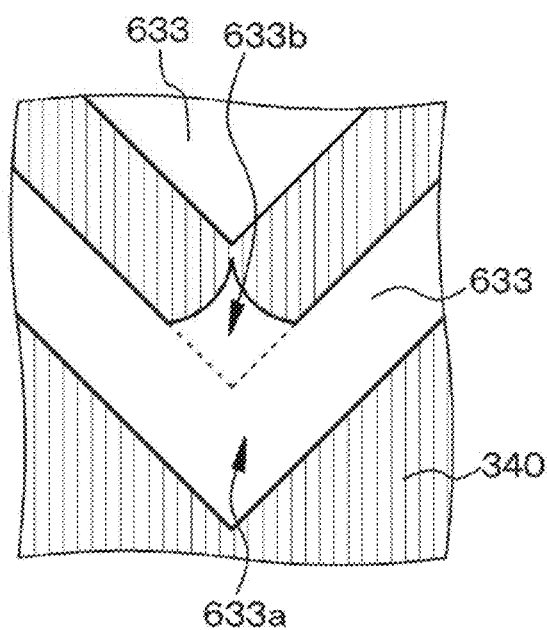

Partial enlarged schematic plan views of the first electrode of one pixel constituting the liquid crystal display of the modified example of the sixth work example are illustrated in FIGS. 20A, 20B, 21A, and 21B. FIGS. 20A, 20B, 21A, and 21B are the schematic plan views in which a portion of the first electrode surrounded by a round shape region is enlarged in the schematic plan view of the first electrode illustrated in FIG. 19. In the liquid crystal display of the modified example of the sixth work example, a joint portion 633a of the two branch projecting portions 633 is provided with the projection 633b extending toward the peripheral portion of the pixel $10_6$. As illustrated in FIGS. 20A and 20B, the projection 633b may have a constitution surrounded by a plurality of line segments (two line segments in the exemplified drawings), also may have a constitution surrounded by one curved line as illustrated in FIG. 21A, also may have a constitution surrounded by a plurality of curved lines (two curved lines in the exemplified drawing) as illustrated in FIG. 21B, and also may have a constitution surrounded by combination of a line segment and a curved line. In the example illustrated in FIG. 20A, a tip of the projection 633b does not contact the joint portion of the two branch projecting portions adjacent to each other in the pixel peripheral portion direction. On the other hand, in the example illustrated in FIG. 20B, the tip of the projection 633b contacts the joint portion of the two branch projecting portions adjacent to each other in the pixel peripheral portion direction.

With this constitution, a portion of the branch projecting portion extending in parallel to the X-axis or a portion of the branch projecting portion extending in parallel to the Y-axis does not exist, and even in the case of existing, a length thereof is extremely short. Additionally, since the projection 633b is provided at a portion inside the "V"-shaped bottom portion of the branch projecting portion, an orientation state of a liquid crystal molecule located in the vicinity of the inside of the bottom portion of the "V"-shaped bottom portion of the branch projecting portion can be set in a desired state more than in the case where the projection 633b is not provided at the portion inside the "V"-shaped bottom portion of the branch projecting portion.

Figure 17:
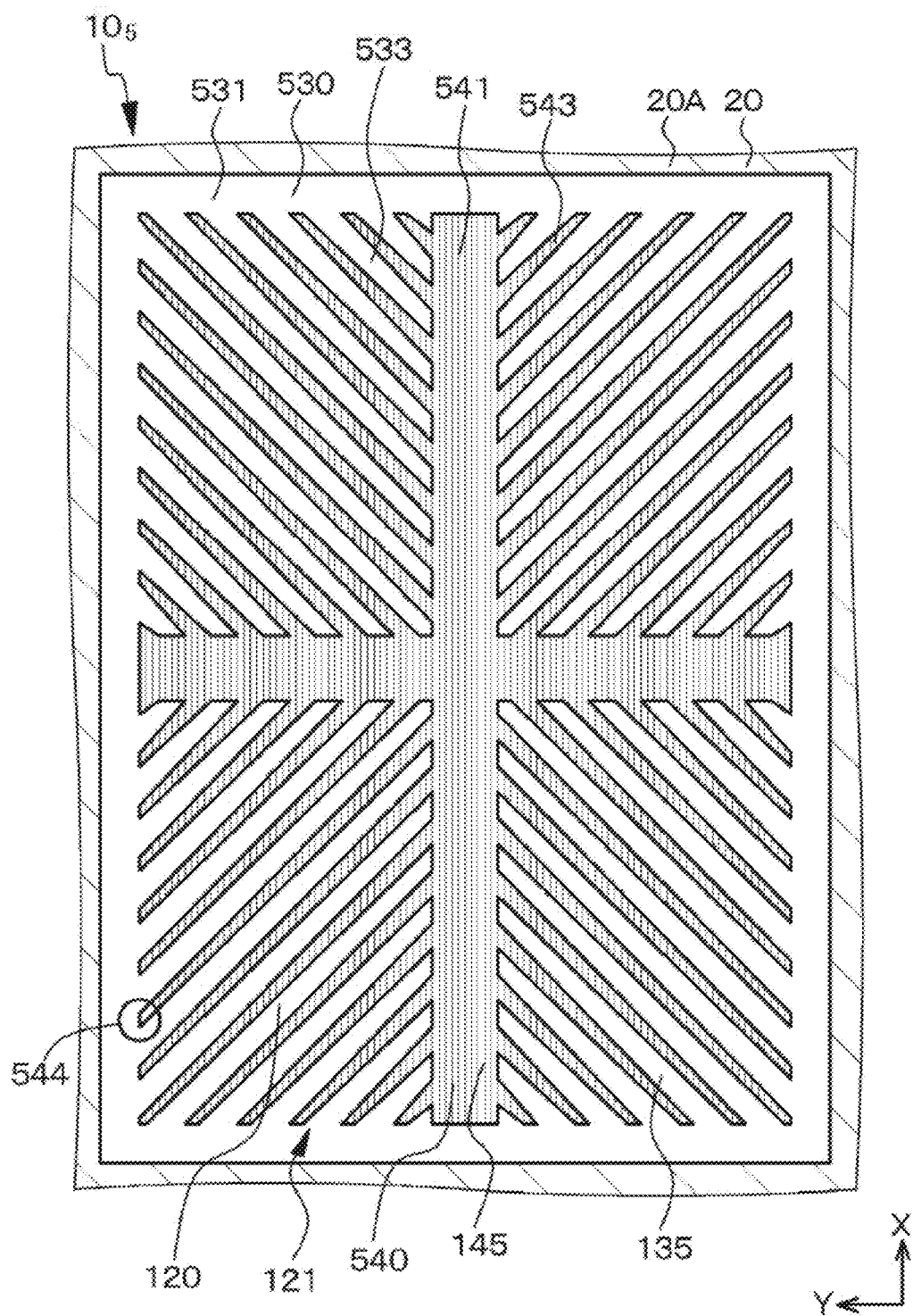
FIG. 17 is a schematic diagram of a pixel in another modified example of the first substrate constituting the liquid crystal display of the fifth work example when viewed from above.

Meanwhile, the liquid crystal display of the sixth work example illustrated in FIG. 19 is the modification of the fifth work example illustrated in FIG. 15, but the modified example of the fifth work example illustrated in FIG. 16 or 17 may also be applicable to the sixth work example.

Seventh Work Example

Figure 22:
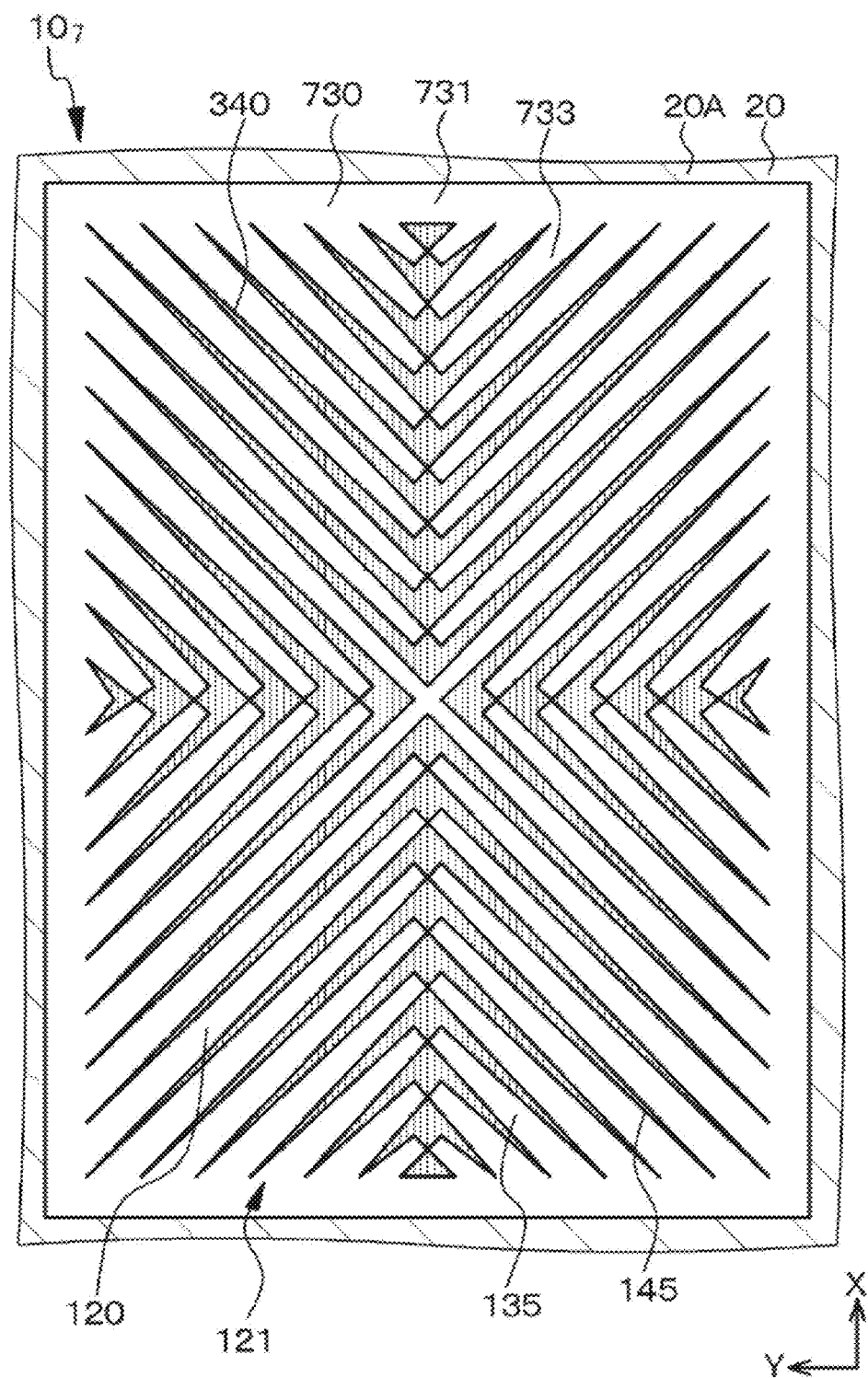
FIG. 22 is a schematic plan view of a first electrode of one pixel constituting a liquid crystal display of a seventh work example.

A seventh work example is also a modification of the fourth to fifth work examples and relates to liquid crystal displays according to a fourth-D aspect and a fifth-D aspect of the present disclosure. A schematic diagram of a pixel $10_7$ in the first substrate 20 constituting the liquid crystal display of the seventh work example when viewed from above is illustrated in FIG. 22. A schematic partial end face view of the liquid crystal display of the seventh work example is substantially the same as FIG. 1.

In the liquid crystal display according to the seventh work example, in the case of assuming the (X, Y) coordinate system in which the respective straight lines passing the pixel center portion and parallel to the pixel peripheral portion are set as the X-axis and the Y-axis,
a plurality of branch projecting portions 733 occupying the first quadrant extends in parallel in a direction in which a value of the Y-coordinate increases when a value of the X-coordinate increases,
a plurality of branch projecting portions 733 occupying the second quadrant extends in parallel in a direction in which the value of the Y-coordinate increases when the value of the X-coordinate decreases, a plurality of branch projecting portions 733 occupying the third quadrant extends in parallel in a direction in which the value of the Y-coordinate decreases when the value of the X-coordinate decreases, a plurality of branch projecting portions 733 occupying a fourth quadrant extends in parallel in a direction in which the value of the Y-coordinate decreases when the value of the X-coordinate increases, the branch projecting portion 733 extending from a trunk projecting portion 731 in parallel to the X-axis and occupying the first quadrant and the branch projecting portion 733 extending from the trunk projecting portion 731 in parallel to the X-axis and occupying the fourth quadrant are not jointed, the branch projecting portion 733 extending from the trunk projecting portion 731 in parallel to the Y-axis and occupying the first quadrant and the branch projecting portion 733 extending from the trunk projecting portion 731 in parallel to the Y-axis and occupying the second quadrant are not jointed, the branch projecting portion 733 extending from the trunk projecting portion 731 in parallel to the X-axis and occupying the second quadrant and the branch projecting portion 733 extending from the trunk projecting portion 731 in parallel to the X-axis and occupying the third quadrant are not jointed, and the branch projecting portion 733 extending from the trunk projecting portion 731 in parallel to the Y-axis and occupying the third quadrant and the branch projecting portion 733 extending from the trunk projecting portion 731 in parallel to the Y-axis and occupying the fourth quadrant are not jointed. In other words, in the seventh work example, the branch projecting portion 733 is not jointed on the X-axis or the Y-axis.

Each of the branch projecting portions 733 is not jointed but may also be in a jointed state. Here, "joint" indicates a state in which each of the branch projecting portion intersects at a certain length, and "contact" indicates each of the branch projecting portions make contact at an extremely short length (a kind of point-contacting state).

With this constitution also, the portion of the branch projecting portion extending in parallel to the X-axis or the portion of the branch projecting portion extending in the Y-axis does not exist. Or, even in the case of existing, the length is extremely short. Therefore, the effects similar to those described in the six work example can be obtained.

By thus forming the branch projecting portion 733 and the branch projecting portion 733 in the non-jointed state, an electrical field generated by the first electrode 120 at the pixel center is distorted in a desired manner in the vicinity of the pixel center, and a falling direction of a liquid crystal molecule is determined. As a result, orientation control force relative to the liquid crystal molecule in the vicinity of the pixel center can be enhanced, and a tilting state of the liquid crystal molecule in the vicinity of the pixel center can be surely determined. Therefore, the time required to stabilize orientation of the liquid crystal molecule exposed to a desired electrical field can be shortened although a liquid crystal layer is exposed to the desired electrical field for a predetermined time in order to provide a pretilt angle to the liquid crystal molecule at the time of manufacturing the liquid crystal display. In other words, a pretilt angle can be provided to the liquid crystal molecule in a short time and manufacturing time of the liquid crystal display can be shortened.

Meanwhile, the liquid crystal display of the seventh work example illustrated in FIG. 22 is the modification of the fifth work example illustrated in FIG. 15, but the modified examples of the fifth work example illustrated in FIG. 16 or 17 may also be applicable to the seventh work example.

Eighth Work Example

Figure 23:
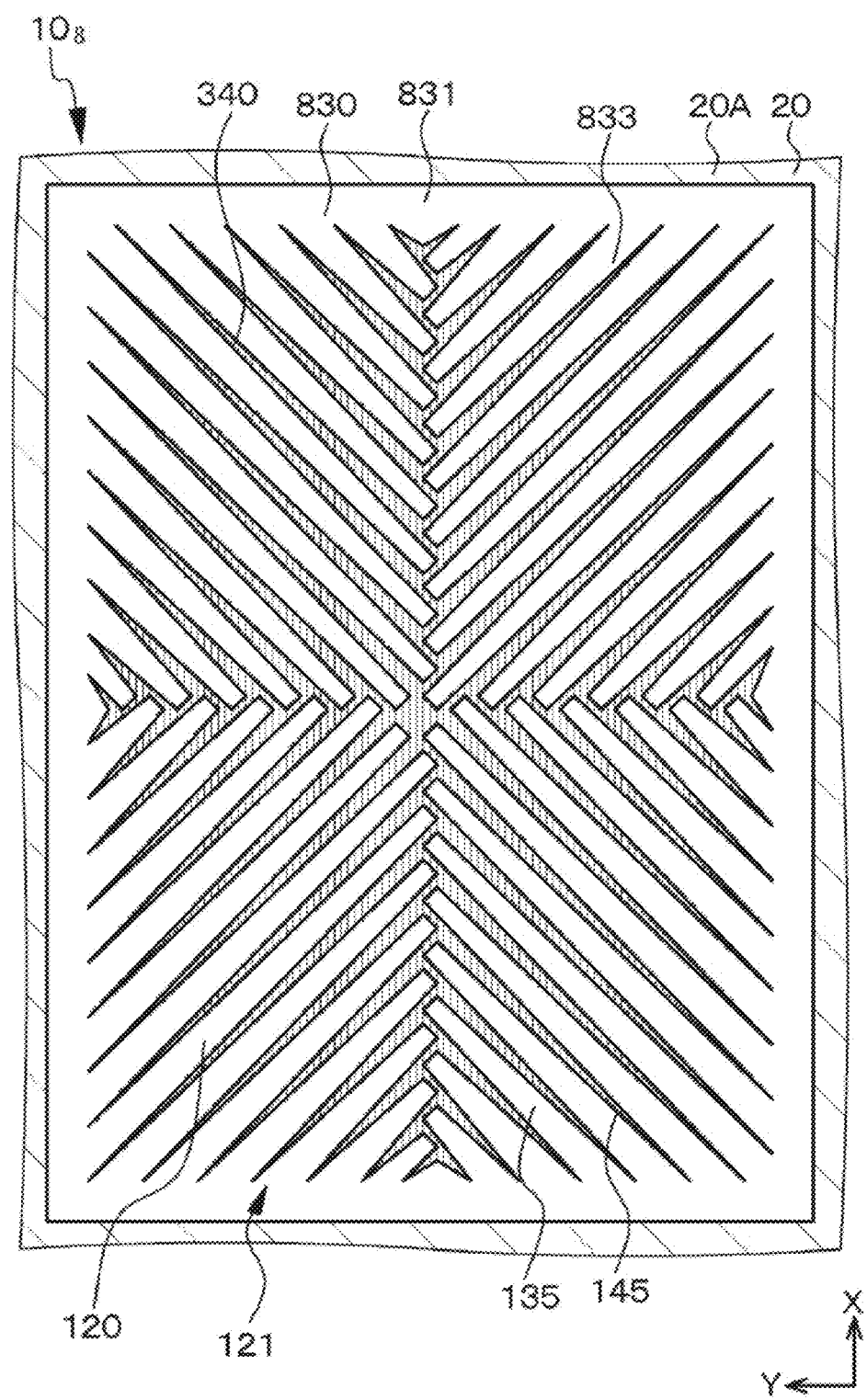
FIG. 23 is a schematic plan view of a first electrode of one pixel constituting a liquid crystal display of an eighth work example.
Figure 24:
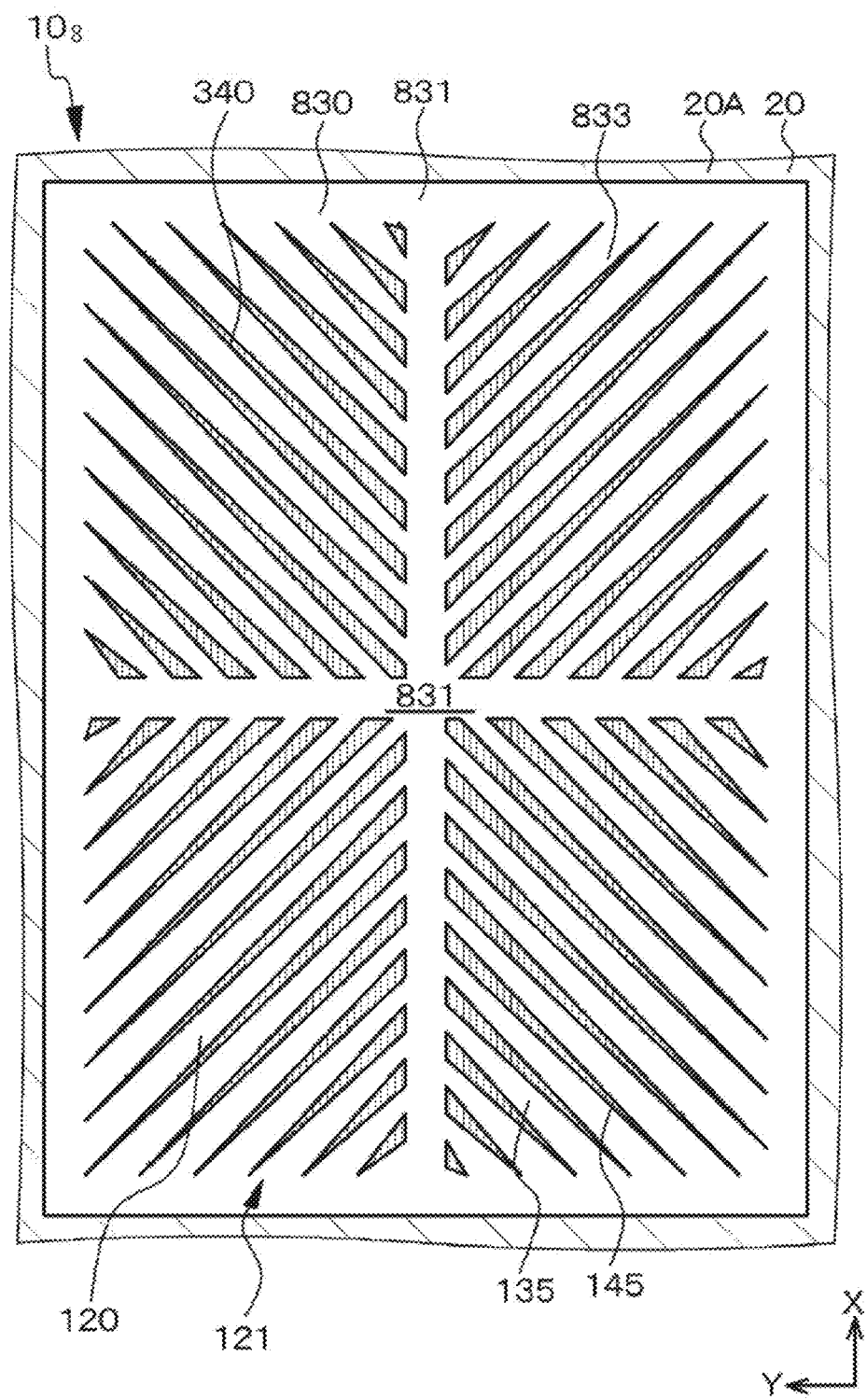
FIG. 24 is a schematic plan view of a first electrode of one pixel constituting a modified example of the liquid crystal display of the eighth work example.

A eighth work example is also a modification of the fourth to sixth work examples and relates to liquid crystal displays according to a fourth-E aspect and a fifth-E aspect of the present disclosure. FIGS. 23 and 24 are schematic diagrams of a pixel $10_8$ in a first substrate 20 constituting the liquid crystal display of the eighth work example when viewed from above. The liquid crystal display illustrated in FIG. 23 is the modification of the liquid crystal display of the sixth work example, and the liquid crystal display illustrated in FIG. 24 is the modification of the liquid crystal display of the fourth work example. A schematic partial end face view of the liquid crystal display of the eighth work example is substantially the same as FIG. 1.

In the liquid crystal display of the eighth work example, in the case of defining a forming pitch of a branch projecting portion 833 along the X-axis as $P_X$ and defining a forming pitch of the branch projecting portion 833 along the Y-axis as $P_Y$ ($=P_X$), a width of the branch projecting portion 833 is ($P_Y/2=P_X/2$) and a width of the recessed portion 340 is ($P_Y/2=P_X/2$).

In the liquid crystal displays of the eighth work example, in the case of assuming the (X, Y) coordinate system in which the respective straight lines passing the pixel center portion and parallel to the pixel peripheral portion are set as the X-axis and the Y-axis, a plurality of branch projecting portions 833 occupying a first quadrant extends in parallel in a direction in which a value of the Y-coordinate increases when a value of the X-coordinate increases, a plurality of branch projecting portions 833 occupying a second quadrant extends in parallel in a direction in which the value of the Y-coordinate increases when the value of the X-coordinate decreases, a plurality of branch projecting portions 833 occupying a third quadrant extends in parallel in a direction in which the value of the Y-coordinate decreases when the value of the X-coordinate decreases, a plurality of branch projecting portions 833 occupying a fourth quadrant extends in parallel in a direction in which the value of the Y-coordinate decreases when the value of the X-coordinate increases, the branch projecting portion 833 extending from the trunk projecting portion 831 in parallel to the X-axis and occupying the first quadrant and the branch projecting portion 833 extending from the trunk projecting portion 831 in parallel to the X-axis and occupying the fourth quadrant are formed in a deviated state (preferably, formed in a state deviated from each other by ($P_X/2$)), the branch projecting portion 833 extending from the trunk projecting portion 831 in parallel to the Y-axis and occupying the first quadrant and the branch projecting portion 833 extending from the trunk projecting portion 831 in parallel to the Y-axis and occupying the second quadrant are formed in a deviated state (preferably, formed in a state deviated from each other by ($P_Y/2$)), the branch projecting portion 833 extending from the trunk projecting portion 831 in parallel to the X-axis and occupying the second quadrant and the branch projecting portion 833 extending from the trunk projecting portion 831 in parallel to the X-axis and occupying the third quadrant are formed in a deviated state (preferably, formed in a state deviated from each other by ($P_x/2$)), and the branch projecting portion 833 extending from the trunk projecting portion 831 in parallel to the Y-axis and occupying the third quadrant and the branch projecting portion 833 extending from the trunk projecting portion 831 in parallel to the Y-axis and occupying the fourth quadrant are formed in a deviated state (preferably, formed in a state deviated from each other by ($P_y/2$)). The branch projecting portions 833 are not line-symmetric relative to the X-axis and the Y-axis, and are rotationally symmetric (point-symmetric) at 180 degrees with respect to the pixel center.

By thus forming the branch projecting portion 833 and the branch projecting portion 833 in a state deviated from each other by a half pitch, an electrical field generated by the first electrode 120 at the pixel center is distorted in the vicinity of the pixel center, and a falling direction of a liquid crystal molecule is determined. As a result, orientation control force relative to the liquid crystal molecule in the vicinity of the pixel center can be enhanced, and a tilting state of the liquid crystal molecule in the vicinity of the pixel center can be surely determined. Therefore, the time required to stabilize orientation of the liquid crystal molecule exposed to a desired electrical field can be shortened although a liquid crystal layer is exposed to the desired electrical field for a predetermined time in order to provide a pretilt angle to the liquid crystal molecule at the time of manufacturing the liquid crystal display. In other words, a pretilt angle can be provided to the liquid crystal molecule in a short time and manufacturing time of the liquid crystal display can be shortened.

Figure 25:
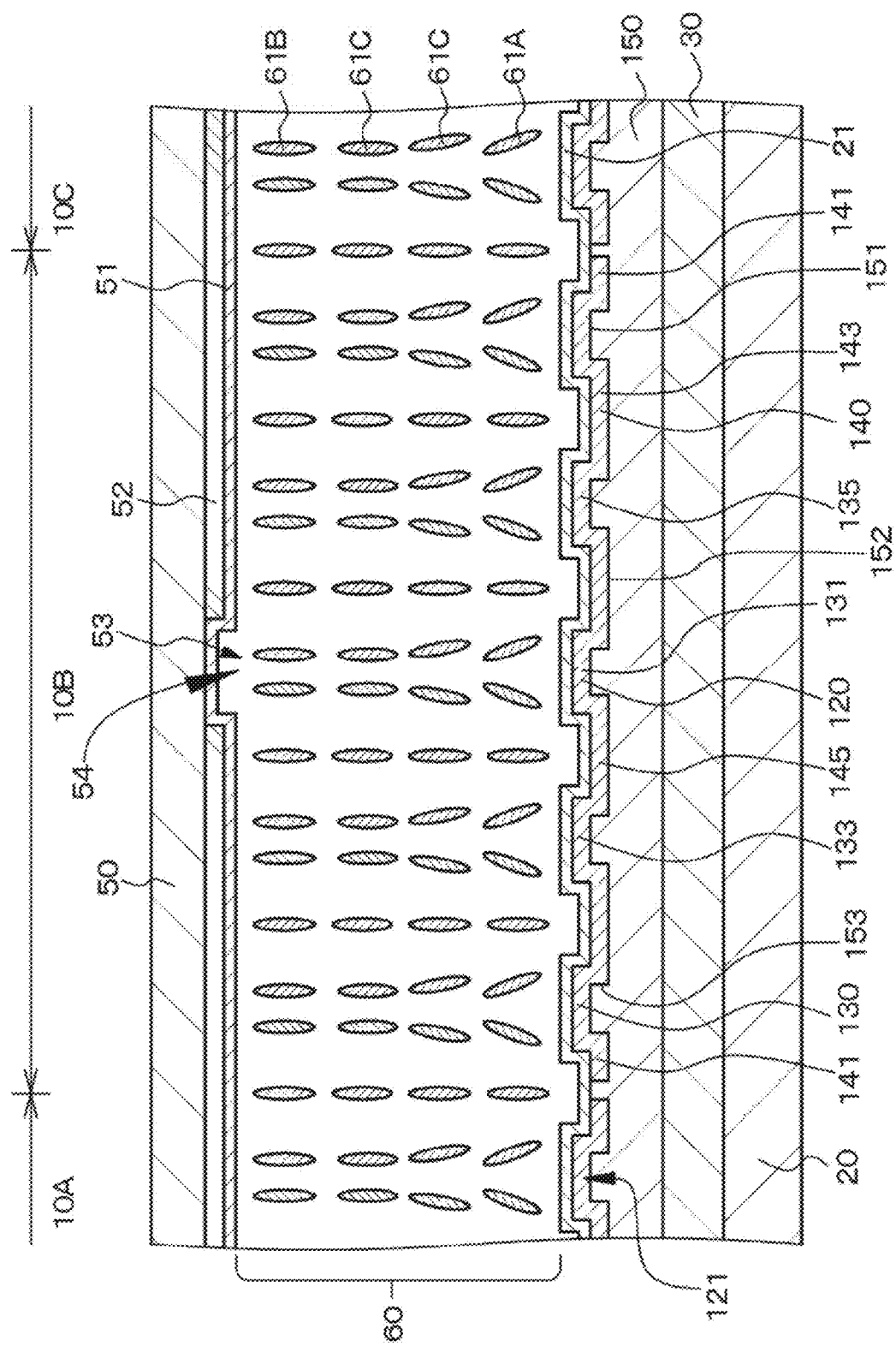
FIG. 25 is a schematic partial end face view of a liquid crystal display of a ninth work example.
Figure 26:
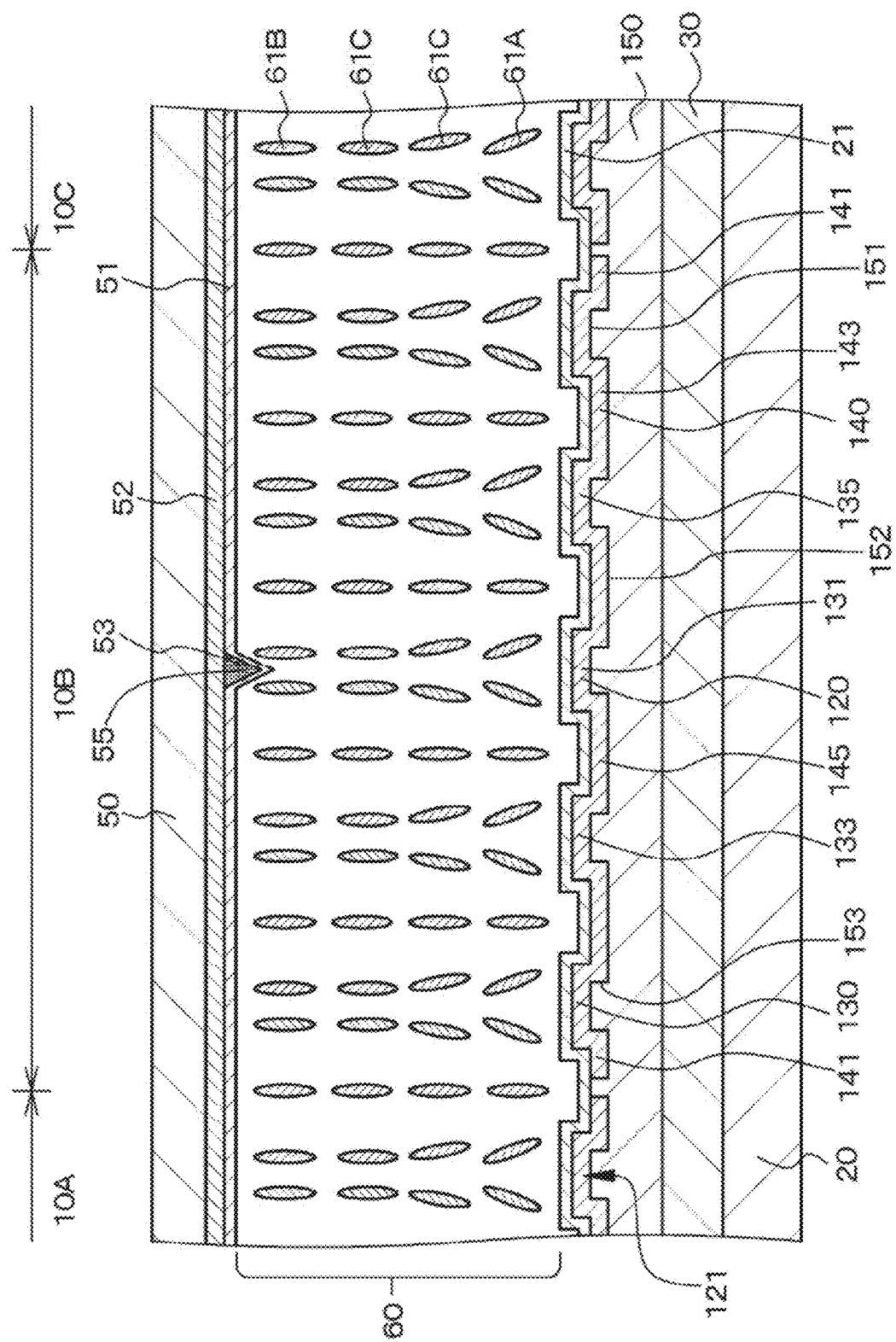
FIG. 26 is a schematic partial end face view of a modified example of the liquid crystal display of the ninth work example.
Figure 44B:
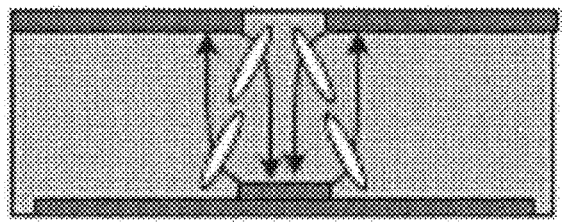
FIGS. 44B and 44C are conceptual diagrams illustrating behavior of liquid crystal molecules in the liquid crystal display of the ninth work example.

The modified example of the fifth work example illustrated in FIG. 16 or 17 may also be applicable to the eighth work example, Ninth Work Example A ninth work example is a modification of the liquid crystal displays according to a first-A aspect (first work example and modification thereof), a second aspect, a third aspect (third work example and modification thereof), a fourth-A aspect, and a fifth-A aspect (fourth work example and modification thereof) of the present disclosure. A schematic partial end face view of the liquid crystal display of the ninth work example is illustrated in FIG. 25 or FIG. 26. Additionally, conceptual diagrams illustrating behavior of liquid crystal molecules in the liquid crystal display of the ninth work example are illustrated in FIGS. 44B and 44C.

In the liquid crystal display of the ninth work example, as illustrated in FIGS. 2 to 4, 7, 10, 11, 12, 13, and 14, the trunk projecting portions 131, 331 or the second trunk projecting portion 432 passing the pixel center portion and radially extending (such as in a cross shape) (specifically, extending in parallel to the X-axis and the Y-axis, for example) are formed on the first electrode 120. Furthermore, as illustrated in FIG. 25 or 26, the orientation control unit 53 is formed at a portion of the second electrode 52 corresponding to the trunk projecting portions 131, 331 or the second trunk projecting portion 432.

Figure 44C:
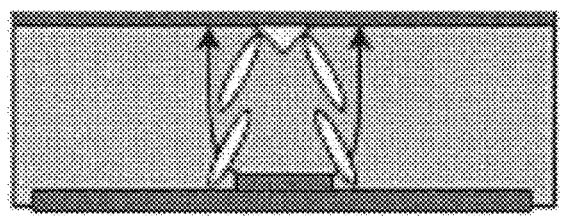

Here, the orientation control unit 53 is formed of, specifically, a second electrode slit structure 54 of 4.0 μm provided at the second electrode 52 (refer to FIGS. 25 and 44B) or formed of a second electrode protruding portion (rib) 55 provided at the second electrode 52 (refer to FIGS. 26 and 44C). The second electrode protruding portion 55 is formed of, more specifically, a negative photo-resist material (OPTMER-AL: manufactured by JSR Corporation), and has a width of 1.4 μm and a height of 1.2 μm. A planar shape of the second electrode slit structure 54 or the second electrode protruding portion (rib) 55 is radial (for example, a cross shape extending in, for example, X-axis and Y-axis), and a cross-sectional shape of the second electrode protruding portion 55 is an isosceles triangle. The second electrode 52 is not formed on the second electrode slit structure 54 or the second electrode protruding portion 55.

In the liquid crystal display of the ninth work example, since the orientation control unit 53 formed of the second electrode slit structure 54 is formed at the portion of the second electrode 52 corresponding to the trunk projecting portions 131, 331 or the second trunk projecting portion 432, an electrical field generated by the second electrode 52 is distorted in the vicinity of the orientation control unit 53. Alternatively, since the orientation control unit 53 formed of the second electrode protruding portion (rib) 55 is formed, a falling direction of a liquid crystal molecule in the vicinity of the second electrode protruding portion 55 is determined. As a result, orientation control force relative to the liquid crystal molecule in the vicinity of the orientation control unit 53 can be enhanced, and a tilting state of the liquid crystal molecule in the vicinity of the orientation control unit 53 can be surely determined. Therefore, occurrence of a problem such as generation of dark lines at a portion of an image corresponding to the trunk projecting portion can be surely suppressed at the time of image display. In other words, it is possible to provide the liquid crystal display capable of having more uniform and high light transmissivity while maintaining excellent voltage response characteristics. Moreover, cost for a light source constituting a back light can be reduced, low power consumption can be achieved, and reliability of a TFT can be improved. The orientation control unit 53 may also be formed of a portion of the second electrode 52 having a protruding shape.

Tenth Work Example

Figure 27:
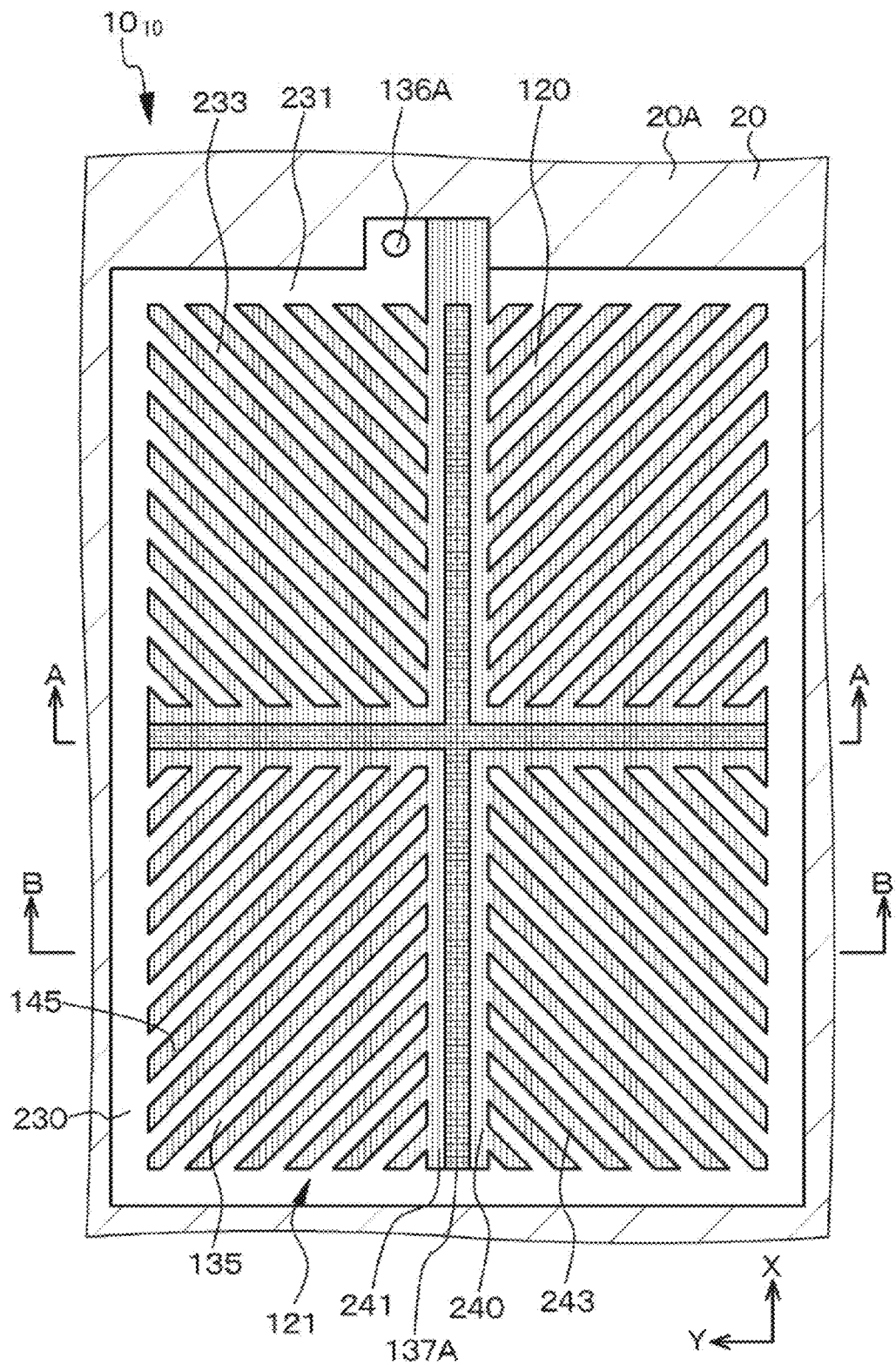
FIG. 27 is a schematic plan view of a first electrode of one pixel constituting a liquid crystal display of a tenth work example.
Figure 28:
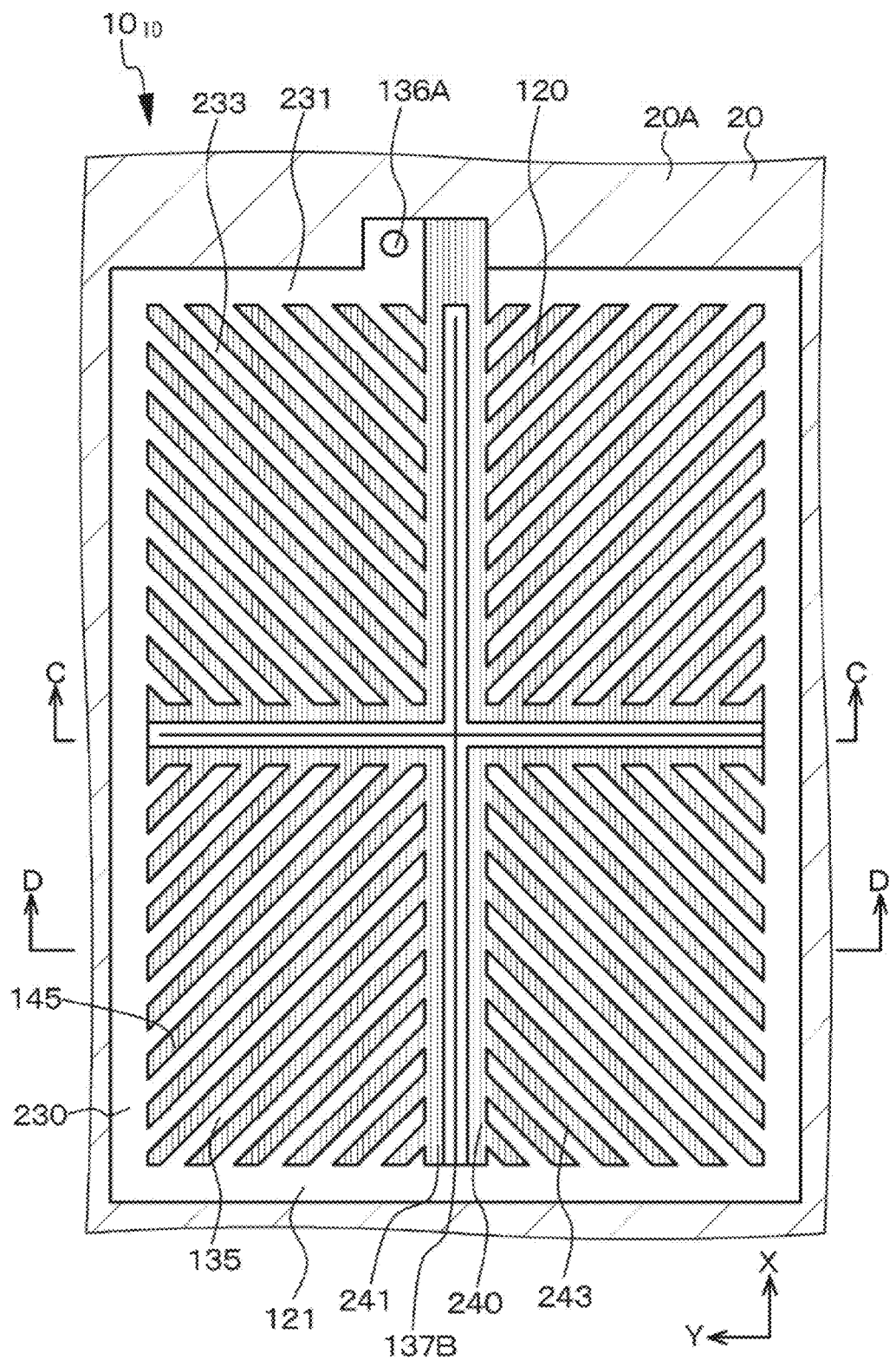
FIG. 28 is a schematic plan view of a modified example of the first electrode of one pixel constituting the liquid crystal display of the tenth work example.
Figure 29A:
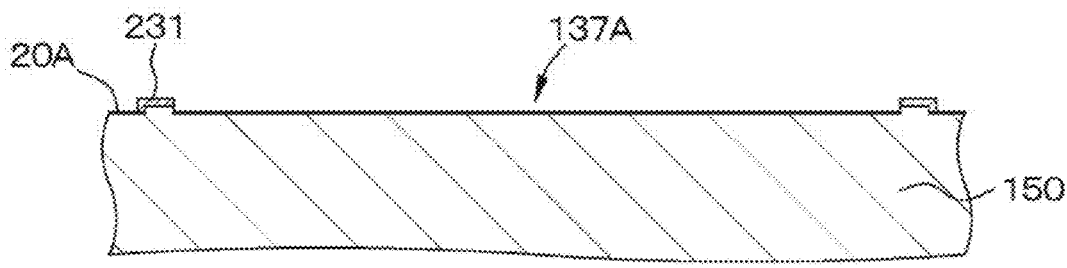
FIGS. 29A and 29B are schematic partial end face views of the first electrode and the like in the liquid crystal display of the tenth work example taken along an arrow A-A and an arrow B-B in FIG. 27, and FIGS. 29C and 29D are schematic partial end face views of the first electrode and the like in the liquid crystal display of the tenth work example taken along an arrow C-C and an arrow D-D in FIG. 28.
Figure 29B:
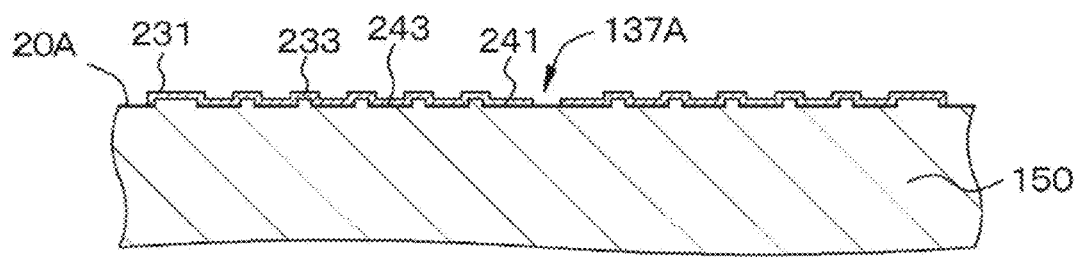
Figure 29C:
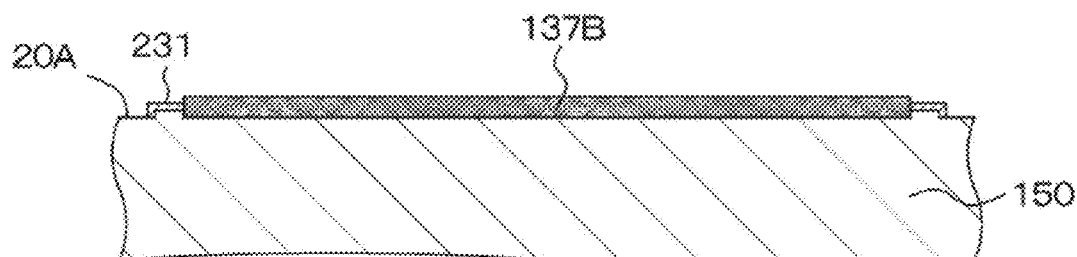
Figure 29D:
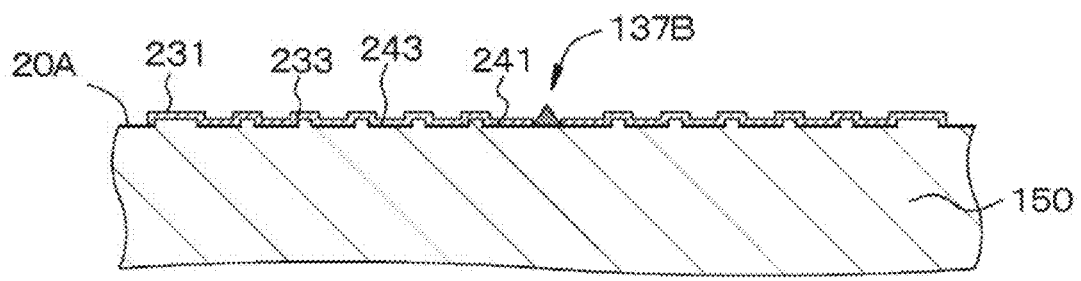

A tenth work example is a modification of the liquid crystal displays according to the first-A aspect (first work example and modification thereof), first-B aspect (second work example and modification thereof), second and third aspects (third work example and modification thereof), fourth-A and fifth-A aspects (fourth work example and modification thereof), and fourth-B and fifth-B aspects (fifth work example and modification thereof) of the present disclosure. Schematic diagrams of a pixel 10₁₀ on the first substrate constituting the liquid crystal display of the tenth work example when viewed from above are illustrated in FIGS. 27 and 28, schematic partial end face view of the first electrode and the like taken along an arrow A-A and an arrow B-B in FIG. 27 are illustrated in FIGS. 29A and 29B, and schematic partial end face view of the first electrode taken along an arrow C-C and an arrow D-D in FIG. 28 are illustrated in FIGS. 29C and 29D. Examples illustrated in FIGS. 27 and 28 are modified examples of the second work example.

In the liquid crystal display of the tenth work example, a first electrode slit structure 137A (refer to FIG. 27) or a first electrode protruding portion (rib) 137B (refer to FIG. 28) passing a pixel center portion and parallel to a pixel peripheral portion is formed on the first electrode 120. In other words, the first electrode slit structure 137A or the first electrode protruding portion 137B is formed at a trunk recessed portion 241 provided at a center portion of the pixel and having a radial shape (for example, a cross shape). A planar shape of the first electrode slit structure 137A or the first electrode protruding portion 137B is radial (for example, a cross shape and extending in parallel to, for example, X-axis and Y-axis). A width of the first electrode slit structure 137A is set to 4.0 µm. Additionally, a width of the first electrode protruding portion 137B formed of a negative photo-resist material (OPTMER-AL: manufactured by JSR Corporation) is set to 1.4 µm, and the height is set to 1.2 µm. A cross-sectional shape of the first electrode protruding portion 137B is an isosceles triangle. The first electrode 120 is not formed on the first electrode slit structure 137A or the first electrode protruding portion 137B.

In the liquid crystal display of the tenth work example, the first electrode slit structure or the first electrode protruding portion passing the pixel center portion and parallel to the pixel peripheral portion is formed on the first electrode. Therefore, compared to the case of forming, on the first electrode, a flat projecting portion or a flat recessed portion without having the first electrode slit structure or the first electrode protruding portion, an electrical field generated by the first electrode is distort in the vicinity of the first electrode slit structure or the first electrode protruding portion (in the case where the first electrode slit structure is formed) or a falling direction of a liquid crystal molecule is determined (in the case where the first electrode protruding portion is formed). As a result, orientation control force relative to the liquid crystal molecule in the vicinity of the first electrode slit structure or the first electrode protruding portion can be enhanced, and a tilting state of the liquid crystal molecule in the vicinity of the first electrode slit structure or the first electrode protruding portion can be surely determined. Therefore, occurrence of a problem such as generation of dark lines at a portion of the image corresponding to the trunk projecting portion, second trunk projecting portion, or the trunk recessed portion can be surely suppressed at the time of image display. In other words, it is possible to provide the liquid crystal display capable of having more uniform and high light transmissivity while maintaining excellent voltage response characteristics. Moreover, cost for a light source constituting a back light can be reduced, low power consumption can be achieved, and reliability of a TFT can be improved. In the first electrode 120, it may be possible to have a configuration in which the first electrode protruding portion 137B is formed by surrounding the projecting portion that passes the pixel center portion and having a radial shape (for example, a cross shape and extending in parallel to, for example, X-axis and Y-axis) by the recessed portion. Such a radial-shaped projecting portion may be provided by forming a radial projecting portion on a lower side of the first electrode 120, or may be provided by a method similar to the forming method of the uneven portion on the first electrode 120. Alternatively, a recessed portion that passes the pixel center portion and has a radial shape may be provided instead of providing the first electrode slit structure 137A or the first electrode protruding portion (rib) 137B.

Eleventh Work Example

An eleventh work example is a modification of the first to tenth work examples and relates to a liquid crystal display according to a six aspect of the present disclosure.

Figure 30A:
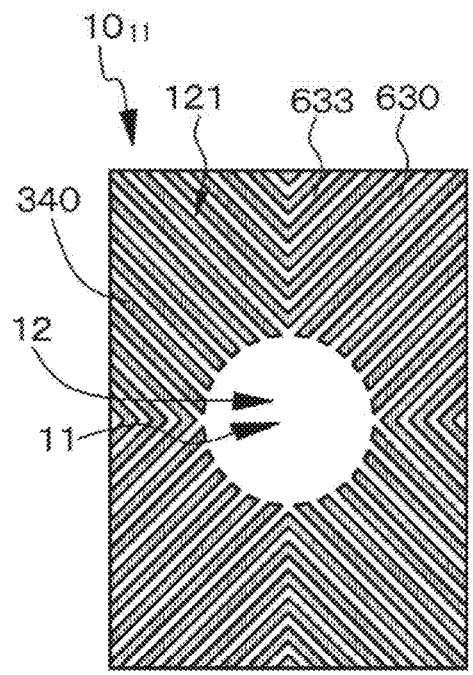
FIGS. 30A, 30B, and 30C are respectively: a diagram illustrating a schematic arrangement state of a projecting portion, a recessed portion, a center region, and the like; a diagram schematically illustrating an arrangement state of a slit portion provided at the first electrode; and a diagram in which an uneven portion and the slit portion are overlapped each other, in a portion of a pixel constituting a liquid crystal display of an eleventh work example.
Figure 30B:
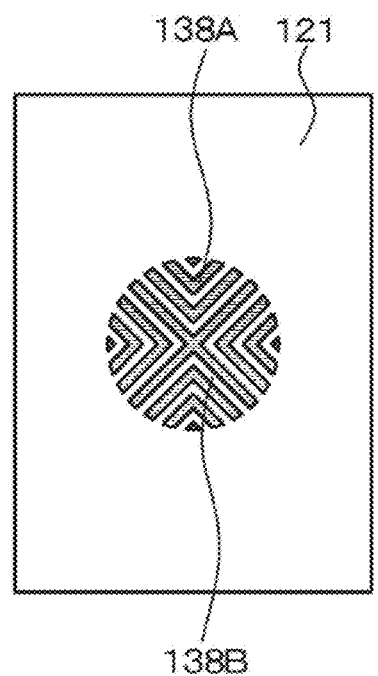
Figure 30C:
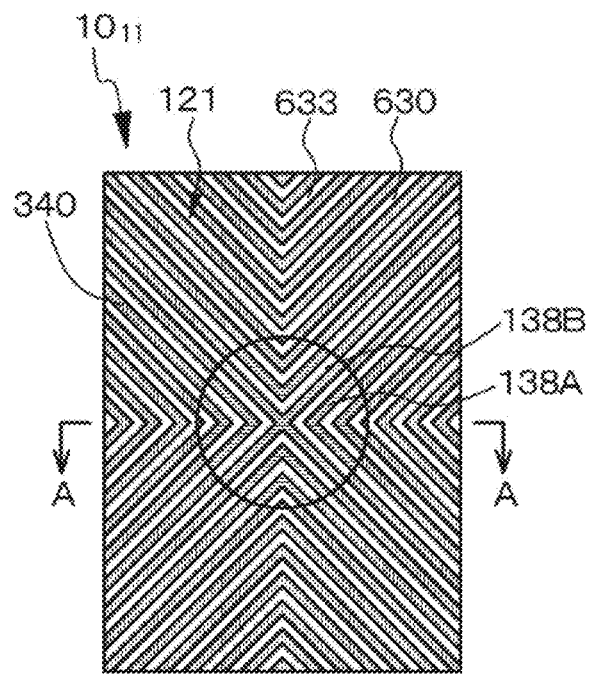
Figure 31A:
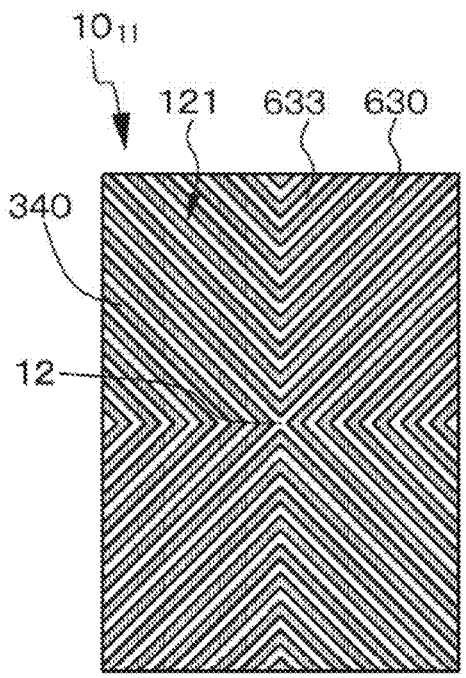
FIGS. 31A, 31B, and 31C are respectively: a diagram illustrating a schematic arrangement state of a projecting portion, a recessed portion, a center region, and the like; a diagram schematically illustrating an arrangement state of a slit portion provided at the first electrode; and a diagram in which an uneven portion and the slit portion are overlapped each other, in a portion of a modified example of the pixel constituting the liquid crystal display of the eleventh work example.
Figure 31B:
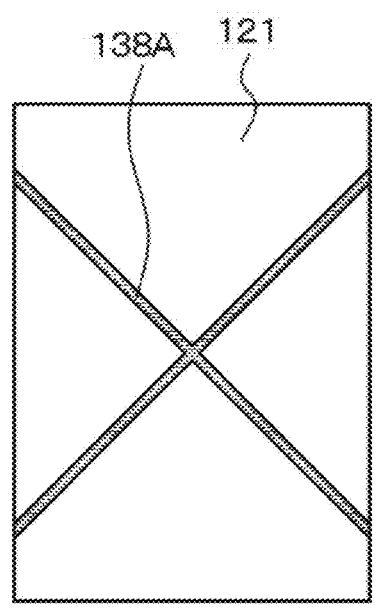
Figure 31C:
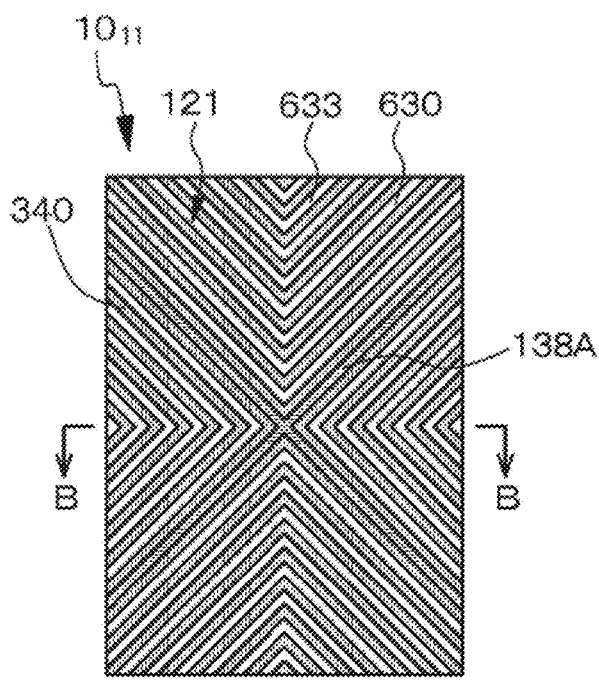
Figure 32A:
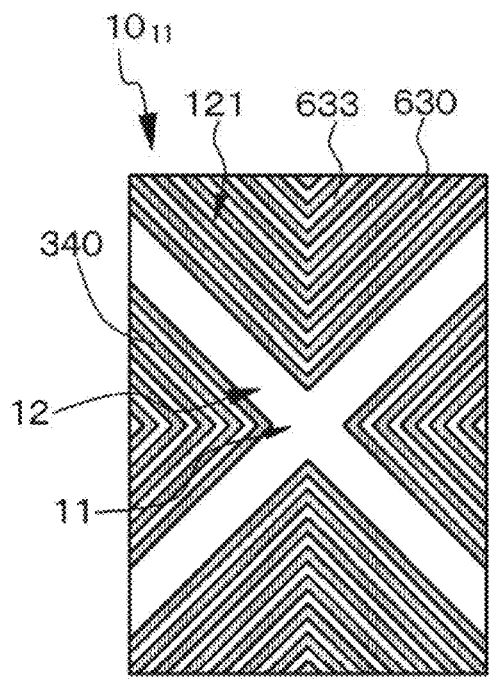
FIGS. 32A, 32B, and 32C are respectively: a diagram illustrating a schematic arrangement state of a projecting portion, a recessed portion, a center region, and the like; a diagram schematically illustrating an arrangement state of a slit portion provided at the first electrode; and a diagram in which an uneven portion and the slit portion are overlapped each other, in a portion of another modified example of the pixel constituting the liquid crystal display of the eleventh work example.
Figure 32B:
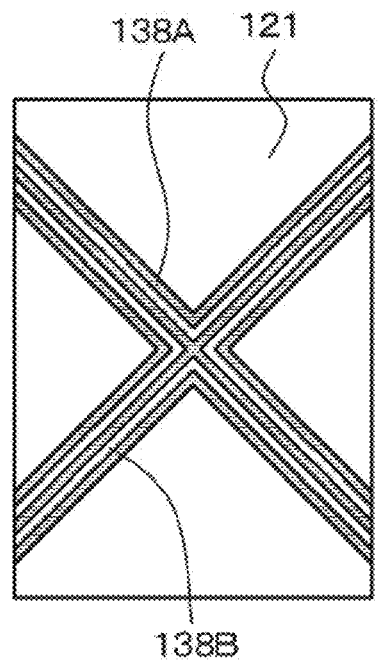
Figure 32C:
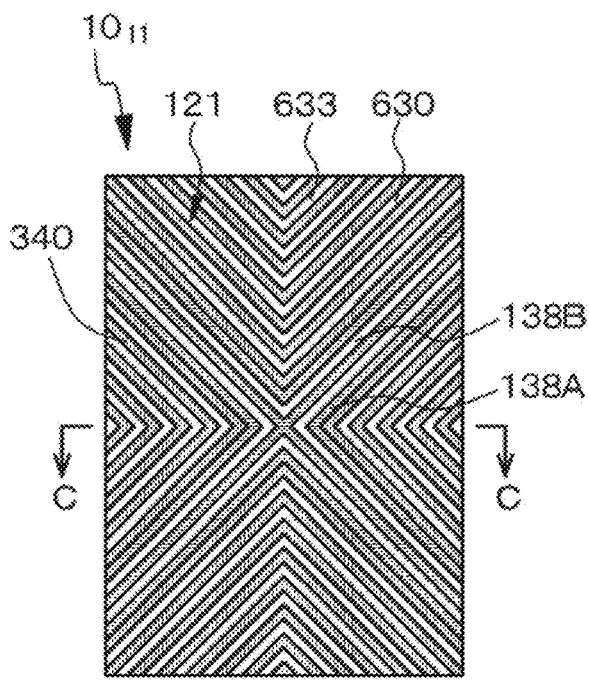

As illustrated in FIGS. 30A, 30B, 30C, 31A, 31B, 31C, 32A, 32B, 32C, 33A, 33B, and 33C which are schematic plan views of a first electrode and the like in a portion of a pixel constituting the liquid crystal display of the eleventh work example, a slit portion 138A is formed on a first electrode 120 in addition to an uneven portion 121. In the slit portion 138A, a transparent conductive material layer constituting the first electrode 120 is not formed. Meanwhile, FIG. 34A is a schematic end face view taken along an arrow A-A in FIG. 30C, FIG. 34B is a schematic end face view taken along an arrow B-B in FIG. 31C, FIG. 34C is a schematic end face view taken along an arrow C-C in FIG. 32C, and FIG. 34D is a schematic end face view taken along an arrow D-D in FIG. 33C. Note that the illustrated examples are modified examples of the sixth example, but needless to mention, the slit portion 138A is applicable to other work examples.

In the eleventh work example, the slit portion 138A is formed in a projecting region 12. Here, as illustrated in FIGS. 30A, 30B, and 30C, the slit portion 138A is provides in a region including a center region (center portion) 11 of a pixel $10_{11}$. Meanwhile, an arrangement state of the projecting portion 630, projecting region 12, recessed portion 340, and the center region 11 is schematically illustrated in FIG. 30A, an arrangement state of the slit portion 138A provided on the first electrode 120 is schematically illustrated in FIG. 30B, and a diagram in which the uneven portion 121 and the slit portion 138A are overlapped each other is illustrated in FIG. 30C.

Alternatively, as illustrated in FIGS. 31A, 31B, and 31C, the slit portion 138A is formed on one projecting region 12 (specifically, on one branch projecting portion 633) that extends toward the center region (center portion) of the pixel $10_{11}$ in each of the quadrants. Meanwhile, an arrangement state of the projecting portion 630, projecting region 12, and recessed portion 340 is schematically illustrated in FIG. 31A, an arrangement state of the slit portion 138A provided on the first electrode 120 is schematically illustrated in FIG. 31B, and a diagram in which the uneven portion 121 and the slit portion 138A are overlapped each other is illustrated in FIG. 31C.

Alternatively, as illustrated in FIGS. 32A, 32B, and 32C, the slit portion 138A is formed in the projecting region 12 that extends toward the center region (center portion) 11 of the pixel $10_{11}$ in each of the quadrants. Meanwhile, an arrangement state of the projecting portion 630, projecting region 12, recessed portion 340, and the center region 11 is schematically illustrated in FIG. 32A, an arrangement state of the slit portion 138A provided on the first electrode 120 is schematically illustrated in FIG. 32B, and a diagram in which the uneven portion 121 and the slit portion 138A are overlapped each other is illustrated in FIG. 32C.

Figure 33A:
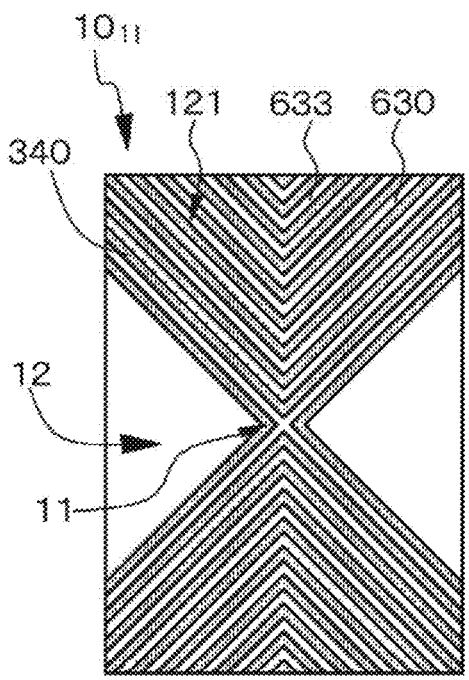
FIGS. 33A, 33B, and 33C are respectively: a diagram illustrating a schematic arrangement state of a projecting portion, a recessed portion, a center region, and the like; a diagram schematically illustrating an arrangement state of a slit portion provided at the first electrode; and a diagram in which an uneven portion and the slit portion are overlapped each other, in a portion of still another modified example of the pixel constituting the liquid crystal display of the eleventh work example.
Figure 33B:
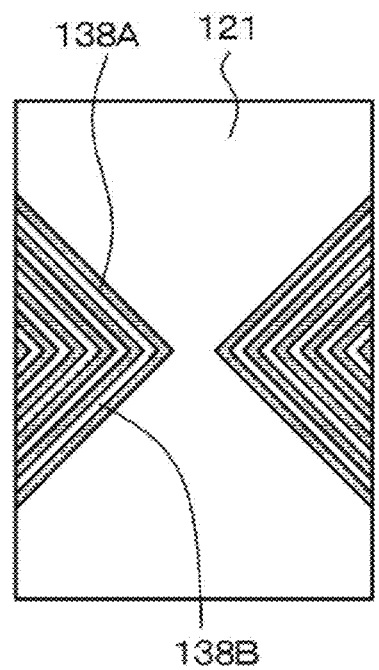
Figure 33C:
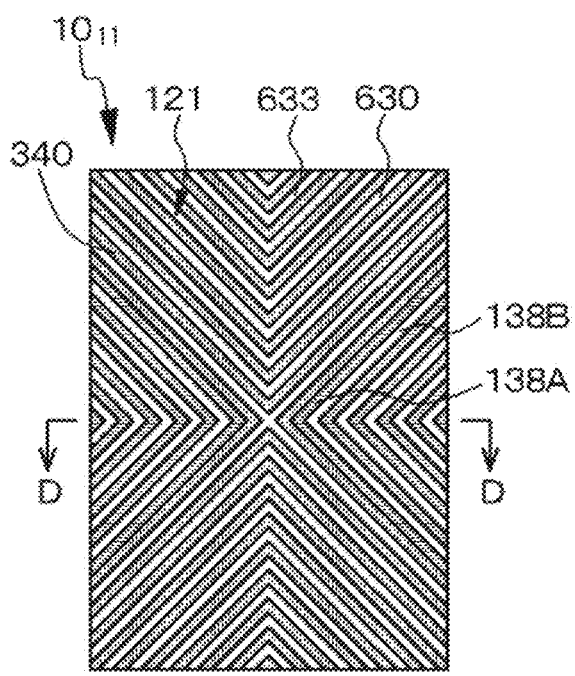
Figure 34A:
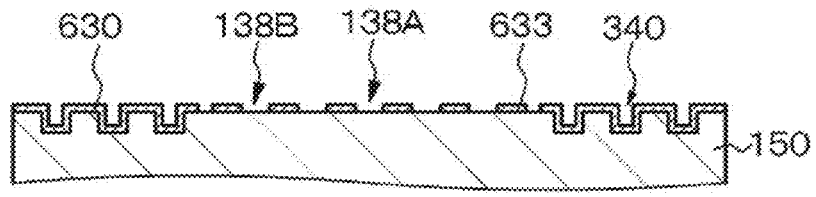
FIG. 34A is a schematic end face view taken along an arrow A-A in FIG. 30C.
Figure 34B:
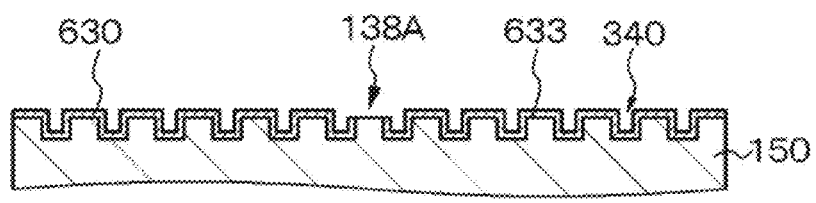
FIG. 34B is a schematic end face view taken along an arrow B-B in FIG. 31C.
Figure 34C:
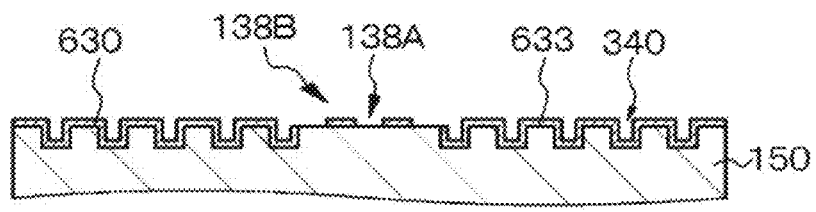
FIG. 34C is a schematic end face view taken along an arrow C-C in FIG. 32C.
Figure 34D:
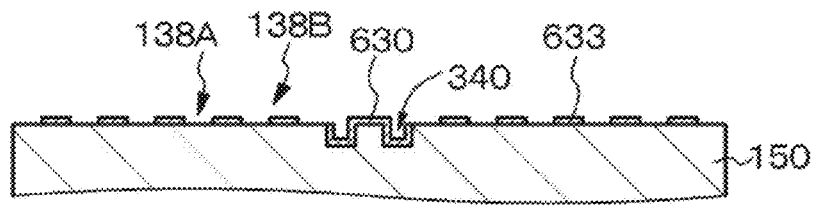
FIG. 34D is a schematic end face view taken along an arrow D-D in FIG. 33C.

Alternatively, as illustrated in FIGS. 33A, 33B, and 33C, the slit portion 138A is formed in the projecting region 12 provided in a region interposed between the Y-axis and a projecting portion extending toward the center region (center portion) 11 of the pixel $10_{11}$. Meanwhile, an arrangement state of the projecting portion 630, projecting region 12, recessed portion 340, and the center region 11 are schematically illustrated in FIG. 33A, an arrangement state of the slit portion 138A provided on the first electrode 120 is schematically illustrated in FIG. 33B, and a diagram in which the uneven portion 121 and the slit portion 138A are overlapped each other is illustrated in FIG. 33C.

Here, in FIGS. 30A, 30B, 30C, 31A, 31B, 31C, 32A, 32B, 32C, 33A, 33B, and 33C, the recessed portions 340 are indicated by thin vertical hatching. Additionally, in FIGS. 30B, 30C, 31B, 31C, 32B, 32C, 33B, and 33C, the slit portion 138A is indicated by thin horizontal hatching. In a region indicated by reference sign 138B, the slit portion is not provided, and transparent conductive material layers 135, 145 constituting the first electrode 120 are formed. In the slit portion 138A, a foundation layer 150 is exposed.

Figure 35A:
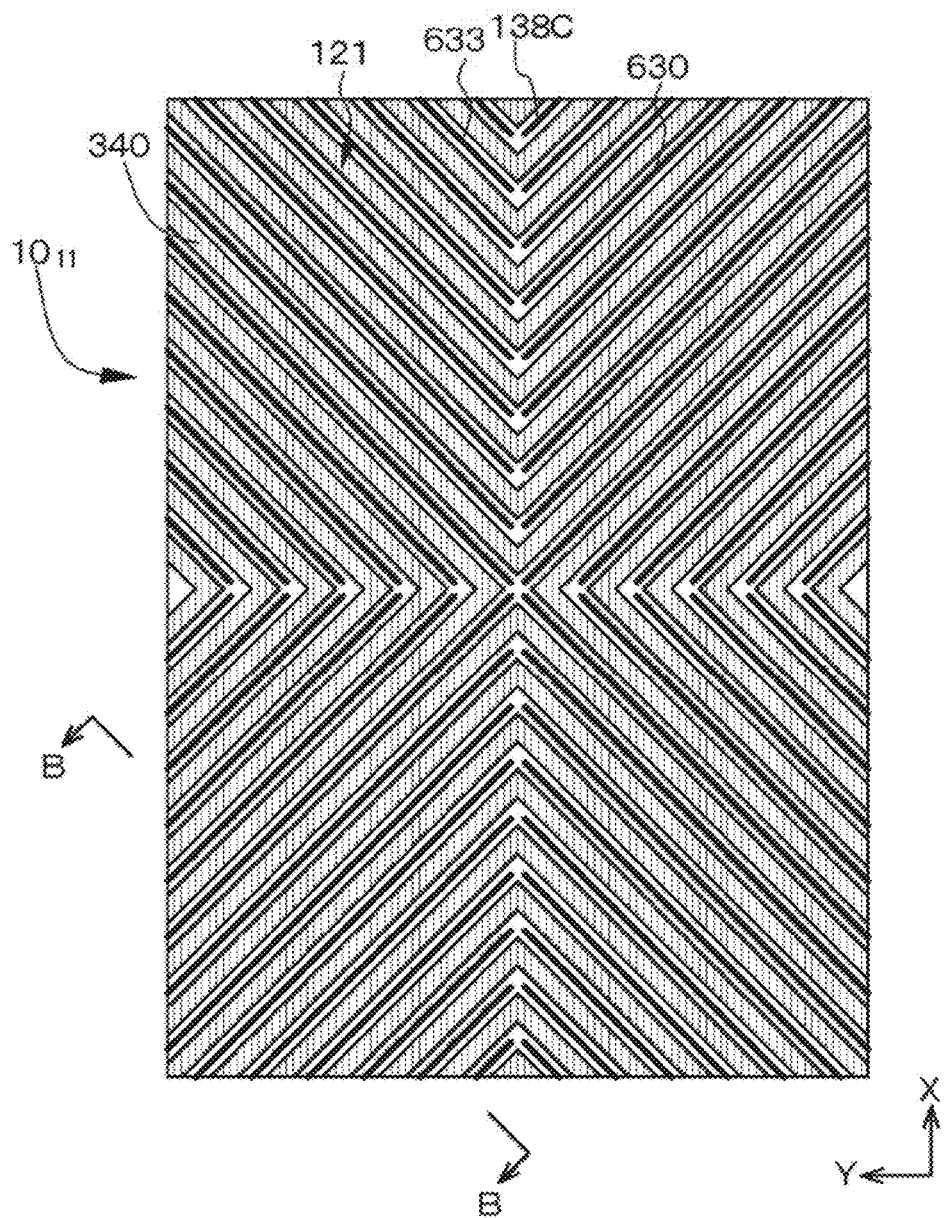
FIG. 35A is a diagram schematically illustrating an arrangement state of a projecting portion, a recessed portion, a slit portion, and the like and 35B is a schematic cross-sectional view of the first electrode and the like taken along an arrow B-B in FIG. 35A respectively in a portion of the still another modified example of the pixel constituting the liquid crystal display of the eleventh work example.
Figure 35B:
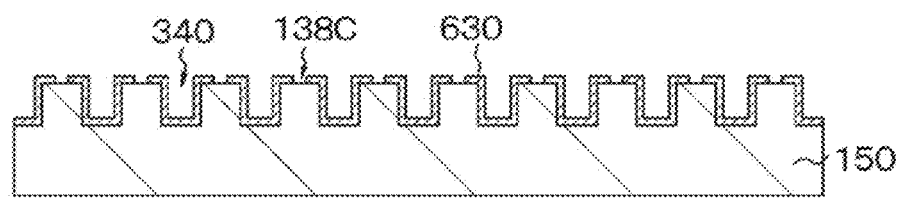
Figure 36A:
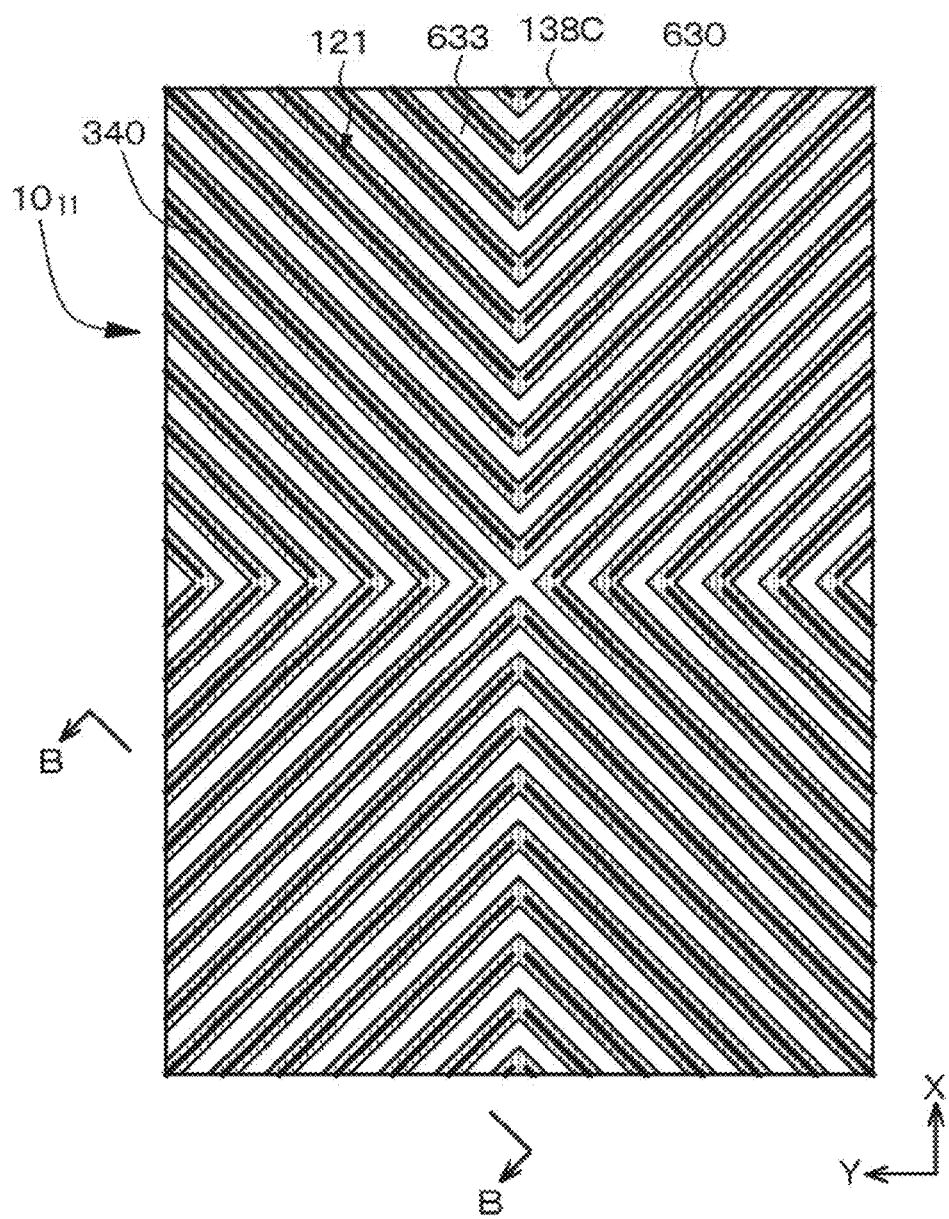
FIGS. 36A and 36B are respectively: a diagram schematically illustrating an arrangement state of a projecting portion, a recessed portion, a slit portion, and the like; and a schematic cross-sectional view of the first electrode and the like taken along an arrow B-B in FIG. 36A, in a portion of the still another modified example of the pixel constituting the liquid crystal display of the eleventh work example.
Figure 36B:
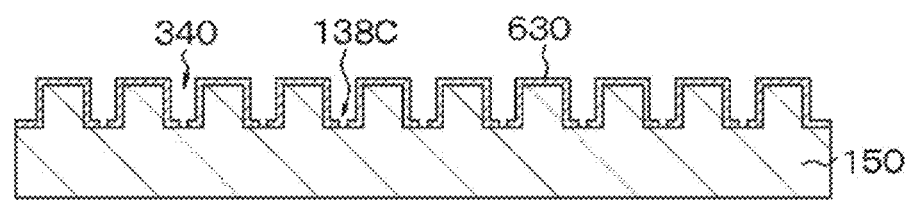

Alternatively, as shown in FIG. 35A schematically illustrating an arrangement state of the projecting portion, recessed portion, slit portion, and the like in a portion of another modified example of the pixel constituting the liquid crystal display of the eleventh work example, and as shown in FIG. 35B illustrating a schematic cross-sectional view of the first electrode and the like taken along an arrow B-B in FIG. 35A, a slit portion 138C extending in parallel to the projecting portion 630 may also be formed on a top portion of the projecting portion 630. Alternatively, as show in FIG. 36A schematically illustrating an arrangement state of the projecting portion, recessed portion, slit portion, and the like in still another modified example of the pixel constituting the liquid crystal display of the eleventh work example, and as shown in FIG. 36B illustrating a schematic cross-sectional view of the first electrode and the like taken along an arrow B-B in FIG. 36A, the slit portion 138C extending in parallel to the recessed portion 340 may also be formed on a bottom portion of the recessed portion 340. Note that the slit portion 138C is indicated by thick solid lines in FIGS. 35A and 36A. For example, in the examples illustrated in FIGS. 35A and 35B, (width of projecting portion, width of recessed portion, width of slit portion)=(7.0 µm, 3.0 µm, 3.0 µm). In the examples illustrated in FIGS. 36A and 36B, (width of projecting portion, width of recessed portion, width of slit portion)=(3.0 µm, 7.0 µm, 3.0 µm). Here, the slit portion 138C is formed such that a projecting portion 630 isolated from other projecting portions 630 is not formed by the slit portion 138C, or such that a recessed portion 340 isolated from other recessed portion 340 is not formed by the slit portion 138C, that is, such that all of uneven portions are electrically connected. In the examples illustrated in FIGS. 35A and 36A, the slit portion 138C is not provided at the projecting portion or the recessed portion on the X-axis and the Y-axis. In other words, a cut-out portion is provided at the slit portion 138C in the projecting portion or the recessed portion on the X-axis and the Y-axis. Meanwhile, it may also be possible to have a constitution in which the slit portion is not provided at the projecting portion or the recessed portion in the peripheral portion of the pixel $10_{11}$.

Thus, in the eleventh work example, not only the uneven portion 121 but also the slit portions 138A, 138C are formed on the first electrode 120. Therefore, an electrical field generated by the first electrode 120 is distorted in the vicinity of the slit portions 138A, 138C and a falling direction of a liquid crystal molecule is firmly determined. In other words, orientation control force relative to the liquid crystal molecule in the vicinity of the slit portions 138A, 138C can be enhanced, and a tilting state of the liquid crystal molecule in the vicinity of the slit portions 138A, 138C can be surely determined. Therefore, the time required to stabilize orientation of the liquid crystal molecule exposed to a desired electrical field can be shortened although a liquid crystal layer is exposed to the desired electrical field for a predetermined time in order to provide a pretilt angle to the liquid crystal molecule at the time of manufacturing the liquid crystal display. In other words, a pretilt angle can be provided to the liquid crystal molecule in a short time and manufacturing time of the liquid crystal display can be shortened. Meanwhile, not only the slit portion but also the uneven portion is provided, a problem of a fine slit structure in the related art is prevented from occurring.

Twelfth Work Example

Figure 37:
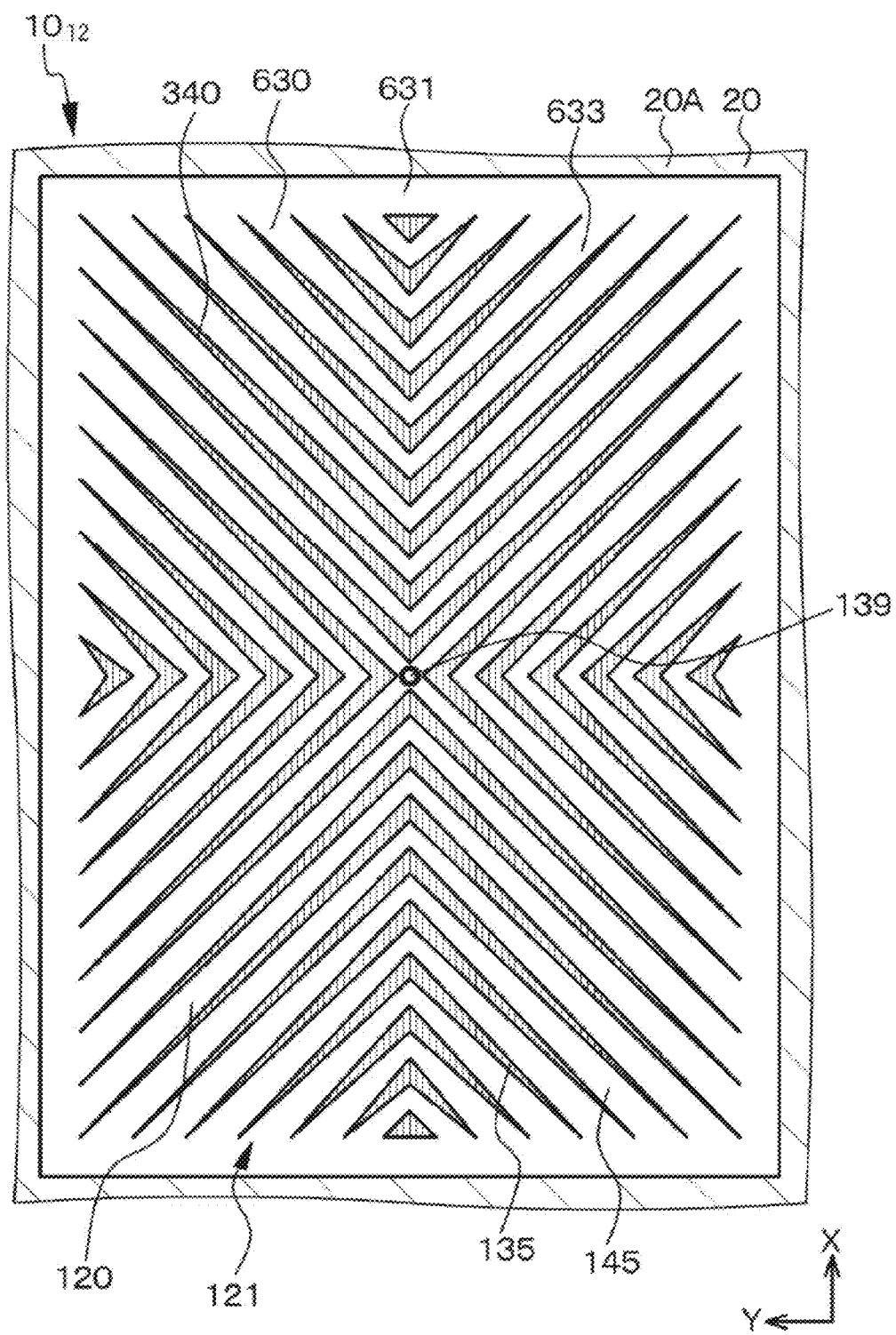
FIG. 37 is a schematic plan view of a first electrode of one pixel constituting a liquid crystal display of a twelfth work example.
Figure 38A:
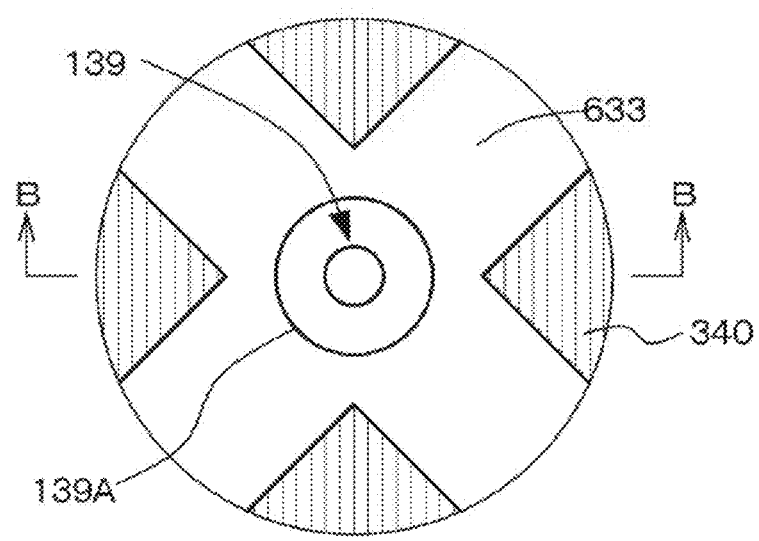
FIG. 38A is a schematic plan view of a portion of the first electrode in a center region of one pixel constituting the liquid crystal display of the twelfth work example.

A twelfth work example is a modification of the first to eleventh work examples and relates to a liquid crystal display according to a seventh aspect of the present disclosure. As shown in FIG. 37 illustrating a schematic plan view of a first electrode of one pixel constituting the liquid crystal display of the twelfth work example, and as shown in FIGS. 38A, 39A, and 39B illustrating schematic plan views of a portion of a first electrode in a center region of one pixel $10_{12}$ constituting the liquid crystal display of the twelfth work example, and further as illustrated in FIG. 38B illustrating a schematic partial cross-sectional view of the same, a dent 139 is provided at the first electrode 120 in the center region of the pixel $10_{12}$.

Figure 38B:
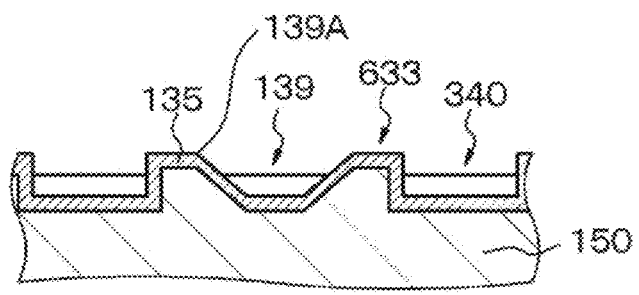
FIGS. 38B and 38C are schematic partial cross-sectional views of a portion of the first electrode in the center region of the one pixel constituting the liquid crystal display of the twelfth work example.
Figure 39A:
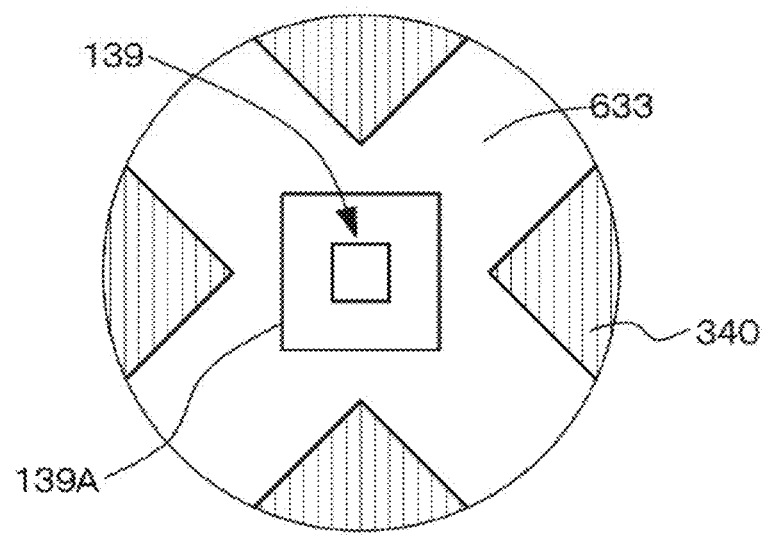
FIGS. 39A and 39B are schematic plan views of a portion of the first electrode in the center region of the one pixel constituting the liquid crystal display of the twelfth work example respectively.
Figure 39B:
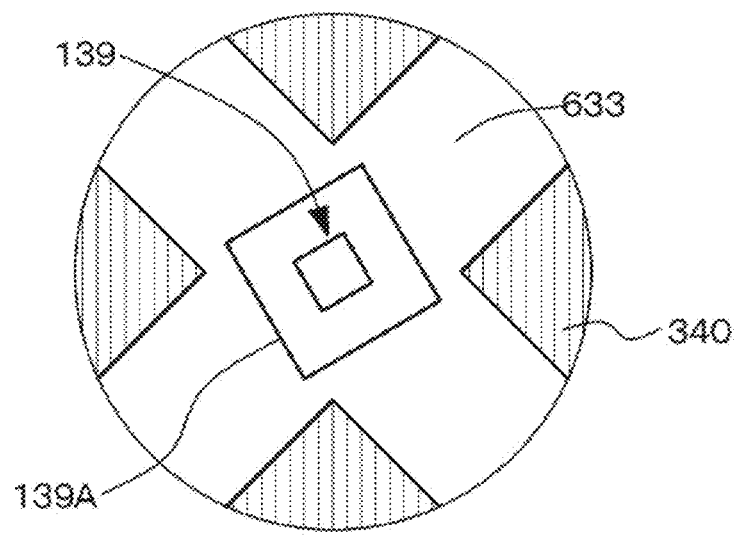

Here, as illustrated in FIG. 38B, the dent 139 becomes narrower toward the first substrate. In other words, the dent 139 includes a so-called forward tapered inclined plane. An inclination angle of the dent 139 is 5 to 60 degrees, preferably, 20 to 30 degrees. Such an inclination angle can be obtained by etching the foundation layer 150 on the basis of, for example, an etch-back method such that the foundation layer 150 is inclined. Furthermore, a shape of an outer edge 139A of the dent 139 may be a round shape as illustrated in FIG. 38A (diameter is 15 µm or 7 µm, for example), or may be a rectangular shape as illustrated in FIGS. 39A and 39B (for example, square having side length of 12 µm). An angle formed by the outer edge 139A of the dent 139 having the rectangular shape and an extending direction of the branch projecting portion 633 (angle formed by the outer edge 139A of the dent 139 having the rectangular shape and the extending direction of the branch projecting portion 633 where the outer edge 139A intersects with an extending portion of the branch projecting portion 633) may be 90 degrees (refer to FIG. 39A), or may also be an acute angle such as 60 degrees (refer to FIG. 39B).

Thus, in the liquid crystal display of the twelfth work example, since the dent 139 is provided on the first electrode 120 in the pixel center region, a liquid crystal molecule located in the vicinity of the dent 139 becomes a state of falling toward the pixel center. Therefore, the time required to stabilize orientation of the liquid crystal molecule exposed to a desired electrical field can be shortened although a liquid crystal layer is exposed to the desired electrical field for a predetermined time in order to provide a pretilt angle to the liquid crystal molecule at the time of manufacturing the liquid crystal display. In other words, a pretilt angle can be provided to the liquid crystal molecule in a short time and manufacturing time of the liquid crystal display can be shortened.

Figure 38C:
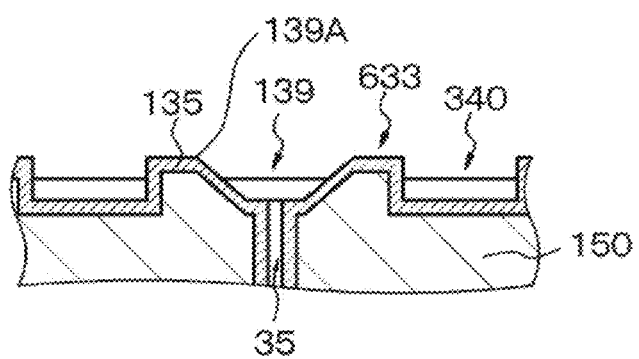

Meanwhile, as illustrated in FIG. 38C, it may be possible to have a constitution in which the center portion of the dent 139 constitutes a part of the contact hole (connecting hole 35). Furthermore, note that the illustrated examples are modified examples of the sixth example, but needless to mention, the dent 139 may be applicable to other work examples.

Thirteenth Work Example

A thirteenth work example relates to a modification of the first and fourth work examples. A schematic plan view of a first electrode of one pixel constituting the liquid crystal display of the thirteenth work example is illustrated in FIG. 40, and schematic plan views in which a portion of the first electrode surrounded by a round shape region is enlarged in the schematic plan view of the first electrode illustrated in FIG. 40 are illustrated in FIGS. 41A, 41B, 42.

In each of pixels $10_{13}$ of the liquid crystal display of the thirteenth work example, an extending direction of a side edge portion 432b of the second trunk projecting portion 432 not jointed to the branch projecting portion 433 is not parallel to the X-axis and also not parallel to the Y-axis. In other words, the extending direction of a side edge portion 432b of the second trunk projecting portion 432 not jointed to the branch projecting portion 433 is a direction different from the X-axis and also different from the X-axis. Meanwhile, the second trunk projecting portion 432 is line-symmetric with respect to the X-axis, and also line-symmetric with respect to the Y-axis, and further rotationally symmetric (point-symmetric) at 180 degrees with respect to the pixel center. Alternatively, in the liquid crystal display of the first work example, it is possible to have a constitution in which an extending direction of a side edge portion of the trunk projecting portion 131 not jointed to the branch projecting portion 133 is not parallel to the X-axis and also not parallel to the Y-axis. In other words, the extending direction of the side edge portion of the trunk projecting portion or the second trunk projecting portion not jointed to the branch projecting portion is different from the X-axis and the Y-axis. By adopting such a constitution, generation of dark line in regions corresponding to the X-axis and the Y-axis can be suppressed. As a result, it is possible to provide the liquid crystal display capable of achieving more uniform and higher light transmissivity. Moreover, it is possible to provide the liquid crystal display having a constitution and a structure capable of providing the liquid crystal molecule 61 with a pretilt angle in a short time.

Figure 40:
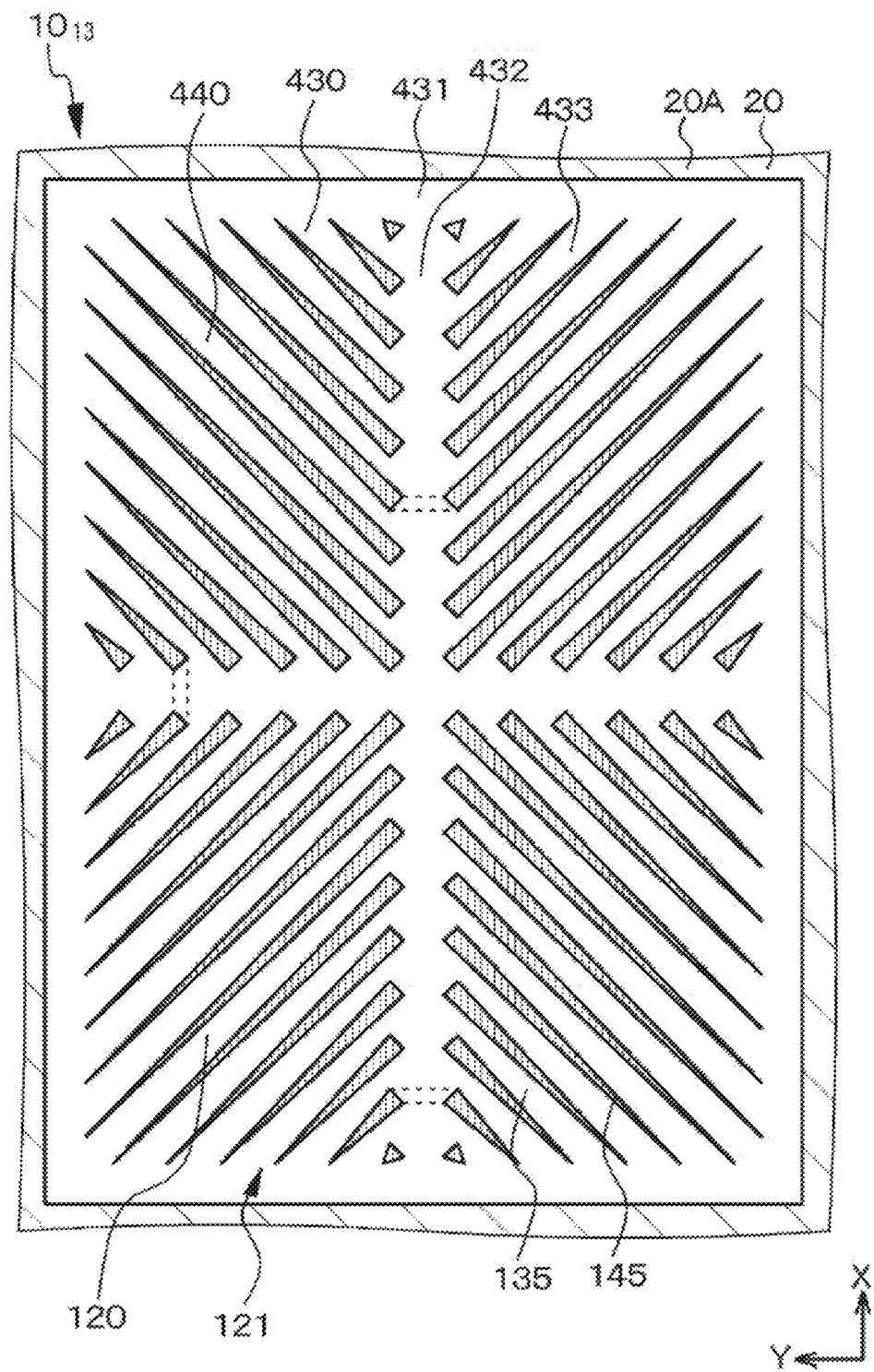
FIG. 40 is a schematic plan view of a first electrode of one pixel constituting a liquid crystal display of a thirteenth work example.
Figure 41A:
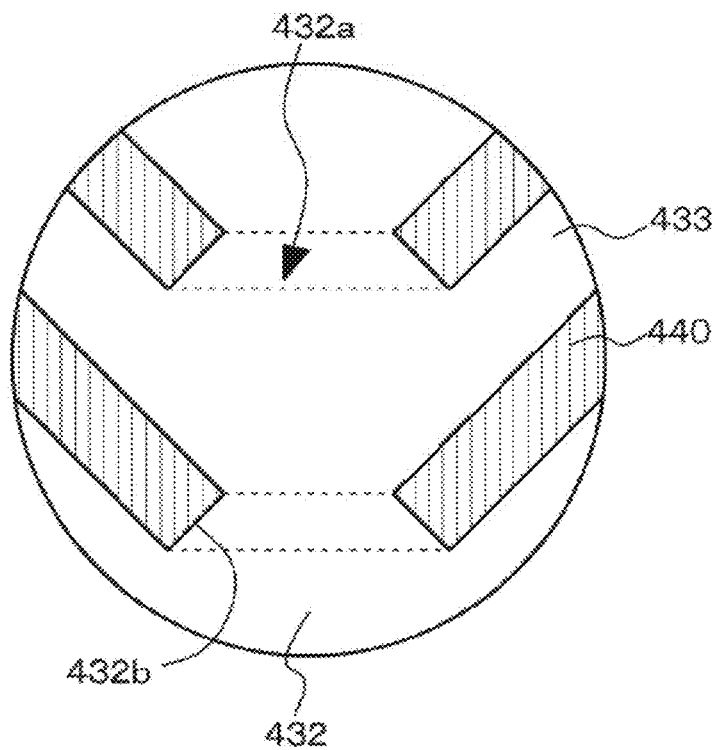
FIGS. 41A and 41B are schematic plan views in which a portion of the first electrode surrounded by a round shape region is enlarged in the schematic plan view of the first electrode illustrated in FIG. 40.
Figure 41B:
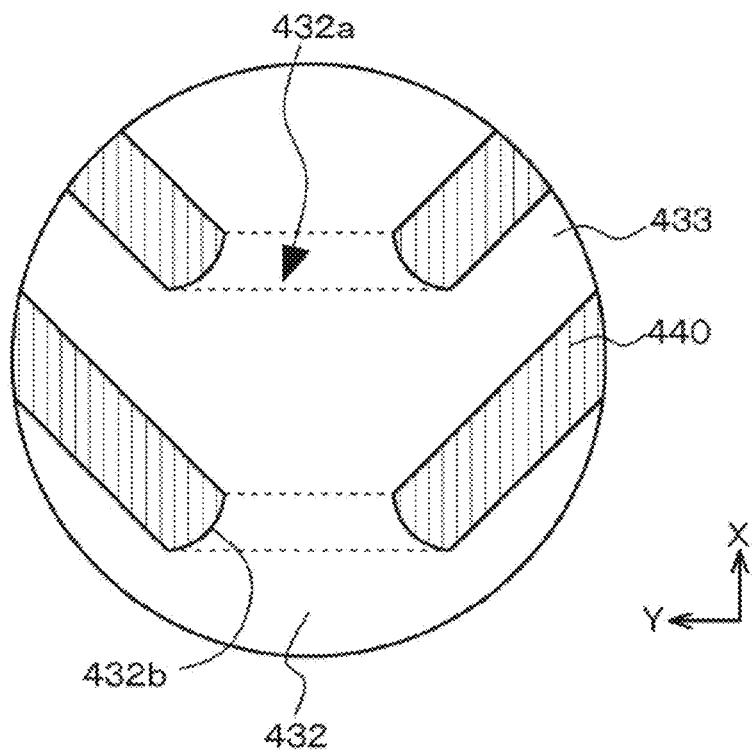
Figure 42:
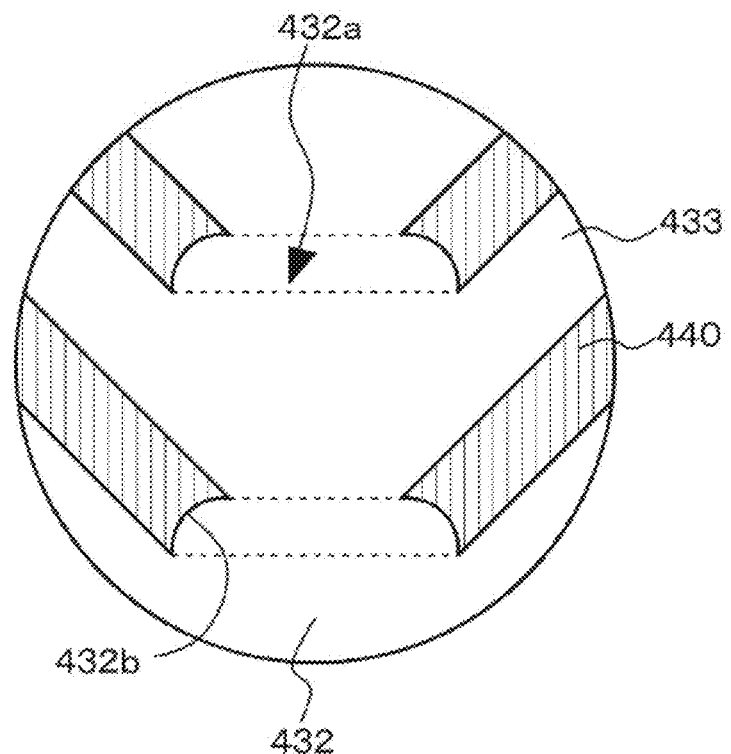
FIG. 42 is a schematic plan view in which a portion of the first electrode surrounded by a round shape region is enlarged in the schematic plan view of the first electrode illustrated in FIG. 40.

Specifically, the side edge portion 432b of the second trunk projecting portion 432 not jointed to the branch projecting portion 433 is straight line as illustrated in FIGS. 40 and 41A, or a curved line as illustrated in FIGS. 41B and 42. Furthermore, as illustrated in FIGS. 40, 41A, 41B, and 42, a width of a portion 432a of the second trunk projecting portion 432 not jointed to the branch projecting portion 433 becomes narrower toward a distal end portion of the second trunk projecting portion 432.

Thus, in the liquid crystal display of the thirteenth work example, a portion of the trunk projecting portion extending in parallel to the X-axis or a portion of the trunk projecting portion extending in parallel to the Y-axis do not exist. Therefore, it is possible to provide the liquid crystal display capable of achieving more uniform and high light transmissivity, and also it is possible to provide the liquid crystal display having a constitution and a structure capable of providing the liquid crystal molecule with a pretilt angle in a short time.

Fourteenth Work Example

Figure 43:
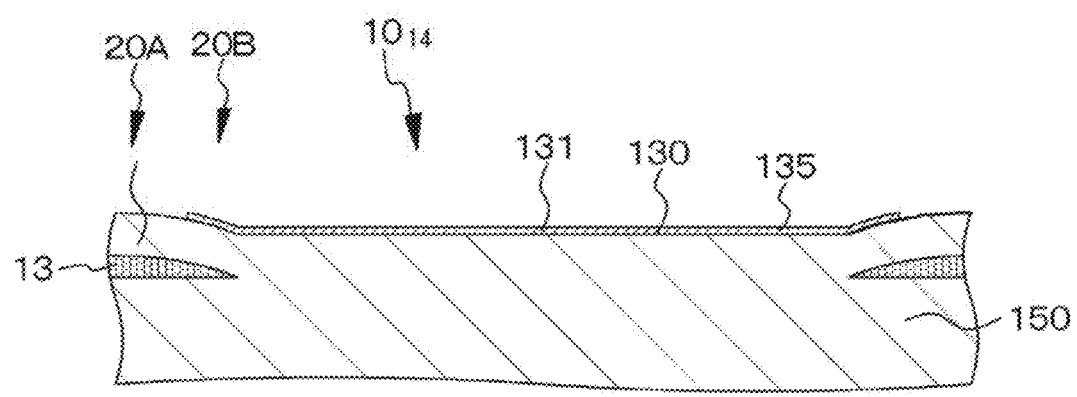
FIG. 43 is a schematic partial cross-sectional view of the first electrode and the like in a liquid crystal display of a fourteenth work example, and corresponds to the schematic partial cross-sectional view of the first electrode and the like taken along the arrow A-A in FIG. 2.

A fourteenth work example is a modification of a liquid crystal display described in the first to thirteenth work examples. A schematic plan view illustrating a first electrode of one pixel constituting the liquid crystal display of the fourteenth work example illustrated in FIG. 43, and the example illustrated in FIG. 43 is a modification of the first work example and corresponds to the schematic partial cross-sectional view of the first electrode and the like taken along the arrow A-A in FIG. 2.

In the liquid crystal display of the fourteenth work example, a projecting structure 13 is formed from a portion 20A of the first substrate 20 located between a pixel $10_{14}$ and a pixel $10_{14}$ to a portion 20B of the first substrate corresponding to the pixel peripheral portion, and a peripheral portion of the uneven portion 121 is formed on the projecting structure 13. Here, the projecting structure 13 is formed on the basis of a black matrix. The black matrix is formed of a light curing resin added with carbon. In the liquid crystal display of the fourteenth work example, a peripheral portion of the uneven portion 121 is formed on the projecting structure 13. Therefore, compared to a case where the peripheral portion of the uneven portion 121 is flat, an electrical field having more intensity is generated in the peripheral portion of the uneven portion. As a result, orientation control force relative to the liquid crystal molecule in the peripheral portion of the uneven portion 121 can be enhanced, and a tilting state of the liquid crystal molecule in the peripheral portion of the uneven portion 121 can be surely determined. Therefore, excellent voltage response characteristic can be maintained.

Meanwhile, the projecting structure is not limited to the configuration formed on the basis of the black matrix, and the projecting structure may have a constitution formed of a constituent element of the liquid crystal display formed on the first substrate 20 or above the first substrate 20, for example, various kinds of signal lines, auxiliary capacitance electrode, gate electrode, source/drain electrodes, and various kinds of wiring. Additionally, in this case, the projecting structure can be formed on the foundation layer 150 due to influence of a thickness of a constituent element of the liquid crystal display by optimizing a thickness of the foundation layer 150.

As described above, the present disclosure has been described on the basis of the preferable work examples, but the present disclosure is not limited these work examples and various kinds of modifications can be made. The planar shapes of the projecting portion and the branch projecting portion are not limited to the V shape described in the work examples, and for example, it is possible to adopt various kinds of patterns in which the projecting portion and the branch projecting portion extend toward multiple azimuth angles, for examples, stripe-like and ladder-like patterns. In the case of viewing the projecting portion and the branch projecting portion as a whole, planner shapes of end portions of the projecting portion and the branch projecting portion may be linear or may also be stepwise. Additionally, the planner shapes of end portions of the respective projecting portion and branch projecting portions may also be linear or may also be formed of combination of line segments, or may also draw a curved line such as an arc.

In the work examples, the liquid crystal display (liquid crystal display element) in a VA mode have been described, but the present disclosure is not limited thereto and may be applied to another display mode such as an ECB mode (positive liquid crystal mode in horizontal orientation; without twist), an in plane switching (IPS) mode, a fringe field switching (FFS) mode, or optically compensated bend (OCB) mode. In this case also, similar effects can be obtained. However, in the present disclosure, an improvement effect of high response characteristics can be exerted especially in the VA mode more than in the IPS mode and the FFS mode, compared to a case where pretilt processing is not applied. Additionally, in the work examples, a transmissive type liquid crystal display (liquid crystal display element) has been exclusively described, but not limited thereto, a reflection type may also be applied. In the case of applying the reflection type, a pixel electrode is formed of an electrode material having light reflectivity, such as aluminum.

Furthermore, the present disclosure may also take following constitutions.

[A01]<<Liquid Crystal Display . . . First Aspect>>

A liquid crystal display formed by arraying a plurality of pixels, the pixel including:

a first substrate and a second substrate;

a first electrode formed on a facing surface of the first substrate that faces a second substrate;

a second electrode formed on a facing surface of the second substrate that faces the first substrate; and a liquid crystal layer provided between the first electrode and the second electrode and including a liquid crystal molecule, wherein a pretilt angle is provided to a liquid crystal molecule, the first electrode is formed of a transparent conductive material layer and a foundation layer having a plurality of projecting portions and recessed portions, a first transparent conductive material layer connected to a first power feeding unit is formed on a projecting portion top surface of the foundation layer, and a second transparent conductive material layer connected to a second power feeding unit is formed on a recessed portion bottom surface of the foundation layer.

[A02]<<Liquid Crystal Display . . . First-A Aspect>>

The liquid crystal display recited in [A01], wherein the projecting portion is formed of a trunk projecting portion that passes a pixel center portion and radially extends (for example, in a cross shape) and a plurality of branch projecting portions that extends from the trunk projecting portion toward a pixel peripheral portion, and the recessed portion is formed of a trunk recessed portion that is formed in a pixel peripheral portion in a frame-like shape and surrounds the projecting portion, and a branch recessed portion that extends from the trunk recessed portion and is located between a branch projecting portion and a branch projecting portion.

[A03]<<Liquid Crystal Display . . . First-B Aspect>>

The liquid crystal display recited in [A01], wherein the projecting portion is formed of a trunk projecting portion formed in the pixel peripheral portion in a frame-like shape, and a plurality of branch projecting portions that extends from the trunk projecting portion toward inside of the pixel, and a recessed portion is formed of a trunk recessed portion that passes the pixel center portion and radially extends (for example, in a cross shape), and a branch recessed portion that extends from the trunk recessed portion toward the pixel peripheral portion and is located between a branch projecting portion and a branch projecting portion.

[A04] The liquid crystal display recited in any one of [A01] to [A03], wherein the first power feeding unit and the second power feeding unit are common.

[A05] The liquid crystal display recited in [A04], wherein the common first power feeding unit and second power feeding unit are provided at the pixel peripheral portion.

[A06] The liquid crystal display recited in any one of [A01] to [A03], wherein the first power feeding unit is provided at the pixel center portion and the second power feeding unit is provided at pixel peripheral portion.

[A07] The liquid crystal display recited in any one of [A01] to [A03], wherein the first power feeding unit and the second power feeding unit are provided at pixel peripheral portion.

[A08] The liquid crystal display recited in any one of [A01] to [A07], wherein in the case of assuming a (X, Y) coordinate system in which respective straight lines passing the pixel center portion and parallel to the pixel peripheral portion are set as an X-axis and a Y-axis, a plurality of branch projecting portions occupying a first quadrant extends in parallel in a direction in which a value of the Y-coordinate increases when a value of the X-coordinate increases, a plurality of branch projecting portions occupying a second quadrant extends in parallel in a direction in which the value of the Y-coordinate increases when the value of the X-coordinate decreases;

a plurality of branch projecting portions occupying a third quadrant extends in parallel in a direction in which the value of the Y-coordinate decreases when the value of the X-coordinate decreases; and a plurality of branch projecting portions occupying a fourth quadrant extends in parallel in a direction in which the value of the Y-coordinate decreases when the value of the X-coordinate increases.

[B01]<<Liquid Crystal Display . . . Second Aspect>>

A liquid crystal display formed by arraying a plurality of pixels, and the pixel including:

a first substrate and a second substrate;

a first electrode formed on a facing surface of the first substrate that faces a second substrate;

a second electrode formed on a facing surface of the second substrate that faces the first substrate; and a liquid crystal layer provided between the first electrode and the second electrode and including a liquid crystal molecule, wherein a pretilt angle is provided to a liquid crystal molecule, the first electrode is formed of a transparent conductive material layer and a foundation layer having a plurality of projecting portions and recessed portions, a first transparent conductive material layer is formed on a projecting portion top surface of the foundation layer, a second transparent conductive material layer connected to the first transparent conductive material layer is formed on a recessed portion bottom surface of the foundation layer, the projecting portion is formed of a trunk projecting portion that passes a pixel center portion and radially extends (for example, in a cross shape), and a plurality of branch projecting portions that extends from the trunk projecting portion toward a pixel peripheral portion, the recessed portion extends from the trunk projecting portion and is located between a branch projecting portion and a branch projecting portion, and a narrowest portion exists in the recessed portion.

[B02]<<Liquid Crystal Display . . . Third Aspect>>

A liquid crystal display formed by arraying a plurality of pixels, and the pixel including:

a first substrate and a second substrate;

a first electrode formed on a facing surface of the first substrate that faces a second substrate;

a second electrode formed on a facing surface of the second substrate that faces the first substrate; and a liquid crystal layer provided between the first electrode and the second electrode and including a liquid crystal molecule, wherein a pretilt angle is provided to a liquid crystal molecule, the first electrode is formed of a transparent conductive material layer and a foundation layer having a plurality of projecting portions and recessed portions, a first transparent conductive material layer is formed on a projecting portion top surface of the foundation layer, a second transparent conductive material layer connected to the first transparent conductive material layer is formed on a recessed portion bottom surface of the foundation layer, the projecting portion is formed of a trunk projecting portion that passes a pixel center portion and radially extends (for example, in a cross shape), and a plurality of branch projecting portions that extends from the trunk projecting portion toward a pixel peripheral portion, and the recessed portion extends from the trunk projecting portion and is located between a branch projecting portion and a branch projecting portion, and a portion where a level difference between the recessed portion and the projecting portion becomes smallest exists.

[C01]<<Liquid Crystal Display . . . Fourth Aspect>>

A liquid crystal display formed by arraying a plurality of pixels, and the pixel including:

a first substrate and a second substrate;

a first electrode formed on a facing surface of the first substrate that faces a second substrate;

a second electrode formed on a facing surface of the second substrate that faces the first substrate; and a liquid crystal layer provided between the first electrode and the second electrode and including a liquid crystal molecule, wherein a pretilt angle is provided to a liquid crystal molecule, the first electrode is formed of a transparent conductive material layer and a foundation layer having a plurality of projecting portions and recessed portions, a first transparent conductive material layer is formed on a projecting portion top surface of the foundation layer, a second transparent conductive material layer connected to the first transparent conductive material layer is formed on a recessed portion bottom surface of the foundation layer, the projecting portion is formed of a trunk projecting portion that is formed in a pixel peripheral portion in a frame-like shape and a plurality of branch projecting portions that extends from the trunk projecting portion toward inside of a pixel, and the recessed portion extends from the trunk projecting portion and is located between a branch projecting portion and a branch projecting portion, and a narrowest portion exists in the recessed portion.

[C02]<<Liquid Crystal Display . . . Fifth Aspect>>

A liquid crystal display formed by arraying a plurality of pixels, and the pixel including:

a first substrate and a second substrate;

a first electrode formed on a facing surface of the first substrate that faces a second substrate;

a second electrode formed on a facing surface of the second substrate that faces the first substrate; and a liquid crystal layer provided between the first electrode and the second electrode and including a liquid crystal molecule, wherein a pretilt angle is provided to a liquid crystal molecule, the first electrode is formed of a transparent conductive material layer and a foundation layer having a plurality of projecting portions and recessed portions, a first transparent conductive material layer is formed on a projecting portion top surface of the foundation layer, a second transparent conductive material layer connected to the first transparent conductive material layer is formed on a recessed portion bottom surface of the foundation layer, the projecting portion is formed of a trunk projecting portion that is formed in a pixel peripheral portion in a frame-like shape and a plurality of branch projecting portions that extends from the trunk projecting portion toward inside of a pixel, and the recessed portion extends from the trunk projecting portion and is located between a branch projecting portion and a branch projecting portion, and a region where a level difference between the recessed portion and the projecting portion becomes smallest exists.

[C03]<<Liquid Crystal Display . . . Fourth-A Aspect/Fifth-A Aspect>>

The liquid crystal display recited in [C01] or [C02], wherein the projecting portion further includes a second trunk projecting portion that passes the pixel center portion from the trunk projecting portion, radially extends (for example, in a cross shape), and is connected to a branch projecting portion.

[C04]<<Liquid Crystal Display . . . Fourth-B Aspect/Fifth-B Aspect>>

The liquid crystal display recited in [C01] or [C02], wherein the recessed portion is formed of a trunk recessed portion that passes the pixel center portion and radially extends (for example, in a cross shape), and a branch recessed portion that extends from the trunk recessed portion to the trunk projecting portion and is located between a branch projecting portion and a branch projecting portion.

[C05] The liquid crystal display recited in any one of [C01] to [C04], wherein in the case of assuming a (X, Y) coordinate system in which respective straight lines passing the pixel center portion and parallel to the pixel peripheral portion are set as an X-axis and a Y-axis, a plurality of branch projecting portions occupying a first quadrant extends in parallel in a direction in which a value of the Y-coordinate increases when a value of the X-coordinate increases, a plurality of branch projecting portions occupying a second quadrant extends in parallel in a direction in which the value of the Y-coordinate increases when the value of the X-coordinate decreases;

a plurality of branch projecting portions occupying a third quadrant extends in parallel in a direction in which the value of the Y-coordinate decreases when the value of the X-coordinate decreases; and a plurality of branch projecting portions occupying a fourth quadrant extends in parallel in a direction in which the value of the Y-coordinate decreases when the value of the X-coordinate increases.

[C06]<<Liquid Crystal Display . . . Fourth-C Aspect/Fifth-C Aspect>>

The liquid crystal display recited in [C01] or [C02], wherein in the case of assuming a (X, Y) coordinate system in which respective straight lines passing a pixel center portion and parallel to a pixel peripheral portion are set as an X-axis and a Y-axis, a plurality of branch projecting portions occupying a first quadrant extends in parallel in a direction in which a value of Y-coordinate increases when a value of X-coordinate increases, a plurality of branch projecting portions occupying a second quadrant extends in parallel in a direction in which the value of the Y-coordinate increases when the value of the X-coordinate decreases, a plurality of branch projecting portions occupying a third quadrant extends in parallel in a direction in which the value of the Y-coordinate decreases when the value of the X-coordinate decreases, a plurality of branch projecting portions occupying a fourth quadrant extends in parallel in a direction in which the value of the Y-coordinate decreases when the value of the X-coordinate increases, the branch projecting portion extending from the trunk projecting portion in parallel to the X-axis and occupying the first quadrant and the branch projecting portion extending from the trunk projecting portion in parallel to the X-axis and occupying the fourth quadrant are formed in a connected state;

the branch projecting portion extending from the trunk projecting portion in parallel to the Y-axis and occupying the first quadrant and the branch projecting portion extending from the trunk projecting portion in parallel to the Y-axis and occupying the second quadrant are formed in a connected state;

the branch projecting portion extending from the trunk projecting portion in parallel to the X-axis and occupying the second quadrant and the branch projecting portion extending from the trunk projecting portion in parallel to the X-axis and occupying the third quadrant are formed in a connected state; and the branch projecting portion extending from the trunk projecting portion in parallel to the Y-axis and occupying the third quadrant and the branch projecting portion extending from the trunk projecting portion in parallel to the Y-axis and occupying the fourth quadrant are formed in a connected state.

[C07]<<Liquid Crystal Display . . . Fourth-D Aspect/Fifth-D Aspect>>

The liquid crystal display recited in [C01] or [C02], wherein in the case of assuming a (X, Y) coordinate system in which respective straight lines passing the pixel center portion and parallel to the pixel peripheral portion are set as an X-axis and a Y-axis, a plurality of branch projecting portions occupying a first quadrant extends in parallel in a direction in which a value of the Y-coordinate increases when a value of the X-coordinate increases, a plurality of branch projecting portions occupying a second quadrant extends in parallel in a direction in which the value of the Y-coordinate increases when the value of the X-coordinate decreases, a plurality of branch projecting portions occupying a third quadrant extends in parallel in a direction in which the value of the Y-coordinate decreases when the value of the X-coordinate decreases, a plurality of branch projecting portions occupying a fourth quadrant extends in parallel in a direction in which the value of the Y-coordinate decreases when the value of the X-coordinate increases, the branch projecting portion extending from the trunk projecting portion in parallel to the X-axis and occupying the first quadrant and the branch projecting portion extending from the trunk projecting portion in parallel to the X-axis and occupying the fourth quadrant are not jointed, the branch projecting portion extending from the trunk projecting portion in parallel to the Y-axis and occupying the first quadrant and the branch projecting portion extending from the trunk projecting portion in parallel to the Y-axis and occupying the second quadrant are not jointed, the branch projecting portion extending from the trunk projecting portion in parallel to the X-axis and occupying the second quadrant and the branch projecting portion extending from the trunk projecting portion in parallel to the X-axis and occupying the third quadrant are not jointed, and the branch projecting portion extending from the trunk projecting portion in parallel to the Y-axis and occupying the third quadrant and the branch projecting portion extending from the trunk projecting portion in parallel to the Y-axis and occupying the fourth quadrant are not jointed.

[C08]<<Liquid Crystal Display . . . Fourth-E Aspect/Fifth-E Aspect>>

The liquid crystal displays recited in [C01] or [C02], wherein in the case of assuming a (X, Y) coordinate system in which respective straight lines passing the pixel center portion and parallel to the pixel peripheral portion are set as an X-axis and a Y-axis, a plurality of branch projecting portions occupying a first quadrant extends in parallel in a direction in which a value of the Y-coordinate increases when a value of the X-coordinate increases;

a plurality of branch projecting portions occupying a second quadrant extends in parallel in a direction in which the value of the Y-coordinate increases when the value of the X-coordinate decreases;

a plurality of branch projecting portions occupying a third quadrant extends in parallel in a direction in which the value of the Y-coordinate decreases when the value of the X-coordinate decreases; and a plurality of branch projecting portions occupying a fourth quadrant extends in parallel in a direction in which the value of the Y-coordinate decreases when the value of the X-coordinate increases, the branch projecting portion extending from the trunk projecting portion in parallel to the X-axis and occupying the first quadrant and the branch projecting portion extending from the trunk projecting portion in parallel to the X-axis and occupying the fourth quadrant are formed in a deviated state;

the branch projecting portion extending from the trunk projecting portion in parallel to the Y-axis and occupying the first quadrant and the branch projecting portion extending from the trunk projecting portion in parallel to the Y-axis and occupying the second quadrant are formed in a deviated state;

the branch projecting portion extending from the trunk projecting portion in parallel to the X-axis and occupying the second quadrant and the branch projecting portion extending from the trunk projecting portion in parallel to the X-axis and occupying the third quadrant are formed in a deviated state; and the branch projecting portion extending from the trunk projecting portion in parallel to the Y-axis and occupying the third quadrant and the branch projecting portion extending from the trunk projecting portion in parallel to the Y-axis and occupying the fourth quadrant are formed in a deviated state.

[D01] The liquid crystal display recited in any one of [A01] to [C08], wherein a transparent conductive material layer is further formed on at least a part of a side surface of the foundation layer that connects the projecting portion top surface to the recessed portion bottom surface of the foundation layer.

[D02] The liquid crystal display recited in any one of [A01] to [D01], wherein a black matrix is provided, and a projection image at a portion in the first substrate located between a pixel and a pixel, a projection image in the pixel peripheral portion, and a projection image in the black matrix are overlapped.

[D03] The liquid crystal display recited in any one of [A01] to [D02], wherein a first orientation film to cover the first electrode and a second orientation film to cover the second electrode are further provided, and the liquid crystal molecule is provided with a pretilt angle by making polymerizable monomer at least constituting the first orientation film react while a predetermined electrical field is applied to the liquid crystal layer.

[D04] The liquid crystal display recited in any one of [A01] to [D02], wherein a first orientation film to cover the first electrode and a second orientation film to cover the second electrode are further provided, and the liquid crystal molecule is provided with a pretilt angle by making polymerizable monomer included in the liquid crystal layer react while a predetermined electrical field is applied to the liquid crystal layer.

[D05] The liquid crystal display recited in [D03] or [D04], wherein in the case of setting an average film thickness of the first orientation film as $T_1$ and an average film thickness of the second orientation film as $T_2$, $0.5 \leq T_2/T_1 \leq 1.5$ is satisfied.

[E01] The liquid crystal display recited in any one of [A01] to [D04], wherein an orientation control unit is formed at a portion of the second electrode corresponding to the trunk projecting portion.

[E02] The liquid crystal display recited in any one of [A01] to [D04], wherein a first electrode slit structure or a first electrode protruding portion passing the pixel center portion and parallel to the pixel peripheral portion is formed on the first electrode.

[E03] The liquid crystal display recited in any one of [A01] to [E02], wherein a width of a branch projecting portion provided at the first electrode becomes narrower toward a distal end portion.

[E04] The liquid crystal display recited in any one of [A01] to [E02], wherein a width of a branch projecting portion is widest at a portion of the branch projecting portion jointed to the trunk projecting portion and becomes narrower toward a distal end portion from a portion jointed to the trunk projecting portion.

[E05] The liquid crystal display recited in [E04], wherein the width of the branch projecting portion becomes linearly narrower from the portion jointed to the trunk projecting portion toward the distal end portion.

[E06] The liquid crystal display recited in any one of [A01] to [E05], wherein a projecting structure is formed from a portion of the first substrate located between a pixel and a pixel to a portion of the first substrate corresponding to the pixel peripheral portion, and a peripheral portion of an uneven portion is formed on the projecting structure.

[F01] The liquid crystal display recited in any one of [A01] to [E06], wherein a slit portion is formed at the first electrode.

[F02] The liquid crystal display recited in [F01], wherein the slit portion is formed in a projecting region.

[F03] The liquid crystal display recited in [F02], wherein the slit portion is formed in the projecting region including a pixel center portion.

[F04] The liquid crystal display recited in [F02], wherein the slit portion is formed on the projecting region extending toward a pixel center region.

[F05] The liquid crystal display recited in [F02], wherein the slit portion is provided in a region interposed between the Y-axis and a projecting portion extending toward a pixel center region.

[F06] The liquid crystal display recited in [F01], wherein the slit portion extending in parallel to a projecting portion is formed on a top portion of the projecting portion.

[F07] The liquid crystal display recited in [F01], wherein the slit portion extending in parallel to a recessed portion is formed on a bottom portion of the recessed portion.

[G01] The liquid crystal display recited in any one of [A01] to [F07], wherein a dent is provided at the first electrode in a pixel center region.

[G02] The liquid crystal display recited in [G01], wherein the dent becomes narrower toward the first substrate.

[G03] The liquid crystal display recited in [G02], wherein an inclination angle of the dent is 5 to 60 degrees.

[G04] The liquid crystal display recited in any one of [G01] to [G03] wherein an outer edge shape of the dent is a round shape.

[G05] The liquid crystal display recited in any one of [G01] to [G03], wherein an outer edge shape of the dent is a rectangular shape.

[G06] The liquid crystal display recited in [G05], wherein an angle formed between an outer edge of the rectangular-shaped dent and an extending direction of the projecting portion is 90 degrees.

[G07] The liquid crystal display recited in [G05], wherein an angle formed between an outer edge of the rectangular-shaped dent and an extending direction of the projecting portion is an acute angle.

[G08] The liquid crystal display according to any one of [G01] to [G07], wherein a center portion of the dent constitutes a part of a contact hole.

[H01] The liquid crystal display recited in any one of [A01] to [G08], wherein a projecting portion extending from the X-axis or vicinity thereof and occupying the first quadrant and a projecting portion extending from the X-axis or vicinity thereof and occupying the fourth quadrant are formed in a state deviated from each other;

a projecting portion extending from the Y-axis or vicinity thereof and occupying the first quadrant and a projecting portion extending from the Y-axis or vicinity thereof and occupying the second quadrant are formed in a state deviated from each other;

a projecting portion extending from the X-axis or vicinity thereof and occupying the second quadrant and a projecting portion extending from the X-axis or vicinity thereof and occupying the third quadrant are formed in a state deviated from each other; and a projecting portion extending from the Y-axis or vicinity thereof and occupying the third quadrant and a projecting portion extending from the Y-axis or vicinity thereof and occupying the fourth quadrant are formed in a state deviated from each other.

[H02] The liquid crystal display recited in [H01], wherein in the case of assuming a forming pitch of projecting portions along the X-axis is $P_X$ and assuming a forming pitch of projecting portions along the Y-axis is $P_Y$, the projecting portion extending from the X-axis or vicinity thereof and occupying the first quadrant and the projecting portion extending from the X-axis or vicinity thereof and occupying the fourth quadrant are formed in a state deviated from each other by $P_X/2$;

the projecting portion extending from the Y-axis or vicinity thereof and occupying the first quadrant and the projecting portion extending from the Y-axis or vicinity thereof and occupying the second quadrant are formed in a state deviated from each other by $P_Y/2$;

the projecting portion extending from the X-axis or vicinity thereof and occupying the second quadrant and the projecting portion extending from the X-axis or vicinity thereof and occupying the third quadrant are formed in a state deviated from each other by $P_X/2$; and the projecting portion extending from the Y-axis or vicinity thereof and occupying the third quadrant and the projecting portion extending from the Y-axis or vicinity thereof and occupying the fourth quadrant are formed in a state deviated from each other by $P_y/2$.

[J01] The liquid crystal display recited in [A02], [A03], [B01], [B02], [C01], [C02], [C03], or [C04], wherein an extending direction of a side edge portion of the trunk projecting portion not jointed to a branch projecting portion is neither parallel to the X-axis nor parallel to the Y-axis.

[J02] The liquid crystal display recited in [J01], wherein the trunk projecting portion constituting a plurality of uneven portions is formed in the pixel peripheral portion in a frame-like shape instead of being formed on the X-axis and the Y-axis.

[J03] The liquid crystal display recited in [J01] or [J02], wherein the side edge portion of the trunk projecting portion not jointed to the branch projecting portion is a straight line.

[J04] The liquid crystal display recited any one of [J01] to [J03], wherein the side edge portion of the trunk projecting portion not jointed to the branch projecting portion is a curved line.

[J05] The liquid crystal display recited in any one of [J01] to [J04], wherein a width of a portion of the trunk projecting portion not jointed to the branch projecting portion becomes narrower toward a distal end portion of the trunk projecting portion.

[J06] The liquid crystal display recited in any one of [J01] to [J05], wherein the width of the branch projecting portion becomes narrower toward the pixel peripheral portion.

REFERENCE SIGNS LIST 10, 10A, 10B, 10C, $10_1$, $10_2$, $10_3$, $10_4$, $10_5$, $10_6$, $10_7$, $10_8$, $10_{10}$, $10_{11}$, $10_{12}$, $10_{13}$, $10_{14}$ Pixel
11 Pixel center region (center portion)
12 Projecting region
13 Projecting structure
20 First substrate
20A Portion of first substrate located between pixel and pixel
20B Portion of first substrate corresponding to pixel peripheral portion
20' Insulation film
21 First orientation film
22 Color filter layer
30 TFT layer
31 Gate electrode
32 Gate insulation layer
33 Semiconductor layer (channel forming region)
34 Source/drain electrodes
35 Connecting hole (contact hole)
50 Second substrate
51 Second orientation film
52 Second electrode (facing electrode)
53 Orientation control unit
54 Second electrode slit structure
55 Second electrode protruding portion (rib)
60 Liquid crystal layer
61, 61A, 61B, 61C Liquid crystal molecule
80 Display area
81 Source driver
82 Gate driver
83 Timing controller
84 Power circuit
91 Source line
92 Gate line
93 TFT
94 Capacitor
120 First electrode (pixel electrode)
121 Uneven portion
130, 230, 330, 430, 530, 630, 730, 830 Projecting portion
131, 231, 331, 431, 531, 631, 731, 831 Trunk projecting portion (main projecting portion)
432 Second trunk projecting portion
432a Portion of second trunk projecting portion not jointed to branch projecting portion
432b Side edge portion of second trunk projecting portion not jointed to branch projecting portion
133, 233, 333, 433, 533, 633, 733, 833 Branch projecting portion (sub-projecting portion)
333a, 433a Portion of branch projecting portion jointed to trunk projecting portion
333b, 433b Distal end portion of branch projecting portion
633a Joint portion of two branch projecting portion
633b Projection of branch projecting portion
135 First transparent conductive material layer
136A, 136B, 136C, 136D, 136E, 146B, 146C Power feeding unit
137A First electrode slit structure
137B First electrode protruding portion (rib)
138A, 138C Slit portion
138B Region not provided with slit portion and formed with transparent conductive material layer constituting first electrode
139 Dent
139A Outer edge of dent
140, 240, 340, 440, 540 Recessed portion
141, 241, 541 Trunk recessed portion (main recessed portion)
143, 243, 543 Branch recessed portion (sub-recessed portion)
344, 444 Portion where recessed portion starts extending from trunk projecting portion
544 Portion where branch recessed portion starts extending from trunk projecting portion
145 Second transparent conductive material layer
150 Foundation layer
151 Projecting portion top surface of foundation layer
152 Recessed portion bottom surface of foundation layer
153 Side surface of foundation layer

The invention claimed is:

1. A liquid crystal display, comprising:
a plurality of pixels in a matrix, each pixel of the plurality of pixels having:
a first substrate;
a second substrate;
a first electrode on an opposing face of the first substrate, wherein the first substrate is opposite to the second substrate;
a second electrode on an opposing face of the second substrate, which is opposite to the first substrate;
a color filter layer between the first substrate and the first electrode;
a liquid crystal layer between the first electrode and the second electrode, wherein the liquid crystal layer includes a plurality of liquid crystal molecules;
a power feeding structure that overlaps a black matrix of the second substrate, wherein the power feeding structure is connected to the first electrode;
a plurality of uneven portions above the first substrate; and
a plurality of branch projecting portions in a plane of the first substrate, wherein
the plurality of branch projecting portions includes (i) a first subset of the branch projecting portions that extends from a first side of a stem projecting portion on an axis and (ii) a second subset of the branch projecting portions that extends from a second side of the stem projecting portion on the axis, the first side of the stem projecting portion being different from the second side of the stem projecting portion, the first and second subsets of the branch projecting portions extending from the stem projecting portion to a same side of the respective pixel, the stem projecting portion extends along a straight line on the axis, the first side of the stem projecting portion is parallel to the second side of the stem projecting portion, the first subset of the branch projecting portions and the second subset of branch projecting portions extend away from the first and second sides of the stem projecting portion, and the first subset of the branch projecting portions is offset from the second subset of the branch projecting portions along the stem projecting portion on the axis.

2. The liquid crystal display according to claim 1, wherein the plurality of branch projecting portions are projections when viewed from a first direction perpendicular to the plane and extend from a central region of each pixel to a periphery of each pixel.

3. The liquid crystal display according to claim 1, further comprising:
a first alignment film covering the first electrode and the opposing face of the first substrate; and
a second alignment film covering the second electrode and the opposing face of the second substrate.

4. The liquid crystal display according to claim 3, wherein the color filter layer is above a gate electrode and a drain/source electrode.

5. The liquid crystal display according to claim 1, wherein a pretilt is imparted on the liquid crystal molecules.

6. The liquid crystal display according to claim 1, wherein an angle formed by the axis and one edge part of a plurality of projecting branch electrode portions is α1, an angle formed by the axis and another edge part of the projecting branch electrode portions is α2, and an angle α0 formed by one of the axis and an axial line L0 of the projecting branch electrode portions being represented as follows:

$$\alpha 0 = \{\alpha 1 + (180 - \alpha 2)\}/2, \text{ where } 0 < \alpha 1 <= 90 \text{ degrees and } 90 <= \alpha 2 < 180 \text{ degrees.}$$

7. The liquid crystal display according to claim 1, wherein a width of a projecting portion of the plurality of branch projecting portions, and a recessed portion are 1 µm to 25 µm and a width of a stem projecting portion is 2×10−6 m to 2×10−5 m.

8. The liquid crystal display according to claim 1, wherein a side edge part of the stem projecting portion, that is not joined to the plurality of branch projecting portions, has a curved line shape.

9. The liquid crystal display according to claim 1, wherein a side edge part of the stem projecting portion, that is not joined to the plurality of branch projecting portions, has a straight line shape and is parallel to the axis.

10. The liquid crystal display according to claim 1, wherein a width of a portion of a projecting portion provided on the first electrode is narrower toward a tip portion of the projecting portion.

11. The liquid crystal display according to claim 1, wherein the power feeding structure is connected to a branch projecting portion of the first electrode.

12. The liquid crystal display according to claim 1, wherein a peripheral portion of an uneven portion of the plurality of uneven portions, is one of parallel or orthogonal to the axis.

13. The liquid crystal display according to claim 1, wherein a peripheral portion of an uneven portion of the plurality of uneven portions is on a projecting structure.

14. The liquid crystal display according to claim 13, wherein the projecting structure comprises one of a signal line, a gate electrode, a source electrode, a drain electrode and a plurality of wiring.

15. A display apparatus comprising,
a backlight comprising a light source device, a reflection member, and an optical sheet;
a power supply circuit configured to supply electric power to a source driver;
a gate driver;
a panel comprising a plurality of pixels in a matrix, each pixel of the plurality of pixels having:
a first substrate;
a second substrate;
a first electrode on an opposing face of the first substrate, wherein the first substrate is opposite to the second substrate;
a second electrode on an opposing face of the second substrate, which is opposite to the first substrate;
a color filter layer between the first substrate and the first electrode; and
a liquid crystal layer between the first electrode and the second electrode, wherein the liquid crystal layer includes a plurality of liquid crystal molecules;
a power feeding structure that overlaps a black matrix of the second substrate, wherein the power feeding structure is connected to the first electrode;
a plurality of uneven portions above the first substrate; and
a plurality of branch projecting portions in a plane of the first substrate, wherein
the plurality of branch projecting portions includes (i) a first subset of the branch projecting portions that extends from a first side of a stem projecting portion on an axis and (ii) a second subset of the branch projecting portions that extends from a second side of the stem projecting portion on the axis, the first side of the stem projecting portion being different from the second side of the stem projecting portion, the first and second subsets of the branch projecting portions extending from the stem projecting portion to a same side of the respective pixel,
the stem projecting portion extends along a straight line on the axis,
the first side of the stem projecting portion is parallel to the second side of the stem projecting portion,
the first subset of the branch projecting portions and the second subset of branch projecting portions extend away from the first and second sides of the stem projecting portion, and
the first subset of the branch projecting portions is offset from the second subset of the branch projecting portions along the stem projecting portion on the axis.

16. The display apparatus according to claim 15, further comprising
a first alignment film covering the first electrode and the opposing face of the first substrate; and
a second alignment film covering the second electrode and the opposing face of the second substrate.

17. The display apparatus according to claim 15, wherein the color filter layer is above a gate electrode and a drain/source electrode.

18. The display apparatus according to claim 15, wherein an angle formed by the axis and one edge part of a plurality of projecting branch electrode portions is $\alpha 1$, an angle formed by the axis and another edge part of the projecting branch electrode portions is $\alpha 2$, and an angle $\alpha 0$ formed by the axis and an axial line L0 of the projecting branch electrode portions being represented as follows:

$$\alpha 0=\{\alpha 1+(180-\alpha 2)\}/2, \text{ where } 0<\alpha 1<=90 \text{ degrees and } 90<=\alpha 2<180 \text{ degrees.}$$

19. The display apparatus according to claim 15, wherein a width of a branch projecting portion of the plurality of branch projecting portions, and a recessed portion are 1 μm to 25 μm and a width of a stem projecting portion is 2×10-6 m to 2×10-5 m.

20. The display apparatus according to claim 15, wherein a side edge part of the stem projecting portion, that is not joined to the plurality of branch projecting portions, has a curved line shape.

21. The display apparatus according to claim 15, wherein a side edge part of the stem projecting portion, that is not joined to the plurality of branch projecting portions, has a straight line shape and is parallel to the axis.

22. The display apparatus according to claim 15, wherein a width of a portion of a projecting portion provided on the first electrode is narrower toward a tip portion of the projecting portion.

23. The display apparatus according to claim 15, wherein the power feeding structure is connected to a branch projecting portion of the first electrode.

24. The display apparatus according to claim 15, wherein a peripheral portion of an uneven portion of the plurality of uneven portions, is one of parallel or orthogonal to the axis.

25. The display apparatus according to claim 15, wherein the plurality of branch projecting portions are projections when viewed from a first direction perpendicular to the plane and extend from a central region of each pixel to a periphery of each pixel.

26. The display apparatus according to claim 15, wherein a peripheral portion of an uneven portion of the plurality of uneven portions is on a projecting structure.

27. The display apparatus according to claim 26, wherein the projecting structure comprises one of a signal line, a gate electrode, a source electrode, a drain electrode and a plurality of wiring.

* * * * *